US012277346B2

(12) United States Patent
Hung et al.

(10) Patent No.: US 12,277,346 B2
(45) Date of Patent: Apr. 15, 2025

(54) MEMORY SYSTEM HAVING PLANES WITH MULTIBIT STATUS

(71) Applicant: MACRONIX INTERNATIONAL CO., LTD., Hsinchu (TW)

(72) Inventors: Shuo-Nan Hung, Hsinchu (TW); Nai-Ping Kuo, Hsinchu (TW); Chien-Hsin Liu, Tainan (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 40 days.

(21) Appl. No.: 18/368,292

(22) Filed: Sep. 14, 2023

(65) Prior Publication Data

US 2025/0094082 A1    Mar. 20, 2025

(51) Int. Cl.
   *G06F 3/06* (2006.01)
(52) U.S. Cl.
   CPC .......... *G06F 3/0659* (2013.01); *G06F 3/0604* (2013.01); *G06F 3/0688* (2013.01)
(58) Field of Classification Search
   CPC ..... G06F 3/0659; G06F 3/0604; G06F 3/0688
   See application file for complete search history.

(56) References Cited

U.S. PATENT DOCUMENTS

| 6,687,158 B2 | 2/2004 | Yano |
| 2010/0199025 A1 | 8/2010 | Nanjou et al. |
| 2013/0128675 A1 | 5/2013 | Kim et al. |
| 2021/0294529 A1 | 9/2021 | Minato |
| 2023/0162763 A1 | 5/2023 | Hung et al. |

FOREIGN PATENT DOCUMENTS

WO   WO-2022160114 A1 *  8/2022  .......... G11C 19/287

* cited by examiner

*Primary Examiner* — Eric Cardwell
(74) *Attorney, Agent, or Firm* — Andrew L. Dunlap; Haynes Beffel & Wolfeld LLP

(57) ABSTRACT

A memory system that is based on 3D NAND flash memory of a high capacity and/or capable of high performance is provided, which includes memory planes, each including a plane core and a specific set of resources. For each memory plane of the plurality of memory planes, the technology provides (i) a corresponding plane busy (PRDY) signal indicating a busy or a ready state of the specific set of recourses of the corresponding memory plane, and (ii) a corresponding plane in operation (PIO #) signal indicating an in operation or idle state of resources used by the plane core of the corresponding memory plane. Issuance of memory commands by a controller and execution of memory commands for a memory plane of the plurality of memory planes is selectively allowed or denied, based on status of one or more of the plurality of PRDY signals and the plurality of PIO # signals.

20 Claims, 38 Drawing Sheets

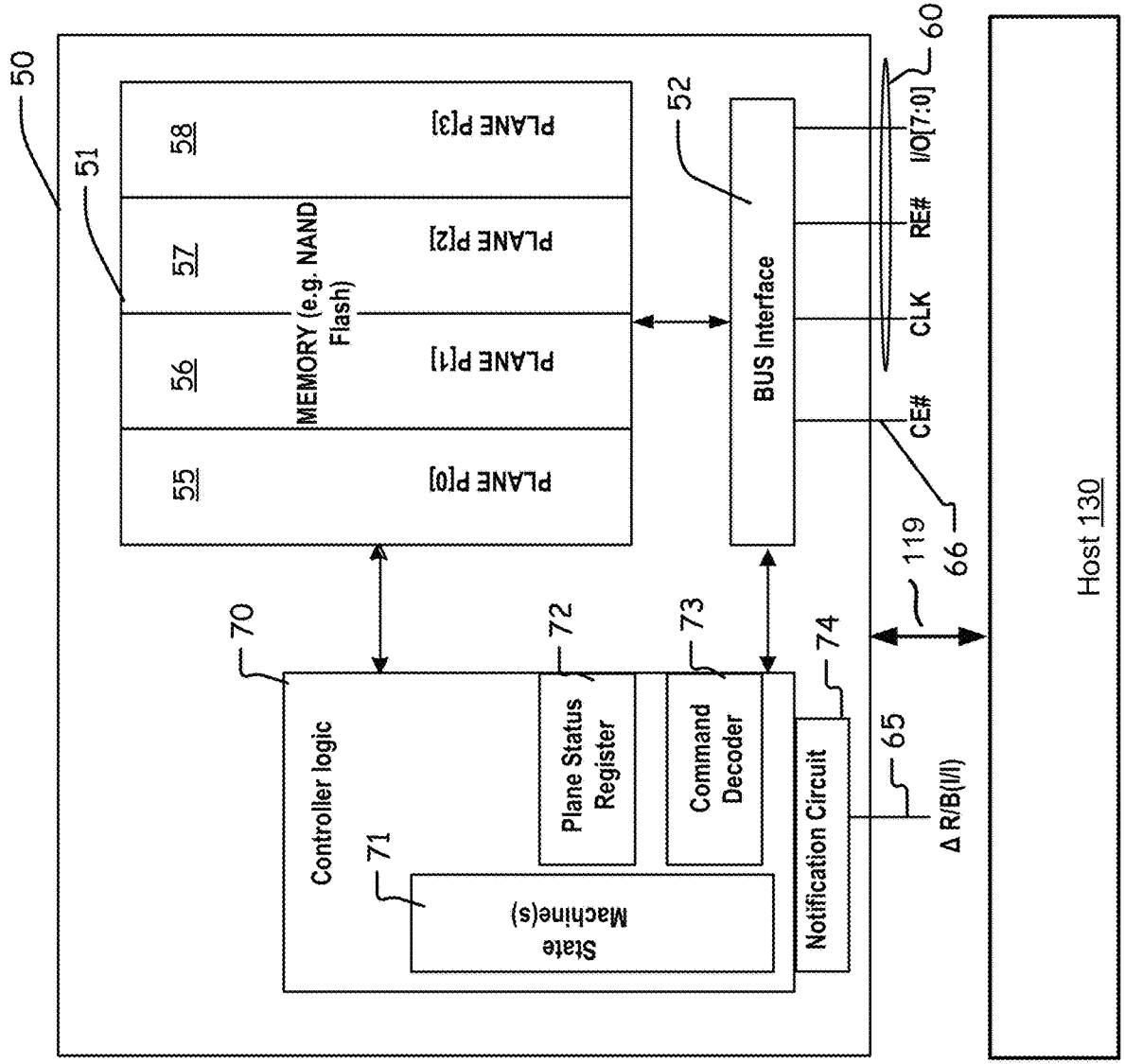

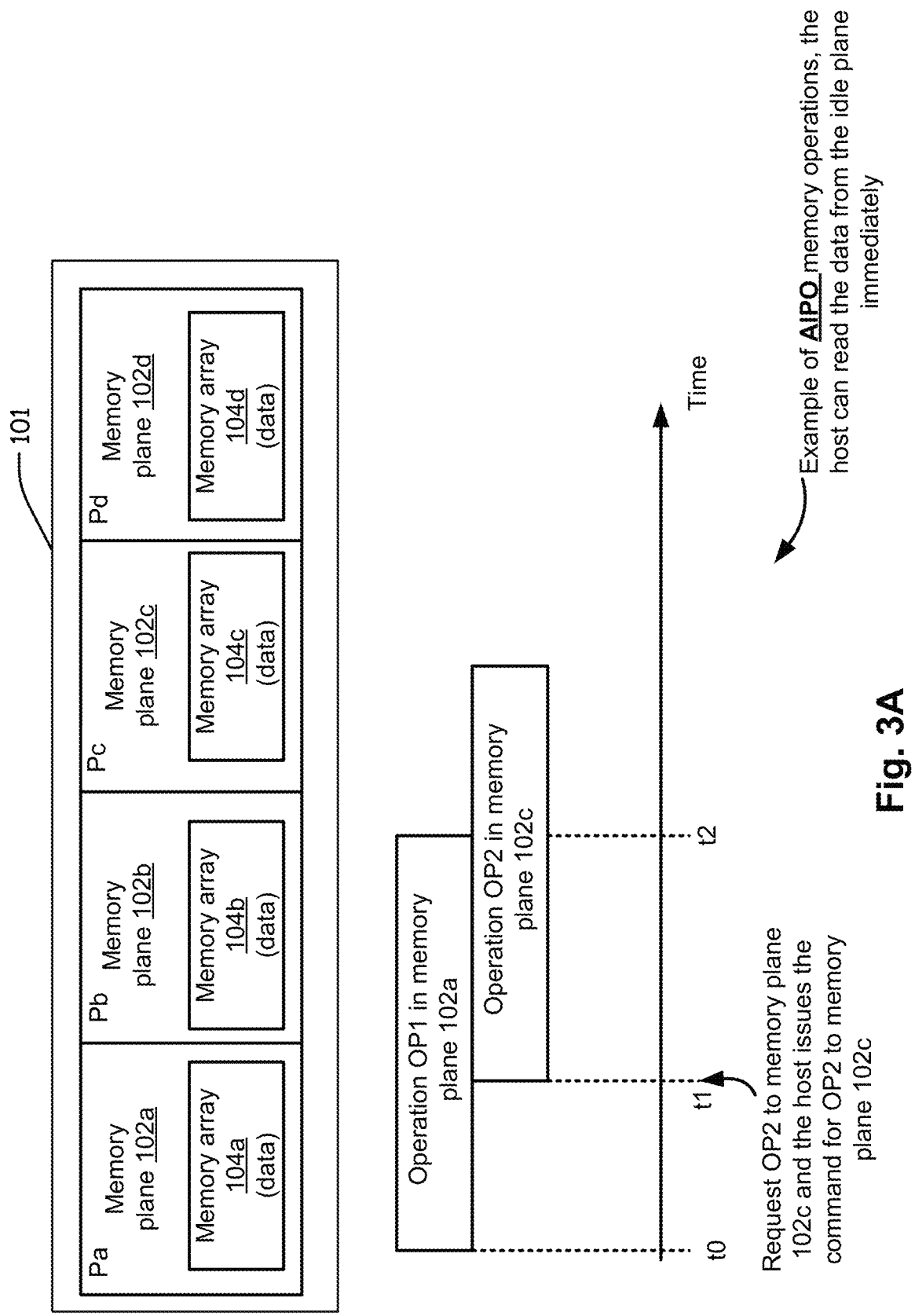

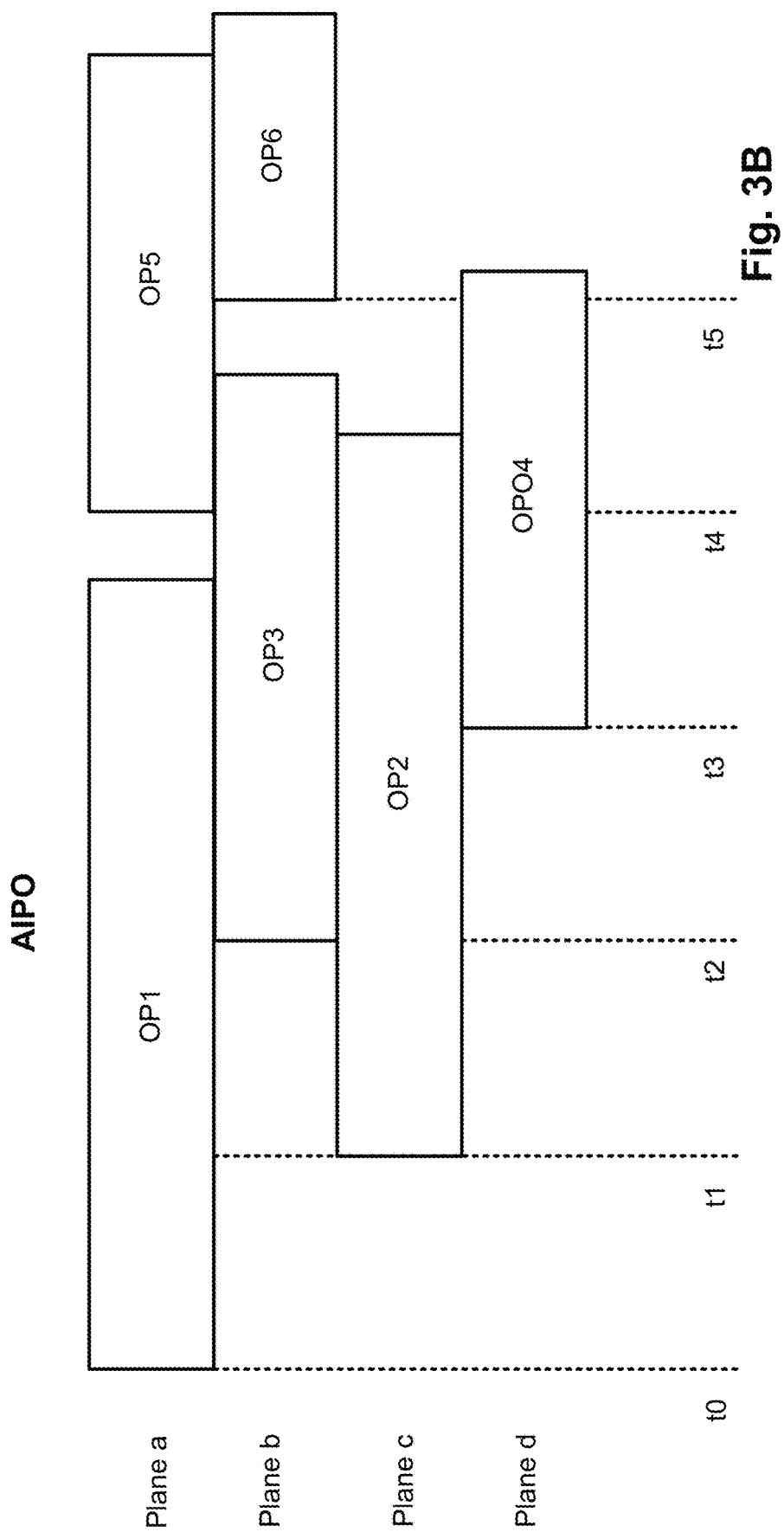

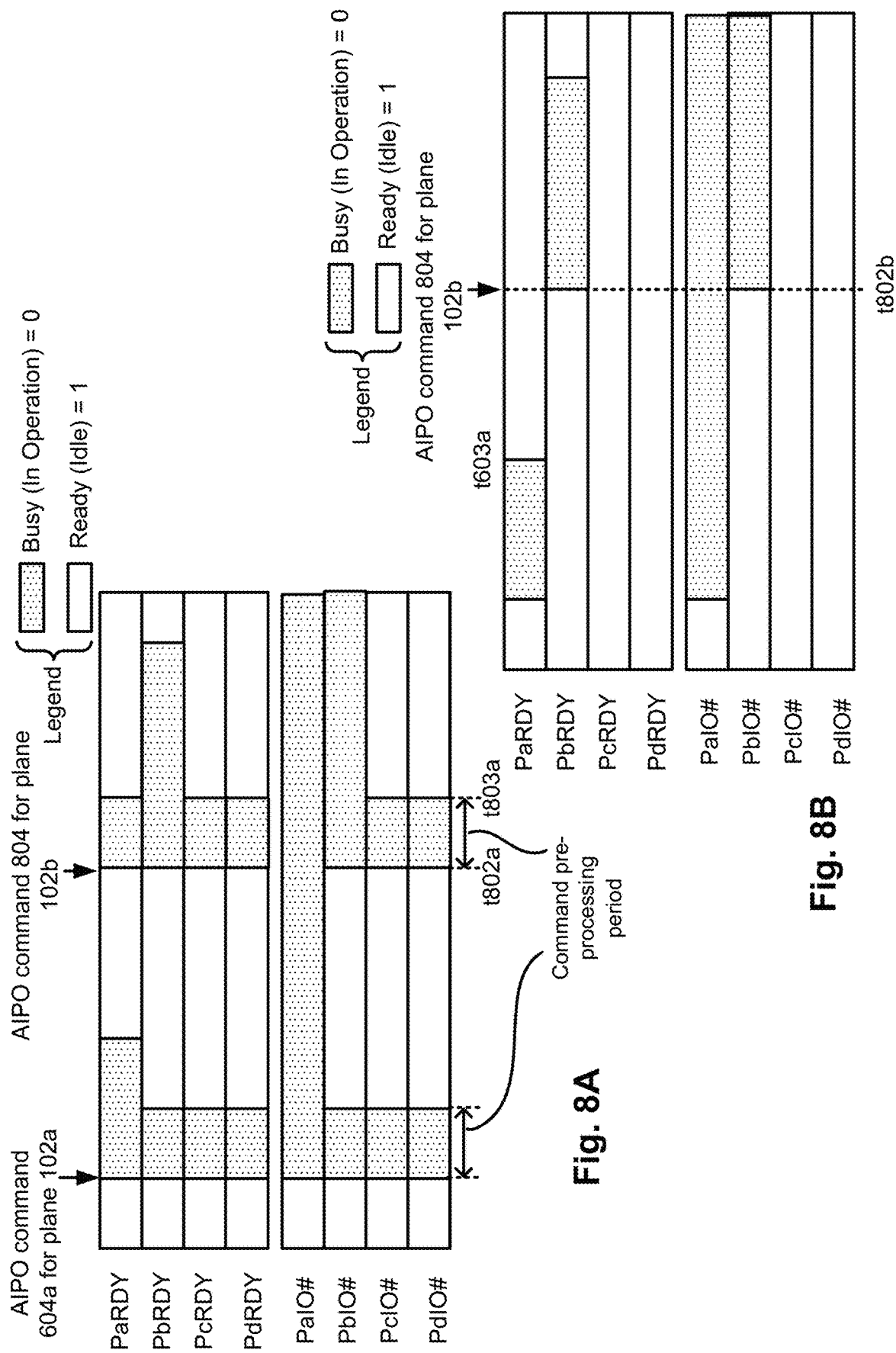

Table 1190

| ONGOING OPERATION IN MEMORY 101 | SELECTED PLANE STATUS | | COMMAND CAN BE ISSUED TO THE SELECTED PLANE | | |
|---|---|---|---|---|---|
| | PxRDY | PxIO# | SCO | AIPO | SCO/AIPO SYSTEM MGMT |
| NO | 1 | 1 | YES | YES | YES/YES |
| AIPO | 1 | 1 | YES | YES | YES/YES |
| | 0 | 0 | NO | NO | YES/YES |
| | 1 | 0 | NO | SELECTED | YES/YES |
| SCO | 0 | 0 | NO | NO | YES/NO |
| | 1 | 0 | SELECTED | SELECTED | YES/NO |

Fig. 12

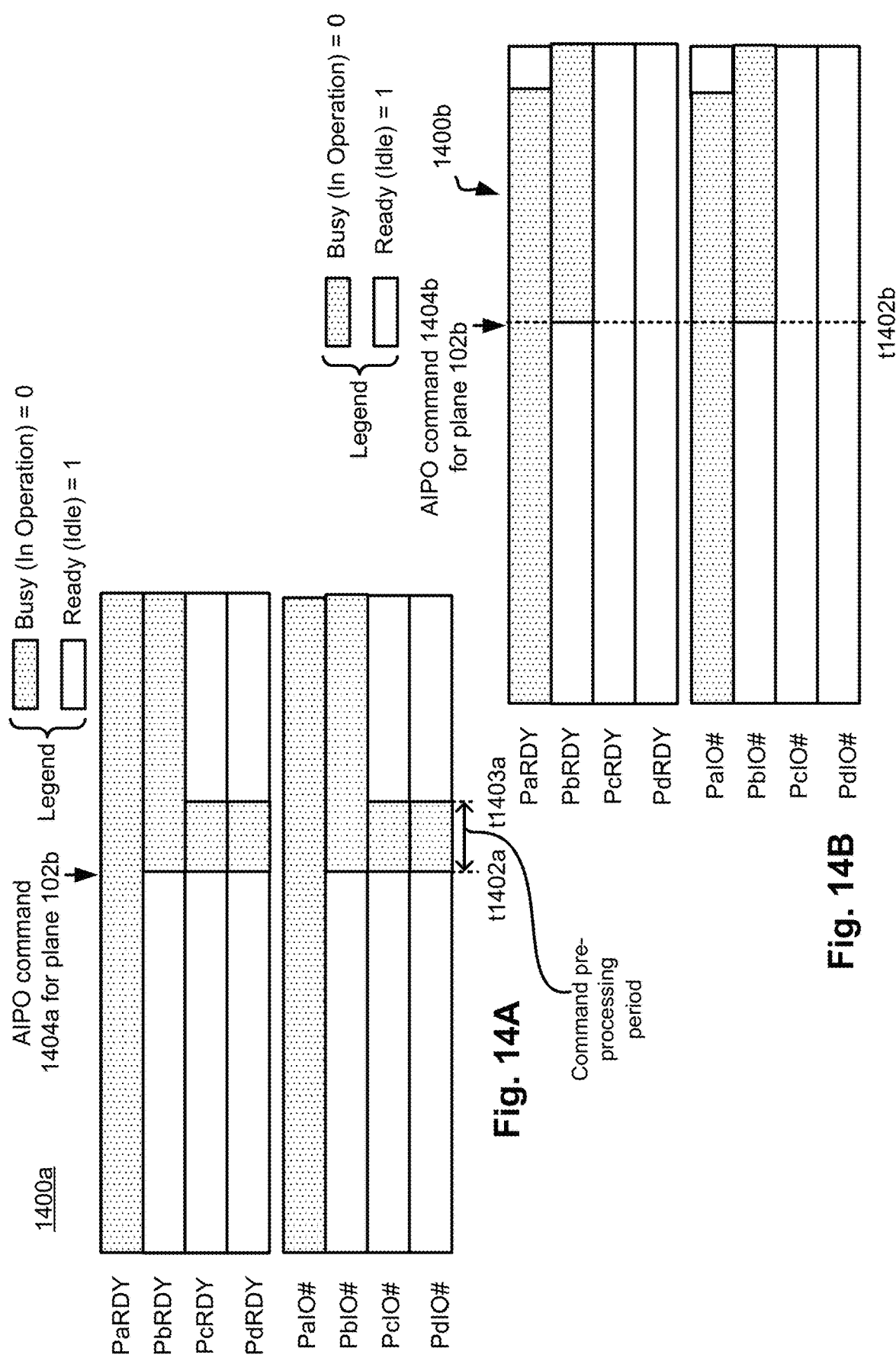

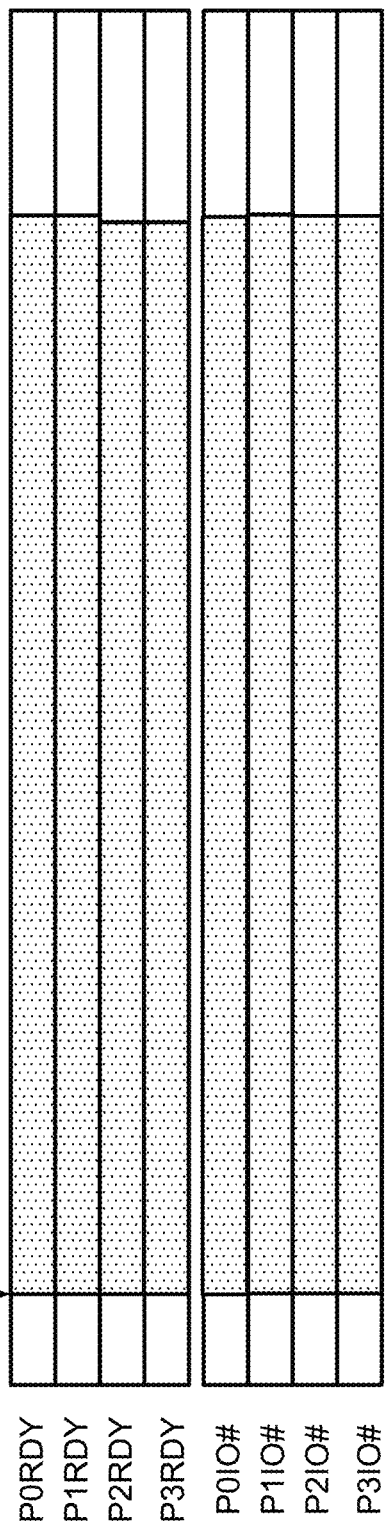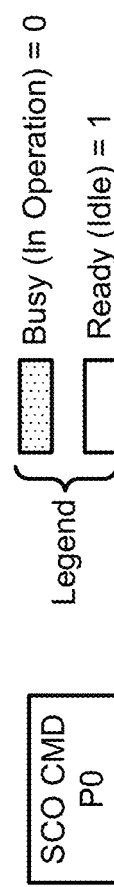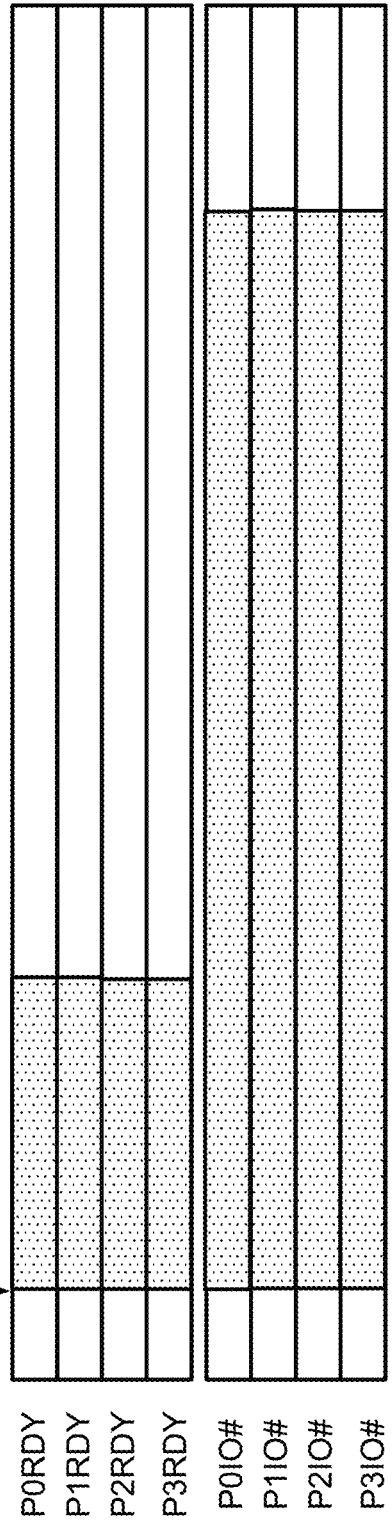
Fig. 19A
Fig. 19B

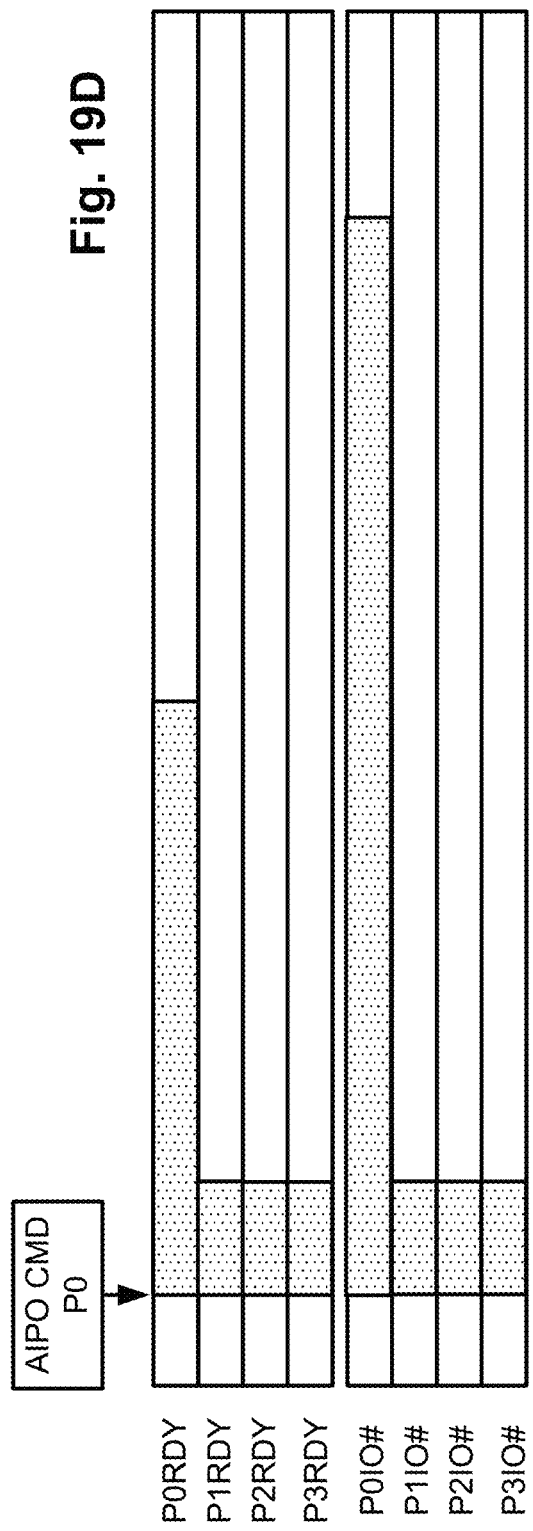

MEMORY SYSTEM HAVING PLANES WITH MULTIBIT STATUS

BACKGROUND

Field

This disclosure relates to memory systems in general, and specifically to memory supporting various types of memory operations.

Description of Related Art

In recent years, memory arrays (such as non-volatile memory arrays) are becoming increasingly dense and can store relatively more data. Often, a memory (e.g., a relatively high-density memory) is divided into multiple physical segments, which can be referred to as memory planes. Thus, such a memory has multiple memory planes. Data stored in different planes may not be (or may be) related.

A challenge in such a multi-plane memory is to provide, to a host, overlapping access to the different planes. However, traditional memory operation command protocols generally prohibit issuance of new embedded operation commands to a non-operating plane, e.g., until a current embedded operation is either finished or operated in the background in an operating plane.

SUMMARY

A memory technology (system) is described supporting a plurality of memory planes. Each memory plane includes a plane core and a corresponding specific set of resources, each respective memory plane being operable to perform (i) foreground operations using at least one of the specific set of resources of the corresponding memory plane and resources of the plane core of the corresponding memory plane and (ii) background operations using the resources of the plane core of the corresponding memory plane. The memory further includes an input/output (I/O) interface to receive memory commands from a host addressed to one or more memory planes of the plurality of memory planes, a status control circuit generating status bits corresponding to each memory plane of the plurality of memory planes, the status bits indicating (i) one of a busy state and a ready state of the specific set of resources used by a foreground operation of the corresponding memory plane and (ii) one of an in operation state and an idle state of the resources of the plane core of the corresponding memory plane, and control circuits operably coupled with the I/O interface, the status control circuit and the plurality of memory planes, to execute memory operations using the plurality of memory planes. In the execution of a memory operation using one or more memory planes in the plurality of memory planes, the control circuits generate a plurality of status bits, in the status control circuit, corresponding to each memory plane in the plurality of memory planes. Further, the control circuits execute, or deny execution of, memory operations of a received memory command in response to combinations of the received memory command and the plurality of status bits in the status control circuit, including a first type of memory command executed, or denied execution, dependent on combinations of the busy and ready states and the in operation and idle states of all the memory planes in the plurality of memory planes, and a second type of memory command addressed to a particular memory plane executed, or denied execution, independent of combinations of the busy and ready states and the in operation and idles states of memory planes in the plurality of memory planes other than the particular memory plane.

Further, according to the present disclosure the foreground operations include operations involving at least one of (i) a plane core of a respective memory plane controlling the specific set of resources of the respective memory plane and (ii) the resources of the plane core of the respective memory plane, and the background operations (i) include operations involving the resources of the plane core of the respective memory plane and (ii) exclude operations involving the plane core of the respective memory plane controlling the specific set of resources of the respective memory plane of the plurality of memory planes.

According to the present disclosure the specific set of resources of the respective memory plane is a cache or a set of specific registers of the respective memory plane, such that the foreground operations prevent the host from accessing the caches or specific registers of the respective memory planes of the plurality of memory planes, and the background operations do not prevent the host from accessing the caches or specific registers of the respective memory planes of the plurality of memory planes, wherein the caches or specific registers are not controlled by the respective plane cores of the respective memory planes.

Further, according to the present disclosure an overlapping operation period is a period during which a new memory command is accepted by the control circuits while an existing background operation of a previous memory command is executing, and the control circuits are configured, such that, during the overlapping operation period and when the new memory command has a higher priority than the previous memory command, the existing background operation is suspended to allow processing of a foreground operation of the new memory command and the suspended background operation is resumed after the foreground operation of the new memory command completes.

According to the present disclosure the new memory command with the higher priority can be a memory command that does not include a background operation.

Additionally, according to the present disclosure, an overlapping operation period can be a period during which a new memory command is accepted by the control circuits while an existing background operation of a previous memory command is executing, and the control circuits can be configured, such that, during the overlapping operation period and when the new memory command does not have a higher priority than the previous memory command, a foreground operation of the new memory command begins after the existing background operation completes.

According to the present disclosure the first type of memory command is for a first select type of operation that is accepted for execution by the control circuits when (i) the busy and ready states of the specific set of resources used by the foreground operations in each memory plane in the plurality of memory planes are all ready, (ii) the in operation and idle states of the resources of respective plane cores are all in operation from another first type of memory command, and (iii) the first select type of operation is capable of execution along with existing background operations.

According to the present disclosure the second type of memory commands is for a second type of operation for a target memory plane that is accepted for execution by the control circuits when (i) the busy and ready states of the specific set of resources used by the foreground operations in each memory plane in the plurality of memory planes include a ready state in the specific set of resources of the target memory plane and (ii) the in operation and idle states of the resources of respective plane cores include an idle state in the resources of the plane core of the target memory plane.

Further, according to the present disclosure the second type of memory command is for a second select type of operation for a target memory plane that is accepted for execution by the control circuits when (i) the busy and ready states of the specific set of resources used by the foreground operations in each memory plane in the plurality of memory planes include a ready state in the specific set of resources of the target memory plane, (ii) the in operation and idle state of the resources of the plane core in the target memory plane is in operation from another second type of memory command, and (iii) the second select type of operation is capable of executing along with existing background operations.

Further, according to the present disclosure the second type of memory command is for a second select type of operation for a target memory plane that is accepted for execution by the control circuits when (i) the busy and ready states of the specific set of resources used by the foreground operations in each memory plane in the plurality of memory planes include a ready state in the specific set of resources of the target memory plane, (ii) the in operation and idle state of the resources of the plane core in the target memory plane is in operation from a first type of memory command, and (iii) the second select type of operation is capable of executing along with existing background operations.

According to the present disclosure the first type of memory command is a synchronous chip operation (SCO) and the second type of memory command is an asynchronous independent plane operation (AIPO).

According to the present disclosure the memory commands include a reset plane command for a target memory plane that is accepted for execution by the control circuits when the in operation and idle state of the resources of the plane core in the target memory plane is in operation from a second type of memory command to cause an ongoing second type of operation of the plane core of the target memory plane to abort Further, according to the present disclosure the memory commands include a command that is accepted for execution by the control circuits engaging a target memory plane in the plurality of memory planes, when the busy and ready states include ready states for the specific sets of resources of the plurality of memory planes, and when the in operation and idle states include in operation states for the resources of the plane cores of the plurality of memory planes.

According to the present disclosure, the plane core of one of the memory planes can be a 3D NAND flash memory.

Further, according to the present disclosure, the plane core of one of the memory planes can be at least one of a memory unit that stores data, an error free memory unit which includes an ECC circuit to correct the data, a computation in memory (CIM) unit configured to execute a data computation function and a memory unit configured to execute in memory search (IMS) commands.

According to the present disclosure the memory system can be configured to execute an operation that engages a target memory plane, during a first phase of execution of the operation, the memory system can be configured to, for a foreground operation, set the busy and ready states of the target memory plane to busy and set the in operation and idle states of the target memory plane to in operation, independent of the busy and ready states and the in operation and idle states of the plurality of memory planes other than the target memory plane, and during a second phase of execution of the operation, the memory system can be configured to, for a background operation, change the busy and ready states of the target memory plane to ready and keep the in operation and idle states of the target memory plane as in operation, independent of the busy and ready states and the in operation and idle states of the plurality of memory planes other than the target memory plane.

Further, according to the present disclosure during a preprocessing operation period of executing the operation that engages the target memory plane, which occurs before the first and second phases of execution, the busy and ready states of each memory plane of the plurality of memory planes can be set to busy and the in operation and idle states of each memory plane of the plurality of memory planes is set to in operation.

According to the present disclosure a method of operating a memory system is provided, where the memory system includes a plurality of memory planes, each memory plane including a plane core and a corresponding specific set of resources, each respective memory plane being operable to perform (i) foreground operations with a specific set of resources of the corresponding memory plane and (ii) background operations without the set of resources of the corresponding memory plane. The method includes generating, for each memory plane of the plurality of memory planes, (i) a corresponding first status signal indicating a busy state or a ready state of the specific set of resources used by a foreground operation of the corresponding memory plane, and (ii) a corresponding second status signal indicating an in operation state or an idle state of the plane core of the corresponding memory plane.

Further, according to the present disclosure, the method includes selectively allowing or denying execution of a memory command for a memory plane of the plurality of memory planes, based on a status of one or more of the plurality of first and second status signals.

Other aspects and advantages of the present invention can be seen on review of the drawings, the detailed description and the claims, which follow.

BRIEF DESCRIPTION OF THE DRAWINGS

FIG. 1B is a simplified block diagram of an integrated circuit device having multiple planes with multibit status.

FIG. 3A illustrates an example AIPO operation, to access data from memory arrays of two memory planes.

FIG. 3B illustrates example AIPO operations.

FIG. 8A illustrates an example timing diagram depicting issuance of an AIPO memory command to an idle plane, while another in operation plane has ongoing background operations, where the AIPO memory command of FIG. 8A causes a command pre-processing period.

FIG. 8B illustrates another example timing diagram depicting issuance of an AIPO memory command to an idle plane, while another plane has ongoing background operations, where the AIPO memory command of FIG. 8B does not cause any command pre-processing period.

FIG. 12 illustrates a table that summarizes usage of the PxRDY and PxIO # for various memory operations.

FIGS. 14A and 14B illustrate timing diagrams depicting scenarios where an AIPO memory command is issued to a memory plane that does not have an ongoing background operation, while one or more other memory planes can have ongoing AIPO background operations.

FIGS. 19A, 19B, 19C and 19D illustrate example timing diagrams of plane busy status signals PxRDY for planes P0 to P3, and plane in operation status signals PxIO # for planes P0 to P3, in response to receiving respective categories of commands.

DETAILED DESCRIPTION

A detailed description of embodiments of the present invention is provided with reference to the figures.

Figure 1A:
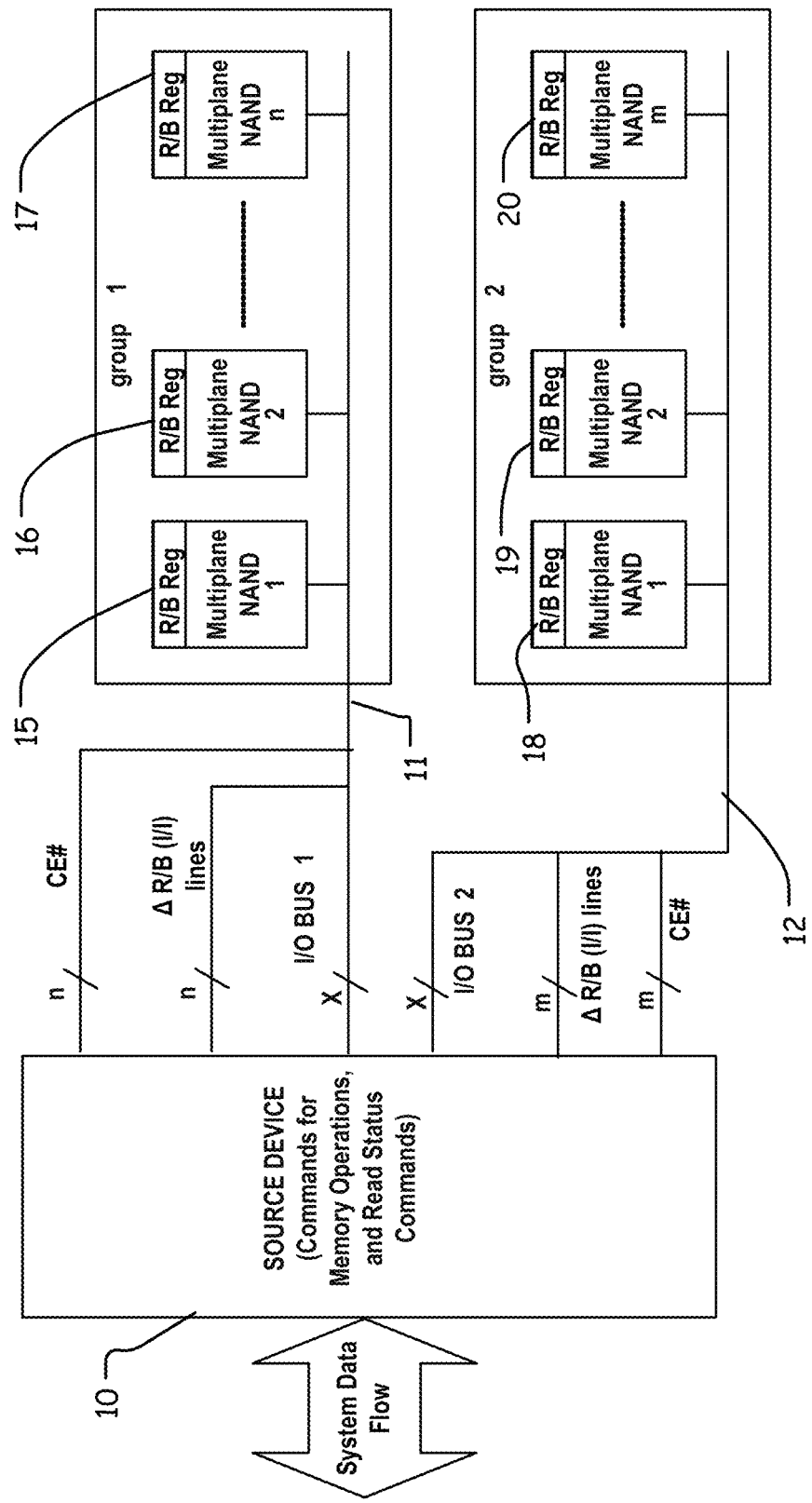
FIG. 1A is a simplified block diagram of a data processing system having multiplane memory devices as described herein.

FIG. 1A is a simplified diagram of a data processing system, such as a memory system, having a communication network with a bus topography, to provide an example of a data processing system in which the present technology can be deployed. The system includes a source device 10 (e.g., a host that communicates to memory devices) that has a bus master interface for multiple busses, I/O BUS 1 and I/O BUS 2, each of which comprises a set of bus signal lines 11, 12. A device can be a memory controller implementing a flash translation layer for example.

The system shown in FIG. 1A can be connected to a broader network which maintains a flow of system data to and from the memory devices. For example, the source device 10 may include a data port like a Universal Serial Bus port, for connection to external computers.

A first group of multiplane memory devices NAND 1, NAND 2, ... NAND n is disposed on I/O BUS 1. A second group of multiplane memory devices NAND 1, NAND 2, ... NAND m is disposed on I/O BUS 2. The multiplane memory devices NAND 1, NAND 2, ... NAND n include bus slave interfaces to the bus signal lines on I/O BUS 1. The multiplane memory devices NAND 1, NAND 2, ... NAND n each have a status control circuit 15, 16, 17 to generate a plurality of status bits for each memory plane, or for at least one of the memory planes, in the device. The multiplane memory devices NAND 1, NAND 2, ... NAND m include bus slave interfaces to the bus signal lines on I/O BUS 2. The multiplane memory devices NAND 1, NAND 2, NAND m each have a status control circuit 18, 19, 20 to generate a plurality of status bits for each memory plane, or for at least one of the memory planes, in the device.

The bus signal lines on I/O BUS 1 include a set of chip enable lines, labeled CE #, one for each device NAND 1, NAND 2, . . . NAND n in the first group. The bus signal lines on I/O BUS 2 include a set of chip enable lines, labeled CE #, one for each device NAND 1, NAND 2, . . . NAND m in the second group.

The bus signal lines on I/O BUS 1 include a set of ready/busy (in operation/idle) notification lines, labeled Δ R/B (I/I) lines, one for each device NAND 1, NAND 2, . . . NAND n in the first group. The bus signal lines on I/O BUS 2 include a set of ready/busy (in operation/idle) notification lines, labeled Δ R/B (I/I) lines, one for each device NAND 1, NAND 2, . . . NAND m in the second group. In other embodiments, the set of devices on a given bus, such as devices NAND 1, NAND 2, . . . NAND n in the first group have notification pins connected to a shared single line on the bus, identifiable as arising from a particular device by combination with the chip enable lines for example.

In some examples, the device 10 may have only one connected multiplane memory device.

The multiplane NAND devices, or at least one of them, include a plurality of memory planes, where each memory plane includes (i) specific set of resources such as a cache or a set of registers to support memory operations using the corresponding memory plane and (ii) the resources of the plane core to support memory operations using the corresponding memory plane.

The source device 10 includes logic implemented by circuitry such as a program controlled processor, programmable logic or dedicated logic circuits, or a combination of the same, to issue memory commands for a connected memory device. The logic to issue memory commands is responsive to expected ready/busy (in operation/idle) states of the resource of the specific set (the plane core) of each memory plane in the plurality of memory planes. Also, the source device includes logic to issue a command to read a status in a connected memory device to update the expected ready/busy (in operation/idle) states. The expected ready/busy (in operation/idle) states can be maintained by the logic by creating a table populated as the commands are issued, with information provided by the ready/busy (in operation/idle) notification pins in some cases.

In this example, the source device 10 includes a bus interface including a plurality of lines for command, address and data communication with the connected memory device, and an interface including a line for connection to a notification pin on the connected memory device to indicate a change in at least on one current combination of current ready/busy (in operation/idle) states of the specific set and the plane core of resources of the plurality of memory planes. In systems including the notification pin, the logic to issue a command to read the status can be responsive to a signal on the notification pin. The results of the read of the status can be used to update the expected ready/busy (in operation/idle) states at the device 10.

An example of logic to issue commands in this setting is described with reference to FIG. 30. The technology provided enables use of a wide variety of commands in a wide variety of combinations of the ready/bus (in operation/idle) states of the planes in multiplane memory devices, a number of examples of which are described herein.

FIG. 1B is a simplified block diagram of an integrated circuit memory device 50 (e.g., a multiple plane device that can include multiple cores for an 'in memory search') including a multiplane NAND memory. The integrated circuit device 50 can be implemented on a single integrated circuit chip, or on multiple integrated circuit chips configured in a multichip package. The integrated circuit memory device 50 in the example includes a multiplane NAND Flash memory 51. The memory has a plurality of planes (55, 56, 57, 58) labeled P[3:0]. The multiplane NAND Flash memory 51 is connected for data communications with a bus interface 52, or other type of input/output I/O circuit. The bus interface 52 can be, for example, a bus slave interface, such as discussed with reference to FIG. 1A. FIG. 1B further illustrates that a host 130 (such as the device 10 of FIG. 1A) communicates with the integrated circuitry memory device 50 using a communication link 119. Operations that are performed by the integrated circuit memory 50 and the host 130 can be classified as background operations and foreground operations, which are discussed in detail below with respect to FIG. 4.

In this example bus signal lines 60 include bus control signals such as clock CLK and read enable RE #. Also the bus signal lines include data lines I/O[7:0]. In this illustration there are eight data lines. In other embodiments, there may be a different number of data lines and different types and numbers of control signal lines as suits a particular bus system configuration. The bus may include other signal lines not shown, such as bus clock lines and bus power and ground lines.

The bus interface 52 is connected to controller logic 70 on the integrated circuit device 50. In this example, the controller logic 70 includes a multibit plane status control circuit 72, and a command decoder 73.

The bus interface 52 includes pins, or other connections, for linking to bus signal lines 60, to a chip enable CE # line 66 and to a Δ R/B (I/I) line 65 for ready/busy notifications. The ready/busy notifications are signals generated in a notification circuit 74 upon detection of a change in a combination of ready/busy status signals in the register 72 for the plurality of planes. The bus signal lines 60, the chip enable CE # line 66 and the Δ R/B (I/I) line 65 can be part of the communication link 119. Additional information can be communicated between the integrated circuit memory device 50 and the host 130 using the communication link 119.

The bus interface 52 receives commands from the bus, and applies them to the command decoder 73. The controller logic applies the decoded command signals to the state machines 71, which carry out the operations. The state machines include registers or other signal sources to indicate the state of the operations being executed, and include a circuit to maintain the status bits in the multibit plane status control circuit 72. The state machines 71 can include multiple instances of the state machines for particular operations, such as one instance for each memory plane.

The controller logic 70 includes operational circuits, such as state machines and dedicated circuits, to execute memory operations in response to commands received at the bus interface 52. The multibit plane status control circuit 72 includes more than one status bit per plane in the plurality of planes 55, 56, 57, 58. The combinations of status bits for a particular plane, and for more than one of the planes, and for all the planes in the plurality of planes 55, 56, 57, 58, along with operations identified by commands received at the interface 52, and in some embodiments with the type of operations being executed currently in the plurality of planes, can be applied by the controller logic 70 to accept and deny the commands received at the bus interface 52 for execution, examples of which are described herein.

More generally, the device 50 of FIG. 1B is an example of a memory device having an input/output (I/O) interface to receive data and memory commands addressed to one or more memory planes in the plurality of memory planes, and to output data; a status control circuit; and control circuits operably coupled with the I/O interface, the status control circuit and the plurality of memory planes, to execute memory operations (e.g., computation in memory (CIM) operations, in memory search (IMS) operations, etc.) using the plurality of memory planes. Even if not explicitly stated, all memory operations described herein can be operations that include, for example, computation in memory (CIM) operations, in memory search (IMS) operations, etc. In the execution of a memory operation using one or more memory planes in the plurality of memory planes, the control circuits generate a plurality of status bits in the status control circuit linked to each memory plane in the plurality of memory planes, the plurality of status bits linked to each memory plane indicate a plurality of different combinations of ready/busy (in operation/idle) states of the specific set and the plane core of resources of each memory plane in the plurality of memory planes. Also, the control circuits execute, or deny execution of, memory operations of a received memory command in response to combinations of the received memory command and the plurality of status bits In the status control circuit, including a first type of memory command executed, or denied execution, dependent on combinations of ready/busy (in operation/idle) states of all the memory planes in the plurality of memory planes, and a second type of memory command addressed to a particular memory plane executed, or denied execution, independent of combinations of ready/busy (in operation/idle) states of memory planes in the plurality of memory planes other than the particular memory plane.

An example of logic to accept and deny commands in this setting is described with reference to FIG. 29. The technology provided enables use of a wide variety of commands in a wide variety of combinations of the ready/bus (in operation/idle) states of the planes in multiplane memory devices, a number of examples of which are described herein.

Synchronous Chip Operation (SCO) or Concurrent Multiple Plane Operation

Figure 2A:
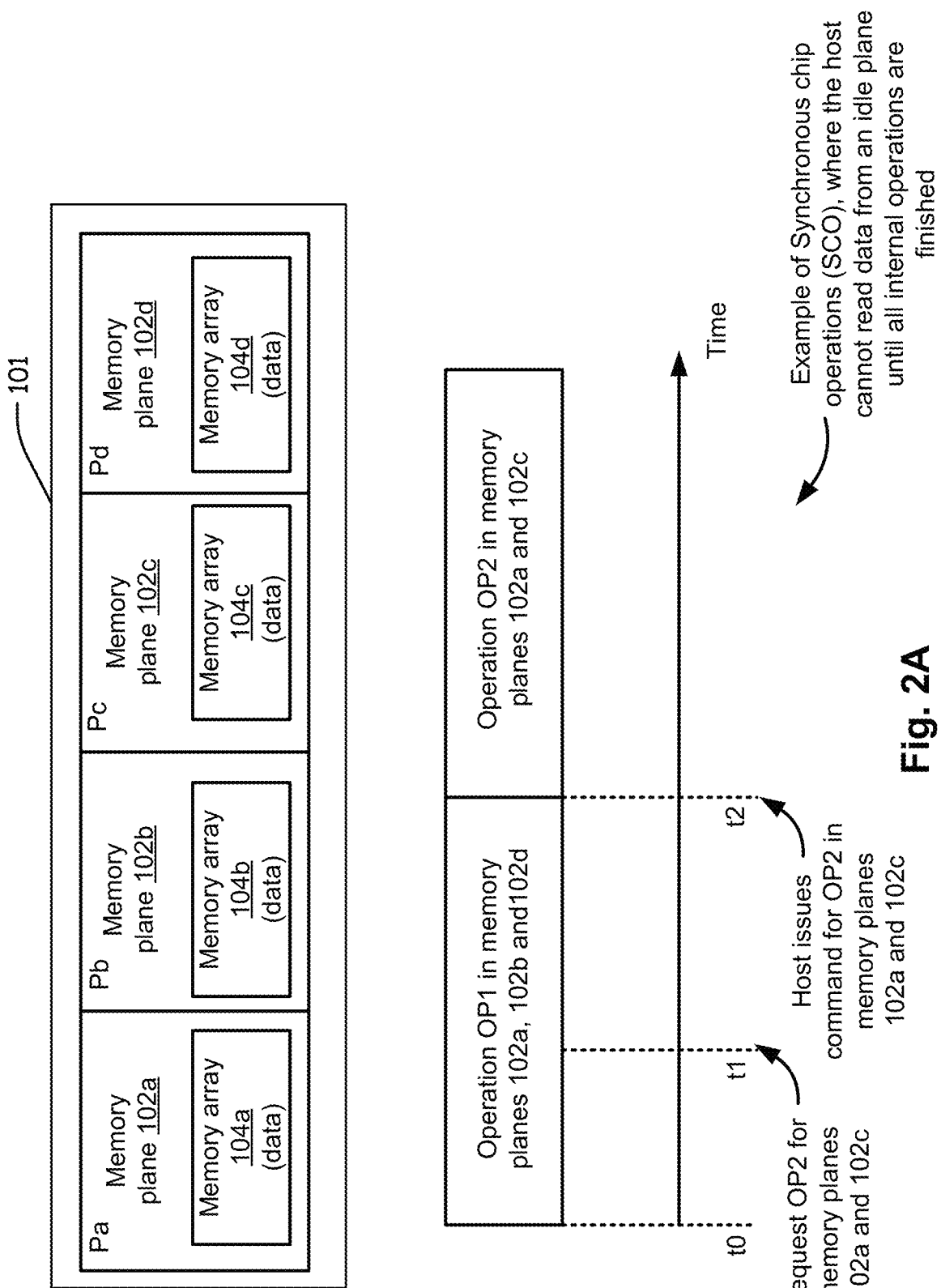
FIG. 2A illustrates an example SCO operation, to access data from memory arrays of two memory planes.

FIG. 2A illustrates an example synchronous chip operation (SCO), to access data from memory arrays 104b, 104d of two example memory planes 102b and 102d, respectively. In an example, an SCO operation is not confined to a specific memory plane or a memory array, and may engage multiple (such as all) memory planes and/or memory arrays.

In the example of FIG. 2A, four memory planes 102a, . . . , 102d (Pa to Pd) are assumed to be present in memory 101 (e.g., a multiple plane device that can include multiple cores for computation in memory (CIM) and in memory search (IMS)) which receives commands and data from a host (not illustrated), where the memory array 104a of the memory plane 102a can store data, the memory array 104b of the memory plane 102b can store data, the memory array 104c of the memory plane can store data and the memory array 104d of the memory plane 102d can store data. The data stored by the memory arrays 104a, 104b, 104c, and 104d can be any appropriate type of data.

For example, from time to and according to Operation OP1, data is being accessed from memory planes 102a, 102b and 102d. At time t1 and according to Operation OP2, a request to access data from memory planes 102a and 102c is issued. However, FIG. 2A illustrates an SCO, in which an operation executed in one memory plane is dependent on the status of other memory planes, e.g., due to one or more shared resources in the memory 101. For example, if an SCO is being executed in one memory plane, operations on one or more other planes cannot be executed. The host cannot read data from an idle memory plane until all internal operations are finished. After the SCO command is issued, the memory chip becomes busy, and no new embedded operation command can be accepted during the busy period. Depending on the command, the memory chip will return to ready state after the current embedded operations are either finished or the cache is ready (idle) for the data input/output for all planes. The host can issue the new embedded operation command which can be executed by the memory chip only when the chip is ready and idle (i.e., all planes are idle) after completion of the SCO, or in case of a SCO with background operation, the chip is ready and in operation (i.e., all planes are ready and in operation). For determining whether to issue a command invoking an SCO, the host can check the chip (or plane) busy status PRDY and the chip (or plane) in operation status PIO #. Because SCO concurrently engages multiple planes, SCO is also referred to as concurrent multiple plane operation. Operation OP1 and Operation OP2 can be any type of memory operation (e.g, read, write, etc.).

Accordingly, although Operation OP2 is requesting access to data from memory planes 102a and 102c at time t1, the request cannot be executed immediately, e.g., as an SCO (e.g., accessing data) is currently being executed in memory planes 102a, 102b and 102d according to Operation OP1. Once accessing of the data according to Operation OP1 is completed at time t2, access of data from memory planes 102a and 102c according to Operation OP2 starts from time t2.

Figure 2B:
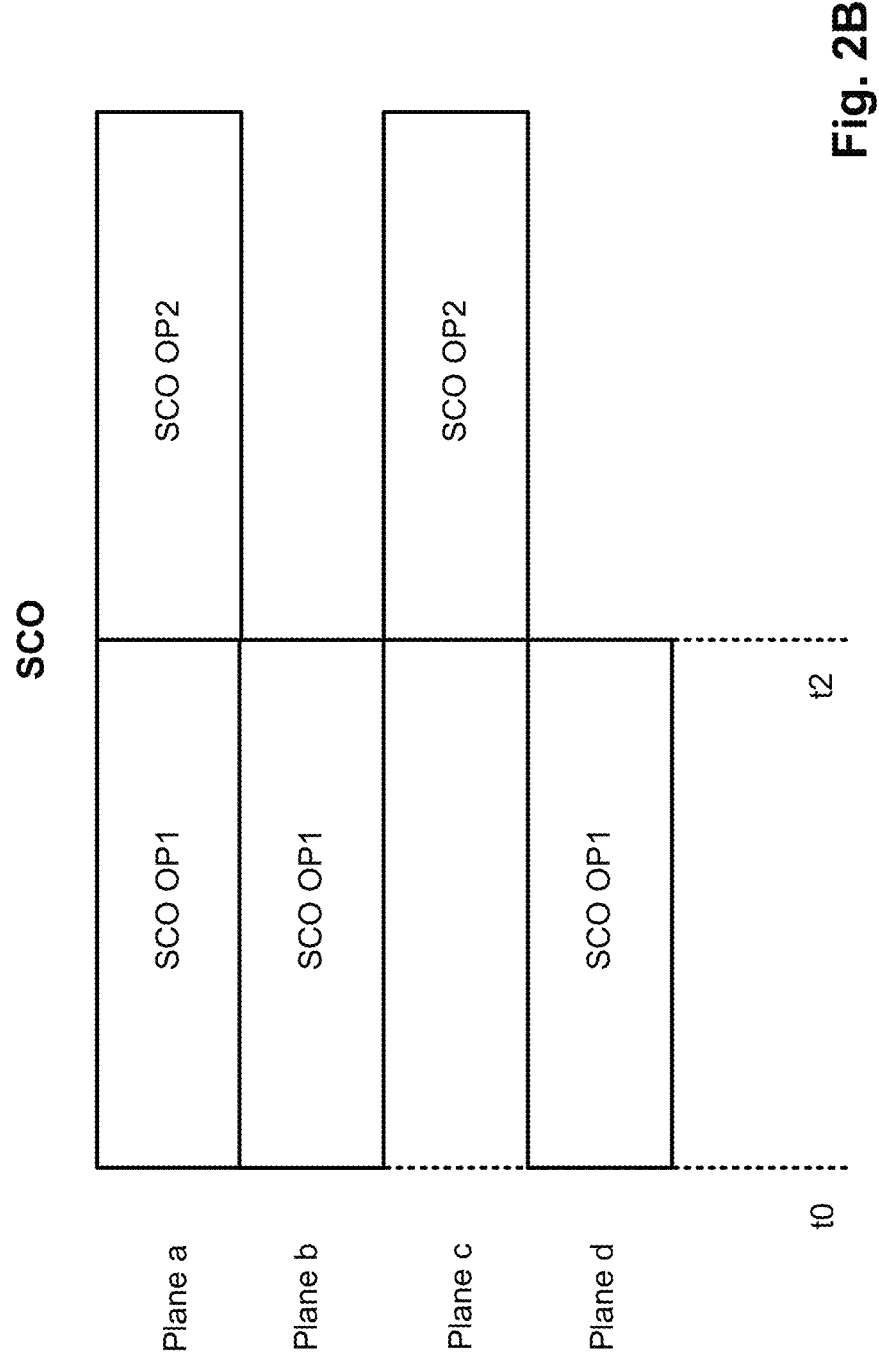
FIG. 2B illustrates an example first type of SCO operation, and 2C illustrates an example second type of SCO operation.

FIG. 2B illustrates an example of SCO. In the example, operations for each plane start at a same time, i.e., are synchronous.

Specifically, as illustrated in FIG. 2B, SCO OP1 (e.g., operations of a same type) are performed in each of memory planes a, b and d starting at time to. Once OP1 is complete in memory planes a, b and d, then OP2 can be performed in, for example, memory planes a and c. Other types of SCO will be apparent to those skilled in the art.

Asynchronous Independent Plane Operation (AIPO) or Overlapping Independent Plane Operation FIG. 3A illustrates an example asynchronous independent plane operation (AIPO), to access data from memory array 104a of memory plane 102a and memory array 104c of memory plane 102c. Similar to FIG. 2A, in the example of FIG. 3A, four memory planes 102a, . . . , 102d (Pa to Pd) are assumed to be present in the memory 101, where memory arrays 104a, 104b, 104c, 104d store data. The data stored by memory arrays 104a, 104b, 104c and 104d can be any appropriate type of data.

From time to and according to Operation OP1, data can be accessed from memory plane 102a. At time t1 and according to Operation OP2, a request to access data from the memory array 104c of the memory plane 102c can be issued. FIG. 3A illustrates an asynchronous independent plane operation (AIPO) (also referred to herein as a "overlapping independent plane operation" operation), in which an operation can be executed in one memory plane, independent of or without affecting the status of other memory planes. In AIPO, each plane can start any operation in any time, as long as the selected plane is ready for the embedded operation command. Thus, AIPO can be executed in a plane, regardless of the status of the other planes. That is, the host can issue the embedded operation command to a specific memory plane that can be executed by the memory, as long as the specific plane is ready (and regardless of readiness of other planes). For AIPO, the host can treat each plane as an independent memory unit, and the host checks the plane busy status PRDY and the plane in operation status PIO # for the progress of the operation in each plane. For example, if an AIPO operation is being executed in one memory plane, another AIPO operation on another memory plane can be executed in an overlapping manner. Thus, AIPO memory operations allow overlapping or at least in part simultaneous execution of operations in more than one memory plane.

Accordingly, as the data is requested at time t1, the request is executed immediately, e.g., as an AIPO (e.g., accessing data) is currently being executed in memory plane 102a. Thus, access of data from memory plane 102c starts from time t1, as illustrated in FIG. 3A. Thus, the host can access the non-busy plane (e.g., plane 102c) for new data, while another memory operation is still being executed in another busy plane (e.g., plane 102a).

FIG. 3B illustrates example AIPO operations. In an example, AIPO operations (OP1, OP2, OP3, OP4, OP5 and OP6) for different planes (memory planes a, b, c and d) can start at different times (t0, t1, t2, t3, t4 and t5). For example, OP1 starts at time to in memory plane a, OP2 starts at time t1 in memory plane c, OP3 starts at time t2 in memory plane b, OP4 starts at time t3 in memory plane d, OP5 starts at time t4 in memory plane a and OP6 starts at time t5 in memory plane b. As illustrated. The AIPO operations are asynchronous in nature.

Memory Embedded Operation Protocol Supporting Both SCO and AIPO Operations

As will be discussed in further detail herein in turn, in an embodiment, the technology described herein supports both SCO and AIPO operations.

Background and Foreground Memory Operation

Figure 4:
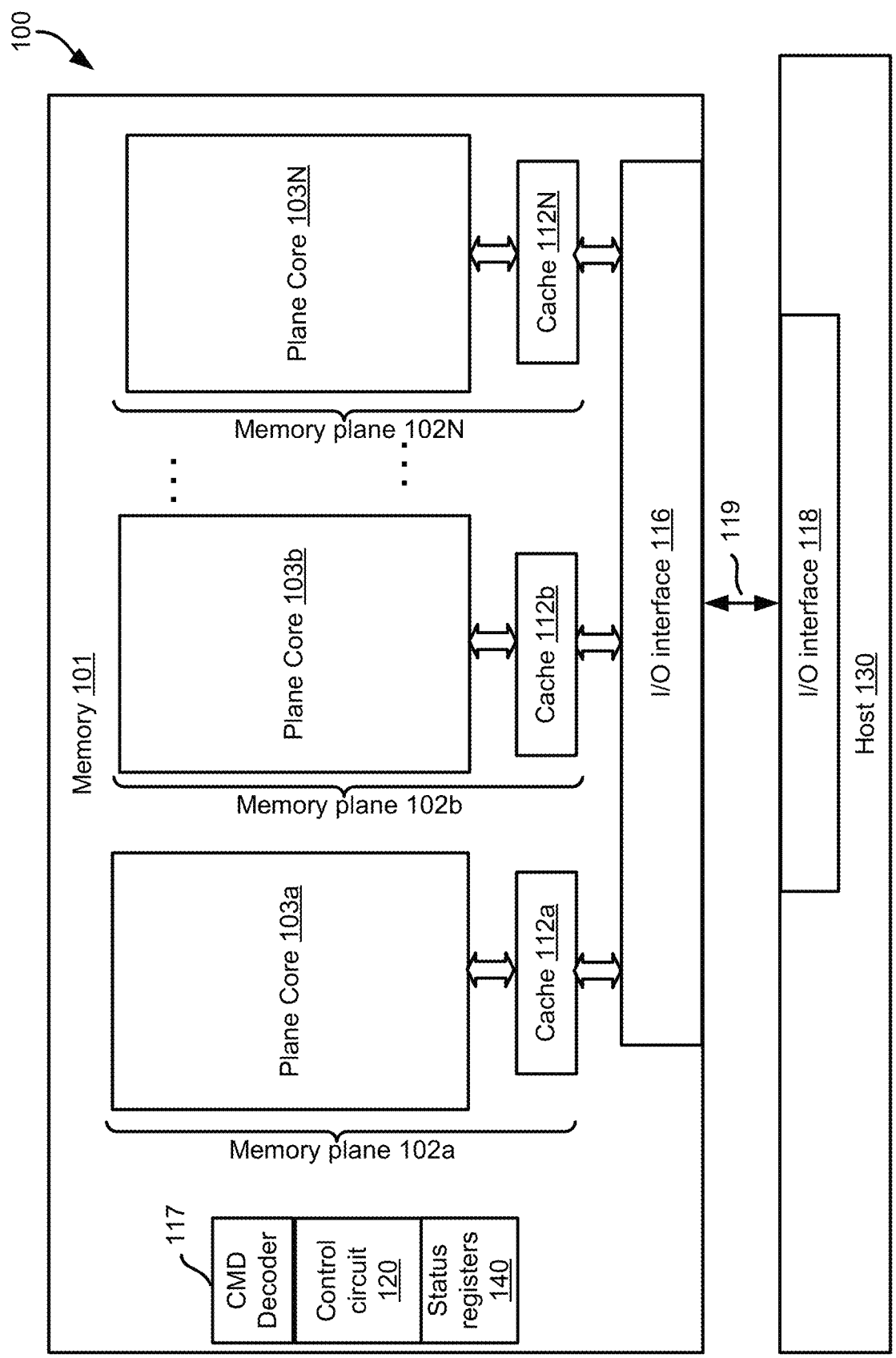
FIG. 4 illustrates an example memory system that can perform background memory operations and foreground memory operations.

FIG. 4 illustrates an example memory system 100 in order to explain the differences between background memory operations and foreground memory operations performed. The memory system 100 can be, for example, a multiple plane device that can include multiple cores for computation in memory (CIM) and in memory search (IMS) and can include error free chips, such as enabled by an ECC circuit. Any memory system described herein can be the same type of memory system as the memory system 100. IMS operations or commands allow a host to input a target data for a data search and the memory system 100 can search for matched or highly matched data in a target data area and then further report the data location to the host. One application of the IMS operations or commands can include facial recognition.

Before describing the background operations of FIG. 4 the overall architecture of the memory system 100 that is illustrated in both of FIGS. 4 and 5 will be described. The memory system 100 can include a memory system 101 including multiple memory planes 102a, 102b, . . . , 102N (similar to integrated memory device 50 of FIG. 1B).

Elements referred to herein with a common reference label followed by numbers or letters may be collectively referred to by the reference label alone. For example, memory planes 102a, 102b, . . . , 102N may be collectively and generally referred to as memory planes 102 (or as memory planes 102(a-N)) in plural, and as memory plane 102 in singular.

The memory 101 may be different from another integrated circuit that includes the host 130. In another embodiment, the host 130 and the memory 101 are on the same single IC chip or multichip package.

The memory 101 can be of any appropriate type, such as, for example, a non-volatile NAND memory, a non-volatile NOR memory, or the like. In an example, the memory 101 is a three-dimensional (3D) memory comprising vertically stacked memory cells in individual planes. As an example, the memory 101 can be a NAND flash memory.

Each memory plane 102 (memory planes 102a, 102b, . . . , 102N) includes a corresponding plane core 103 (plane core 103a, 103b, . . . , 103N). Each plane core 103 can be a memory unit to store data, an error free memory unit, which includes an ECC circuit to correct the data, a CIM unit to execute a data computation function, a memory unit that can perform in memory searching, etc. Each respective plane core 103 communicates with a respective cache 112 (cache 112a, 112b, . . . , 112N). The caches 112, which can be a cache memory or a set of registers, communicate with the I/O interface 116. Each respective cache 112 can store data from the host 130 or the respective plane core 103. The stored data can be raw data or calculated data from a memory array. When the cache 112 is a set of registers, the set of registers can be groups of registers that store a result from an operation such as an IMS result or a CIM result. Each respective cache 112 can be referred to as a specific set of resources.

If a specific set of resources (e.g., a cache 112a that can be a cache memory or a set of registers) is controlled by a corresponding plane core (e.g., plane core 103a), then the host 130 cannot access the memory plane (e.g., memory plane 102a). This can be referred to as a foreground operation period, during which the memory plane is busy (e.g., both the cache 112a is controlled by the plane core 103a and the plane core 103a is in operation). If the specific set of resources is not being controlled by the corresponding plane core, then the memory plane is ready (e.g., a background operation period or an idle period). In other words, a busy and ready status of the memory plane is dictated by whether or not the corresponding plane core is controlling the specific resources of the corresponding plane. If the specific resources are being controlled, then the memory plane is busy and if the specific resources are not being controlled, then the memory plane is ready. If a plane core is in operation, then the in operation/idle status of the corresponding memory plane is "in operation" (foreground and/or background operation period), otherwise, the status of the corresponding memory plane is idle (idle period).

In this example, the memory planes are configured to have two sets of status indicators. In other embodiments there may be more than two sets of status indicators, where each status indicator can be one or more bits.

The memory 101 further comprises one or more status control circuits 140, e.g., to generate one or more status signals for each plane (Plane x, which x can go from 0 to N−1 for a memory having N planes), such as plane busy status (PxRDY), plane in operation status (PxIO #), etc., as will be discussed herein later. For each respective memory plane (e.g., memory plane 102a), the plane busy status (PxRDY) indicates busy (0) when a specific set of resources (e.g. a corresponding cache 112a) is controlled by the corresponding plane core (e.g., plane core 103a) and indicates ready (1) when the specific set of resources is not controlled by the corresponding plane core. When the memory plane is busy, the host 130 cannot access the memory plane (e.g., during a foreground operation period). When the memory plane is ready (1), the host 130 can access the memory plane (e.g., during a background operation period or idle period). Further, for each respective memory plane (e.g., memory plane 102a), the in operation status (PxIO #) indicates in operation (0) when the respective plane core (e.g., plane core 103a) is in operation (foreground or background operation period) and indicates idle (1) when the plane core is not in operation.

The memory 101 can further comprise one or more hardware notification pins, which dedicatedly outputs status of one or more signals.

The memory 101 further comprises input/output (I/O) interface 116 coupled to the caches 112a, . . . , 112N (also referred to as specific sets of resources). Individual cache 112 receives data from the I/O interface 116 and writes data to the corresponding plane cores 103, and receives data from the corresponding plane cores 103 and writes data to the I/O interface 116.

In an example, the host 130 generates and transmits memory commands to the memory 101, stores data to the memory 101, and receives data from the memory 101. A host can be a memory controller implementing a flash translation layer, for example.

In an example, the memory 101 communicates with the host 130, e.g., via a communication link 119. The communication link 119 can be any appropriate communication link, such as a link over a wire connection. The host 130 includes an I/O interface 118, which is coupled to the I/O interface 116 of the memory 101 via the communication link 119. Thus, the host 130 stores data to a memory array of a memory plane and reads data from the memory array of the memory plane through the I/O interface 118, the communication link 119, the I/O interface 116, a corresponding cache 112, and a corresponding page buffer 108 associated with the memory plane.

In an embodiment, the memory 101 also comprises a control circuit 120, which controls various aspects of operations of the memory 101. In an embodiment, the control circuit 120 issues various memory status commands, as will be discussed herein in turn.

In this example, the memory 101 includes a command decoder 117 in communication with the I/O interface 116. The command decoder 117 decodes commands received at the I/O interface in cooperation with the status control circuits 140. The command decoder 117 signals the control circuits 120, which provide circuits for execution of operations identified by the commands.

The memory 101 has many other components that are not illustrated for purposes of illustrative clarity and in order to not obfuscate the teachings of this disclosure.

As previously mentioned, the memory system 100 can perform background memory operations and foreground memory operations.

Background memory operations (also referred to as background operations) are those memory operations (of the memory 101 of the memory system 100), which during execution, a select memory command can accept while the set of resources (cache 112) is not being controlled by the corresponding plane core. In other words, even though the corresponding plane core 103 might be performing background operations, during the background operations (e.g., while background operations are being performed), the host 130 can access or issue a new command to the memory plane 102 by way of, for example, the cache 112. For example, the host 130 can provide a new command to the cache 112 during a background operation. Further, for example, selected memory commands (operations) can be accepted while PxRDY is ready (1), even though background operations are still being performed and the corresponding plane core is in operation. Once the background operation is complete, any memory command can be accepted. During a background operation PxRDY indicates ready (1) because the specific set of resources (e.g., the cache 112) is not being controlled by the plane core and the PXIO # indicates in operation (0) because the plane core 103 is busy.

Foreground memory operations (also referred to as foreground operations) are those memory operations (of the memory 101) during which only system management commands can be accepted because the set of resources (cache 112) is being controlled by the plane core 103 (e.g., PxRDY=busy (0)) and because the plane core is in operation (PxIO #=in operation (0)). During foreground operations the host 130 cannot access or issue a new command to the memory plane 102, except for system management commands. For example, during foreground operations the cache 112 cannot be accessed by the host 130 because the cache 112 can be occupied by the foreground operation. System management commands can be issued at any time.

Figure 5:
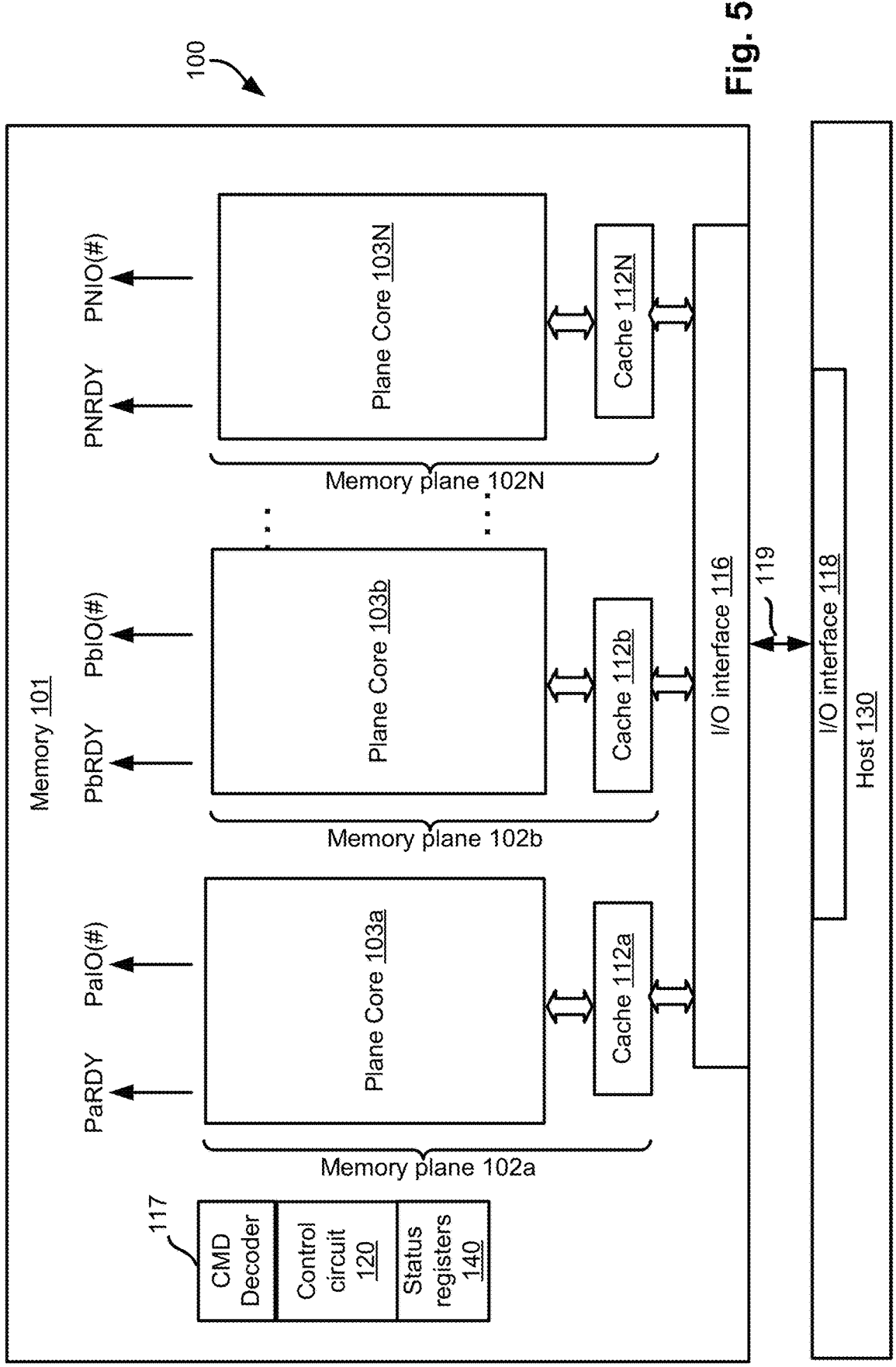
FIG. 5 symbolically illustrates example memory plane busy status signals (PxRDY) and example memory plane in operation status signals (PxIO #) for various memory planes.

FIG. 5 symbolically illustrates example memory plane busy status signals (PxRDY) and example memory plane in operation status signals (PxIO #) for various memory planes. All other reference elements of FIG. 5 are the same as that of FIG. 4.

An acceptance/denial of a first set of commands (or first command) depends on the operations of all of the memory planes 102 and the acceptance/denial of a second set of commands (or second comment) depends on the operation of a target memory plane. Based on the fact that the memory system 100 can know of the ongoing operations being performed or executed thereon, a command can be accepted or denied according to the following rules: (i) if there is no operation on any plane core 103 (i.e., all in operation/idle status signals=idle), then both SCO ($1^{st}$ type) and AIPO ($2^{nd}$ type) commands can be accepted; (ii) if an SCO operation is still ongoing (all in operation/idle status signals=in operation), a selected SCO command can be accepted if all memory planes are ready or a selected AIPO commend (without background operation) may be accepted to a memory plane identified as being ready; and (iii) if an AIPO operation is still ongoing (at least in operation/idle status signal=in operation for one plane core), then any AIPO command can be accepted for an idle plane core (in operation/idle status=idle for the target plane core), a selected AIPO command can be accepted for a ready memory plane with an in operation plane core and all SCO commands are denied.

Categories of Memory Commands and Memory Operations

Table 1 herein below illustrates various example memory commands, and their corresponding types and categories, that can be implemented by the memory system 100 discussed throughout this disclosure.

TABLE 1

| Serial No. | Memory operation command | Operation type | With or without background operations | Category |
|---|---|---|---|---|
| 1 | Reset | (SCO) System management | Without | 3 |
| 2 | Reset LUN | (SCO) System management | Without | 3 |
| 3 | Reset plane | (AIPO) System management | Without | 3 |
| 4 | Page read | AIPO | Without | 4 |
| 5 | Cache read random | AIPO | With | 5 |
| 6 | Cache read end random | AIPO | Without | 4 |
| 7 | In Memory Search (IMS) | AIPO | With | 5 |

TABLE 1-continued

| Serial No. | Memory operation command | Operation type | With or without background operations | Category |
|---|---|---|---|---|
| 8 | IMS resume | AIPO | With | 5 |
| 9 | Page program | SCO | Without | 1 |
| 10 | Cache program | SCO | With | 2 |
| 11 | IMS program | SCO | Without | 1 |
| 12 | Cache IMS program | SCO | With | 2 |
| 13 | Block erase | SCO | Without | 1 |
| 14 | Multiple plane page program | SCO | Without | 1 |
| 16 | Multiple plane cache program | SCO | With | 2 |
| 16 | Multiple plane block erase | SCO | Without | 1 |

Category 1: SCO command without background operations.
Category 2: SCO command with background operations.
Category 3: System management command without background operations.
Category 4: AIPO command without background operations.
Category 5: AIPO command with background operations.

A first column of Table 1 lists a serial number corresponding to various memory commands. A second column of Table 1 lists the memory commands. A third column of Table 1 indicates an operation type, such as whether a memory command is AIPO or SCO. For example, the "cache read random" memory command (e.g., which may be used to read data from cache) is an AIPO memory command.

A fourth column of Table 1 indicates whether a memory command includes, requires and/or causes background operations. If an operation is identified as being "without" background operations, then the operation does not include any background operations (but it does include foreground operations). For example, during an operation (e.g., a foreground operation) that is "without" background operations, new command acceptance is not allowed (except for system management commands), the busy status signal PxRDY indicates busy and the in operation status signal PxIO # indicates in operation. If an operation is identified as being "with" background operations, then the operation includes background operations. For example, during an operation (e.g., a foreground operation) that is "with" background operations, during the foreground operation new command acceptance is not allowed (except for system management commands), the busy status signal PxRDY indicates busy and the in operation status signal PxIO # indicates in operation, then after the foreground operation is, for example, complete, new command acceptance is allowed, the busy status signal PxRDY indicates ready, but the in operation status signal PxIO # indicates in operation.

A fifth column of Table 1 categorizes each memory command in a corresponding one of five possible categories. The last row of Table 1 identifies the possible categories. For example, category 1 refers to SCO memory commands without (e.g., that do not include) background operations, category 2 refers to SCO memory commands with (e.g., that include) background operations, category 3 refers to system management commands, category 4 refers to AIPO memory commands without (e.g., that do not include) background operations, and category 5 refers to AIPO memory commands with (e.g., that include) background operations.

If, for example, a background operation of the cache read operation is ongoing: (i) a cache read random command can be issued/accepted, (ii) a cache read end random command can be issued/accepted, and (iii) a system management command (e.g., reset plane command) can be issued/accepted. Further, for example, if a background operation of the cache program operation is ongoing: (i) a page program command can be issued/accepted, (ii) a cache program command can be issued/accepted, and (iii) a system management command (e.g., a reset command or a reset LUN command) can be issued/accepted.

Memory Plane Busy Status Signal (PxRDY) and Memory Plane in Operation Status Signal (PxIO #)

In an embodiment, various planes of the memory 101 (or the control circuit 120) issue various status signals, e.g., to indicate whether a first set of resources and second sets of resources in a corresponding memory plane 102 are ready to execute new memory operations, or are busy executing current memory operations and cannot accept new memory operations.

For example, one such status signal is a memory plane busy status signal (PxRDY) that is issued for various memory planes Px, where the "x" in Px is an index of a corresponding memory plane. For example, for the memory plane 102a, the memory plane busy status signal is PaRDY; for the memory plane 102b, the memory plane busy status signal is PbRDY; for the memory plane 102N, the memory plane busy status signal is PNRDY, and so on. In general, the signal PxRDY indicates whether a memory plane 102x is in a busy state or a ready state, as will be discussed in further detail herein later.

For example, when the PxRDY signal indicates that the memory plane is in the busy state (e.g., a value of 0), the plane cannot be accessed (while a foreground operation is ongoing in the plane) and when the PxRDY signal indicates that the memory plane is not in the busy state (e.g., is in a ready state; represented by a value of 1), the plane can be accessed and receive a new command (no foreground operation is ongoing in the plane). Put another way, when a foreground operation is being performed the PxRDY signal will indicate that the particular plane is in the busy state (e.g., a value of 0) and when a foreground operation is not being performed the PxRDY signal will indicate that the particular plane is in the ready state (e.g., a value of 1).

Another such status signal is a memory plane in operation status signal (PxIO #) that is issued for various memory planes, where the "x" in PxIO # is an index of a corresponding memory plane. For example, for the memory plane 102a, the plane in operation status signal is PaIO #; for the memory plane 102b, the plane in operation status signal is PbIO #; for the memory plane 102N, the plane in operation status signal is PNIO #, and so on. In general, the signal PxIO # indicates whether a memory plane is in operation or is idle. For example, when the PxIO # signal indicates that the memory plane is in operation (e.g., a value of 0), there is either a foreground or background operation that is ongoing in the selected plane and when the PxIO # signal indicates that the memory plane is idle (e.g., not in operation; a value of 1), no operations are ongoing in the memory plane.

Whether a specific memory plane can receive and execute a new memory command, at any given time, is based on the PxRDY and/or the PxIO # for the specific memory plane, as well as the PxRDY and/or the PxIO # for the various other memory planes.

FIG. 5 symbolically illustrates the memory plane busy status signal (PxRDY) and memory plane in operation status signal (PxIO #) for various memory planes 102 of the memory 101 of the system 100. This is merely an example of a memory 101 that provides status signals PxRDY and PxIO #. As illustrated, each memory plane has a corresponding PxIO # signal and a PxARDY signal. Note that in an example, the control circuit 120, or a memory plane 102, or another appropriate component of the memory 101, issues the PxRDY and PxIO # signals for the memory plane 102.

The memory plane busy status signal (PxRDY) can also be referred to simply as a plane status signal, and the memory plane in operation status signal (PxIO #) is also referred to simply as a plane operation status signal.

In an example, bits representing the status signals PxRDY and PxIO # can be generated by the status control circuits 140.

In general, if a background operation in a memory plane 102x is being currently executed (where background operations have been discussed herein earlier, e.g., with respect to FIG. 4), the PxIO # status signal is in an in operation state, which is indicated by, for example, PxIO # being 0. This is because background operations in a memory plane 102x implies that the memory plane 102x is participating in the background operations. Otherwise, if the memory plane 102x is not undergoing any operation (e.g., any background operation), the corresponding PxIO # status signal is in an idle state, which is indicated by, for example, PxIO # being 1.

Thus, for a memory plane 102x:
PxIO #=0→indicates memory plane 102x is in an in operation state because a foreground operation or a background operation is being performed in the plane; and
PxIO #=1→indicates memory plane 102x is in an idle state because no foreground operations or background operations are being performed in the plane.

For a memory plane 102x:
PxRDY=0→indicates memory plane 102x is in a busy state meaning that the memory plane cannot be accessed while a foreground operation is being performed in the plane and therefore cannot accept a new command when a foreground operation is being performed; and
PxRDY=1→indicates memory plane 102x is in a ready state meaning that the memory plane can be accessed and can accept a new command because a foreground operation is not being performed in the plane.

SCO and AIPO memory commands that do not include background operations (see Table 1) can be performed in a particular scenario, which is discussed in more detail below with reference to FIG. 12. The scenario includes: PxRDY=busy (0); and PxIO #=in operation (0). This configuration excludes: (i) PxRDY=busy (0); PxIO #=idle (1) and (ii) PxRDY=ready (1); PxIO #=in operation (0).

SCO and AIPO memory commands that include background operations (e.g., see Table 1) can be performed in different status signal scenarios, which are discussed in more detail below with reference to FIG. 12. Those configurations include: (i) PxRDY=busy (0); PxIO #=in operation (0); and (ii) PxRDY=ready (1); PxIO #=in operation (0). These two configurations exclude: (i) PxRDY=busy (0); PxIO #=idle (1).

SCO and AIPO memory commands that can operate in an "overlapping period in the background operation" can be performed in the scenario where PXRDY=Busy (0) and PxIO #=In Operation (0). An overlapping operation period can begin as a first new command is accepted by the chip during the background operation and it ends if there is no pending operations (suspended or waiting operations). During the overlapping operation period, there is at least one pending operation waiting in line. If the pending operation has higher priority, then the on-going operation will be suspended to execute the high priority operation (see FIG. 21) and will be resumed after all high priority operations are done. Otherwise, the pending operation is executed after the current operation is done (see FIG. 20).

When No Background Operation is Ongoing (i.e., PxRDY=PxIO #=Ready/Idle for a Specific Plane), and an AIPO Command can be Issued by a Host, and Accepted at the Memory Device, to the Specific Plane.

When no background operation is ongoing in a specific plane (i.e., PxRDY=PxIO #=1 or ready/idle for the specific plane), the host 130 can issue an AIPO command to the non-busy specific plane that can be executed. That is, when PxRDY=PxIO #=1, the host 130 can issue an AIPO command to, and the AIPO command can be accepted by, the memory plane 102x.

Figure 6:
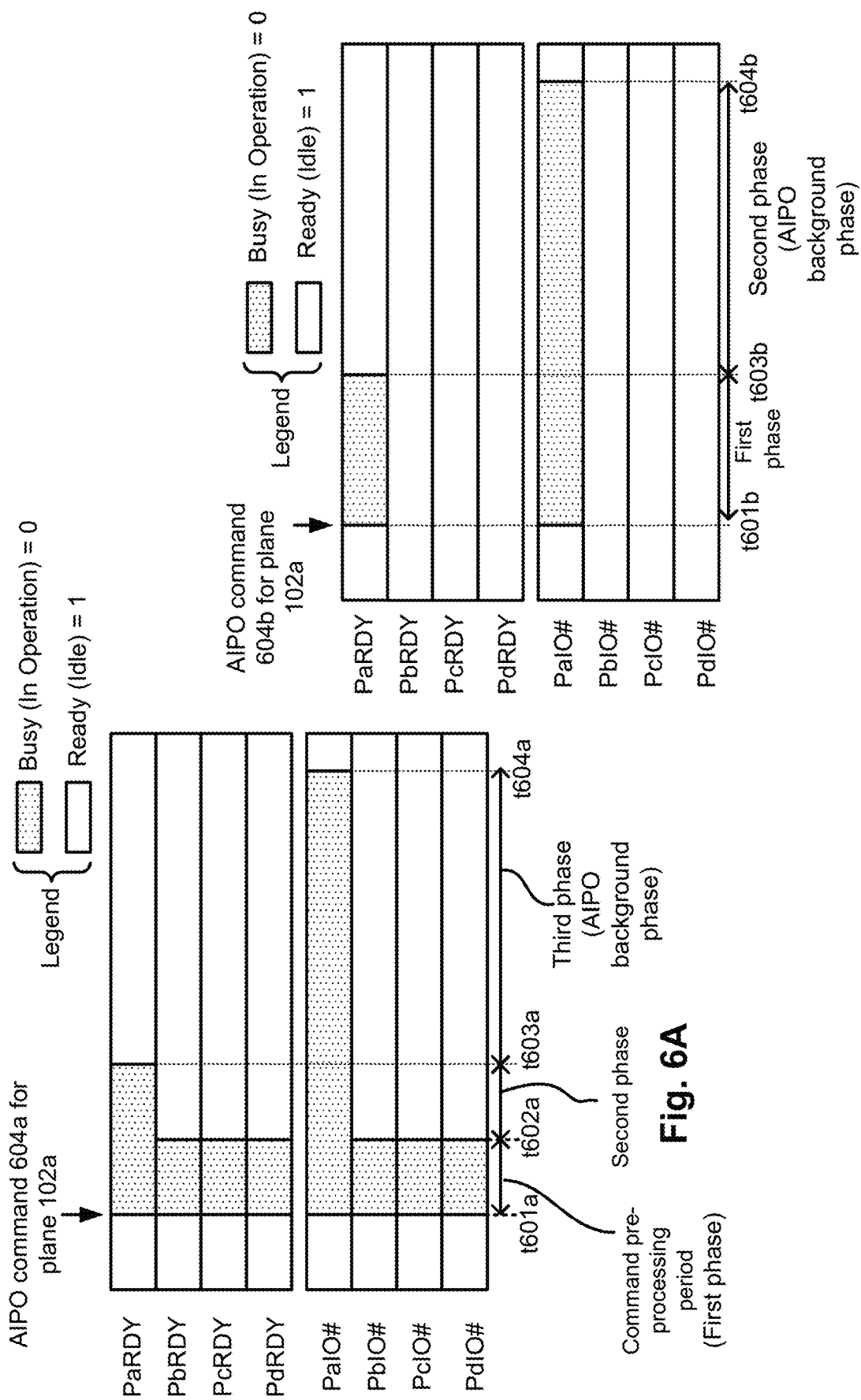
FIG. 6A illustrates an example timing diagram of a plane busy status signal and a plane in operation status signal, in response to receiving an AIPO command, where execution of the AIPO command includes a command pre-processing period during which all planes are in a busy (in operation) state.
FIG. 6B illustrates an example timing diagram of a plane busy status signal and a plane in operation status signal, in response to receiving an AIPO command, where execution of the AIPO command lacks any command pre-processing period during which all planes are in a busy (in operation) state.

After the AIPO command is issued to a specific plane (e.g., plane 102a), there are one or more possible options in which the AIPO command in being executed: e.g., option A illustrated in FIG. 6A, and option B illustrated in FIG. 6B. The choice of option A of FIG. 6A or option B of FIG. 6B is implementation specific, and can be based on the circuit design choice of the memory 101.

Option A illustrated in FIG. 6A: The plane ready status of all planes transitions to a busy state for a "short period of time" (PxRDY=0, for x=a, . . . , N) to process the command. The "short period of time" is also referred to herein as "command pre-processing period," which is a first phase of execution of the AIPO command. After this first phase, the plane busy status for the non-selected planes (e.g., planes to which the AIPO command is not issued) represent the current status of the non-selected planes and becomes independent of the selected plane. Thus, after time t602a at the end of the command pre-processing period, PaRDY=0 for the selected or busy plane Pa to which the AIPO command is issued, and PbRDY, PcRDY and PdRDY=1 for all other non-selected and non-busy memory planes. A length of the command pre-processing period is implementation specific, e.g., is based on a design of the circuits of the memory and other implementation details.

FIG. 6A illustrates an example timing diagram of a plane status signal and a plane in operation status signal, in response to receiving an AIPO command 604a, where execution of the AIPO command 604a includes a command pre-processing period during which all planes are in a busy or in operation state. Note that in the timing diagram of FIG. 6A and various other figures, a dotted rectangle corresponds to an associated signal being busy (or in operation), and a non-shaded rectangle corresponds to an associated signal being ready (i.e., not busy) (or idle), as illustrated in the "Legend" section of FIG. 6A. In FIG. 6A, four memory planes 102a, 102b, 102c, 102d are assumed, although there may be any different number of memory planes. Accordingly, four plane status signals PaRDY, PbRDY, PcRDY, and PdRDY are illustrated, and four array status signals PaIO #, PbIO #, PcIO #, and PdIO # are illustrated. In FIG. 6A, prior to time t601a, all signals PaRDY, PbRDY, PcRDY, PdRDY, PaIO #, PbIO #, PcIO #, and PdIO # are in a ready (idle) state.

At t601a, an AIPO command 604a for plane 102a is received. In the example of FIG. 6A, immediately after receiving the AIPO command 604a for plane 102a, all the plane status signals become busy and the plane in operation status signals become in operation from time t601a to time t602a, which is referred to as the command pre-processing period or a first phase of the execution cycle of the AIPO command 604a.

Subsequently, the plane busy status signals and the plane in operation status signals for planes 102b, 102c, and 102d become ready (idle) at time t602a (e.g., as the AIPO command 604a is issued for memory plane 102a). The PaRDY and PaIO # continue to be busy (in operation) after time t602a. Thus, the memory plane 102a, including the corresponding memory array 104a, are executing the AIPO command 604a. At time t603a, the memory plane 102a becomes ready to accept new commands, and the PaRDY becomes ready. The time period between time t602a and t603a is also referred to as a second phase of the execution cycle of the AIPO command 604a. Note that background operations for the AIPO command 604a may still be ongoing in the memory plane 102a, and accordingly, PaIO # is still in operation. Finally, the background operations for the AIPO command 604a end at time t604a, and the array status signal PaIO # now transitions from in operation to idle. The time period between time t603a and t604a, when only background operations of the AIPO command 604a are being executed, is also referred to as an AIPO background operation phase or a third phase of the execution cycle of the AIPO command 604a.

Option B illustrated in FIG. 6B: In this option, the plane busy status and the plane in operation status of the selected plane (e.g., for which the AIPO command is issued) becomes busy (in operation) (PxRDY and PxIO # change from 1 to 0), and the plane ready status and the plane in operation status of other non-selected planes is not impacted. Thus, unlike option A discussed above with respect to FIG. 6A, option B lacks the command pre-processing period. FIG. 6B illustrates another example timing diagram of a plane status signal and the plane in operation status signal, in response to receiving an AIPO command 604b, where execution of the AIPO command 604b lacks any command pre-processing period during which all planes are in a busy state. Contrary to the example of FIG. 6A, in the example of FIG. 6B, only the selected plane (for which the AIPO command 604b is issued) has its plane status signal and plane in operation status signal (i.e., PaRDY and PaIO #) transition to busy (in operation), and signals of all other planes remain ready. Accordingly, PaRDY is busy from t601b to t603b, which is a first phase of the execution cycle of the AIPO command 604b. PaIO # is in operation from t601b to t604b (e.g., as also discussed with respect to FIG. 6A), which is the AIPO background operation phase or second phase of execution cycle of the AIPO command 604b.

Thus, comparing FIGS. 6A and 6B, in FIG. 6A, all plane busy and plane in operation signals are busy (in operation) for a short period of time (i.e., during the command pre-processing period) after the AIPO command 604a is issued; whereas in FIG. 6B only the selected plane busy and plane in operation status signals become busy after the AIPO command 604b is issued. FIG. 6B, thus, achieves higher operational efficiency than FIG. 6A, as the non-selected planes are always available in FIG. 6B. However, implementing the timing diagram of FIG. 6B requires a more complex circuit in the memory 101, e.g., compared to the case of FIG. 6A. Thus, whether the timing diagram of FIG. 6A and FIG. 6B is achieved is implementation specific, based on the design of the memory 101.

When No Background Operation is Ongoing (i.e., PxIO # is Idle for all Planes), and an SCO Command is Issued for a Specific Plane In an example, the host 130 can issue an SCO command to the memory 101 when all of the planes are idle (e.g., PxIO #=1 for all planes). After the SCO command is issued, all planes become busy (PxRDY=PxIO #=busy (in operation) for all planes) and no further commands can be issued by a host 130, and accepted at the memory device 101, until all planes become ready (PxRDY=ready for all planes).

Figure 7:
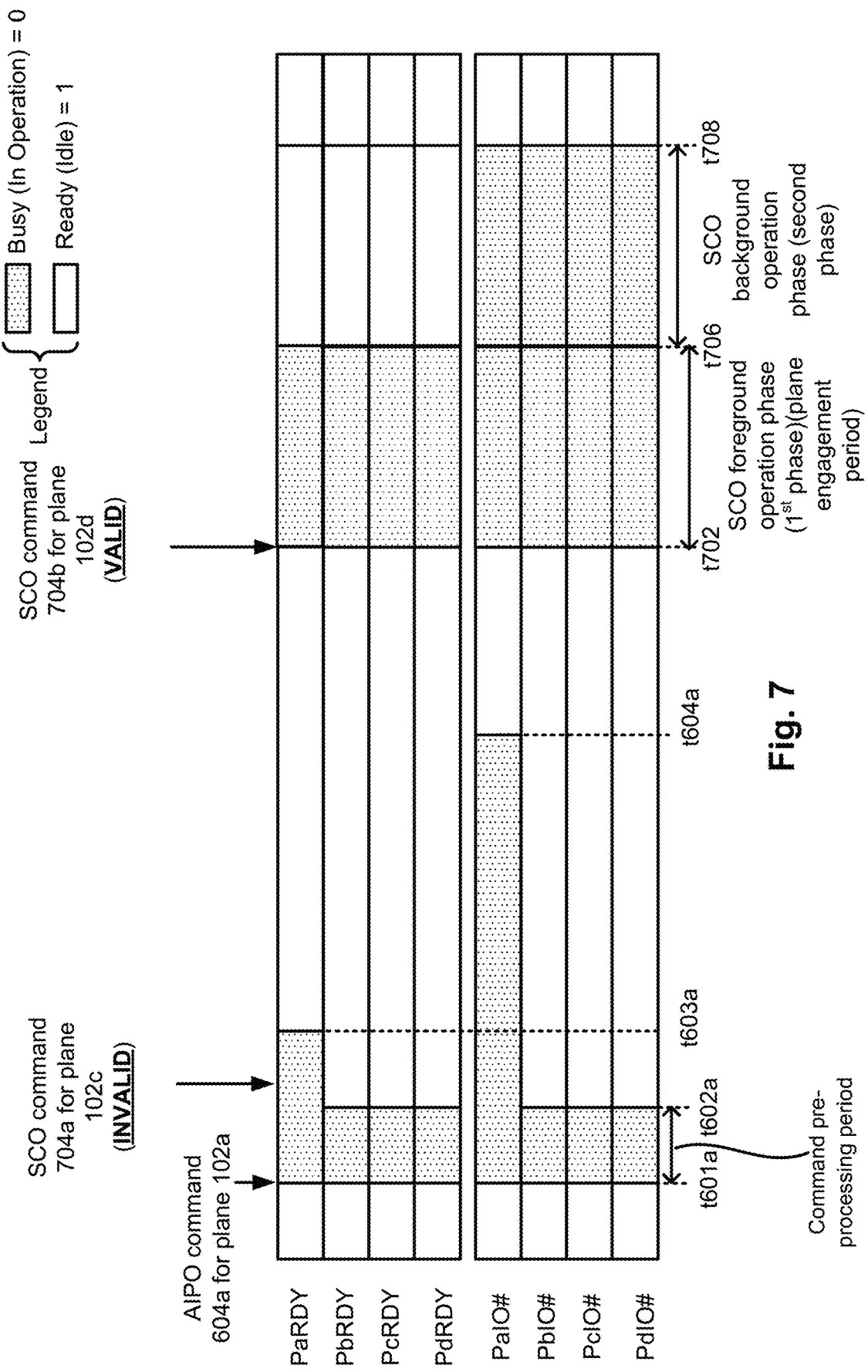
FIG. 7 illustrates an example timing diagram of a plane busy status signal and a plane in operation status signal, in response to receiving an SCO command.

FIG. 7 illustrates an example timing diagram of a plane busy status signal and a plane in operation status signal, in response to receiving an SCO command. In this example, similar to FIG. 6A, assume that in response to an AIPO command for plane 102a at time t601a, the PaRDY is busy from t601a to t603a, the PaIO # is in operation from t601a to t604a, and the plane busy and the plane in operation status signals for other planes are busy (in operation) from t601a to t602a, e.g., for reasons discussed with respect to FIG. 6A.

Assume that an SCO command 704a for plane 102c is issued between t602a and t603a. Because at least one plane is not ready at this time (e.g., PaRDY is busy), the SCO command 704a for plane 102c is declared invalid, as the host 130 can issue an SCO command to the memory 101 only when all the planes are ready for the new command and there is no AIPO background operation.

Assume that an SCO command 704b for plane 102d is issued after time t604a, e.g., at time t702. Because all planes are now ready (idle) and there is no ongoing background operation, the SCO command 704b for plane 102d is executed. All plane busy and plane in operation status signals transition to busy status from time t702. The plane ready status remains busy from time t702 to t706, where the time period between time t702 and t706 is also referred to as "SCO foreground operation phase", "plane engagement period" or a "first phase".

In an example, during the plane engagement period, the SCO engages resources of all the memory planes (or engages common resource of the memory planes), so that no other operation can be executed-hence, the PxRDY for all planes are busy during this period. In an example, during the plane engagement period, the PxRDY for all planes are busy and all the planes are shown to be engaged, to avoid any command input until the memory 101 is ready for the next command. Note that any AIPO (or SCO) command issued during the plane engagement period is declared invalid (as also discussed with respect to FIG. 16A herein later).

At time t706, the cache (e.g., non-background) operations associated with the SCO command 704b for plane 102d may be completed, and accordingly, the plane busy status signal may be ready for all planes from time t706 (e.g., PxRDY=ready, for x=a, . . . , d). However, as background operations may be ongoing in the selected plane 102d, all the plane in operation status signals for all planes are still busy (e.g., PxIO #=busy, for x=a, . . . , d). At time t708, the SCO command 704b for plane 102d may be completed, and accordingly, all the plane in operation status signals for all planes become idle (e.g., PxIO #=idle, for x=a, . . . , d).

Thus, during time period between time t706 and time t708, plane in operation status signals are in operation for all planes, while the plane busy status signals are ready for all planes. This period is referred to herein as the SCO background operation phase or a second phase of the execution cycle of an SCO command.

When Background Operation is Ongoing (i.e., PxIO #=in Operation) for at Least One Plane, and an AIPO Command is Issued for a Specific Plane that does not have an Ongoing Background Operation Assume that a background operation is ongoing for at least one plane, such as plane 102a, i.e., PaIO #=0 (e.g., in operation) for that plane. One or more other planes (such as at least plane 102b) do not have ongoing background operations (e.g., PbRDY=PbIO #=1 or ready (idle)). That is, the one or more other planes (such as at least plane 102b) are idle or ready planes. In such a scenario, the host 130 can issue an AIPO command to the idle plane.

FIG. 8A illustrates an example timing diagram depicting issuance of an AIPO memory command to an idle, while another in operation plane has ongoing background operations, where the AIPO memory command of FIG. 8A causes a command pre-processing period. For example, in FIG. 8A, just prior to time t802a, a background operation was ongoing in plane 102a (i.e., PaIO #=in operation), and other planes were ready (e.g., PyRDY=PyIO #=ready (idle), where y=b, c, d). At time t802a, an AIPO command 804 for plane 102b is issued by the host 130. Accordingly, from t802a to t803a, PxRDY and PxIO #(where x=a, . . . , d) all planes become busy (in operation) for a short period of time (i.e., the command pre-processing period). After the command pre-processing period (discussed with respect to FIG. 6), PaRDY, PcRDY, PdRDY, PcIO #, and PdIO # transitions to ready (idle). PbRDY and PbIO # remain busy (in operation), due to execution of the AIPO command 804 for plane 102b. PaIO # remains in operation, due to execution of a prior AIPO command for plane 102a.

FIG. 8B illustrates another example timing diagram depicting issuance of an AIPO memory command to an idle plane, while another plane has ongoing background operations, where the AIPO memory command of FIG. 8B does not cause any command pre-processing period. FIG. 8B is similar to FIG. 8A—the difference between these two figures is that in FIG. 8B, after issuance of the AIPO command 804 for plane 102b at time t802b, only the signals for the plane 102b becomes busy. Thus, FIG. 8B lacks the command pre-processing period. Accordingly, signals corresponding to the non-selected planes do not become busy (in operation), as also discussed with respect to FIG. 6B.

When an AIPO Background Operation is Ongoing (i.e., PxRDY=Ready and PxIO #=in Operation) in a Specific Plane, and an AIPO Command is Issued for the Specific Plane which has the Ongoing Background Operation Assume that a background operation is ongoing for at least one plane, such as plane 102a, i.e., PaRDY=1 (e.g., ready) and PaIO #=0 (e.g., in operation) for that plane. In such a scenario, the host 130 can issue a selected (but not all) AIPO command to the plane having the background operation.

Figures 9A, 9B:
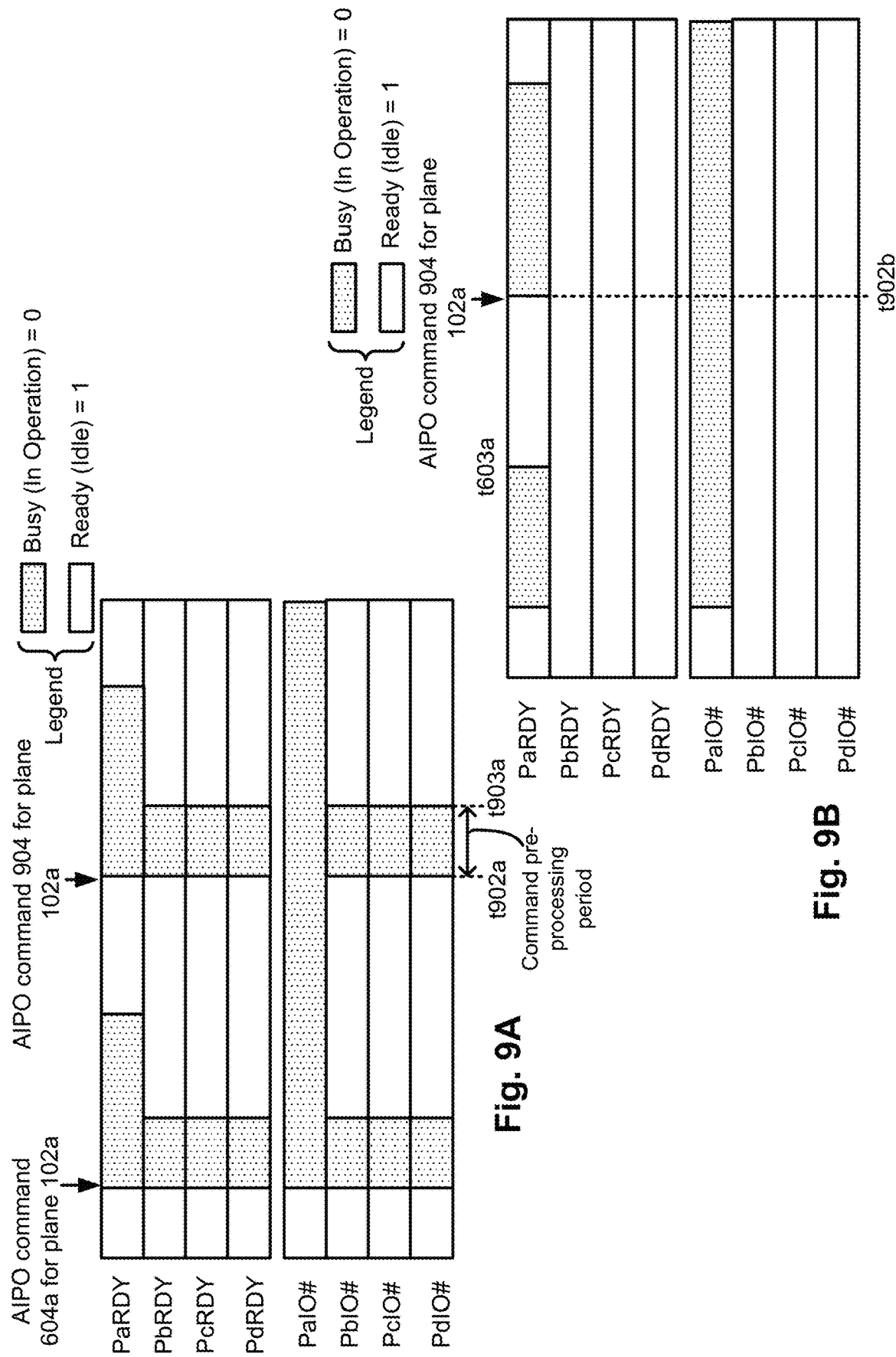
FIGS. 9A and 9B illustrate example timing diagrams depicting issuance of AIPO memory commands to a plane that has ongoing background operations.

FIG. 9A illustrates an example timing diagram depicting issuance of an AIPO memory command to a plane that has ongoing background operations. For example, in FIG. 9A, just prior to time 902a, a background operation was ongoing in plane 102a (i.e., PaRDY=ready, PaIO #=in operation), and other planes were ready (e.g., PyRDY=PyIO #=ready (idle), where y=b, c, d). At time 902a, an AIPO command 904 for the plane 102a is issued by the host 130. Accordingly, from time t902a to t903a, PxRDY and PxIO #(where x=a, . . . , d) become busy (in operation) for a short period of time (i.e., command pre-processing period). After the short period of time (discussed with respect to FIG. 6A), PbRDY, PcRDY, PdRDY, PbIO #, PcIO #, and PdIO # transition to ready (idle). PaRDY and PaIO # remain busy (in operation), due to execution of the AIPO command 904 for plane 102a.

FIG. 9B illustrates another example timing diagram depicting issuance of an AIPO memory command to a plane that has ongoing background operations. FIG. 9B is similar to FIG. 9A—the difference between these two figures is that in FIG. 9B, after issuance of the AIPO command 904 for plane 102a at time t902b, only the signals for the plane 102a become busy (in operation) (e.g., FIG. 9B lacks the command pre-processing period). Signals corresponding to the non-selected planes do not become busy for the short period of time, as also discussed with respect to FIG. 6B.

Note that in FIGS. 9A and 9B, only some selected types of AIPO memory commands may be allowed that were keeping the plane 102a busy prior to time t902a. Examples of some such selected AIPO memory commands include cache read random commands. For example, a cache read random command is selected AIPO memory command that can be accepted during the background operation period of a cache read (random) operation. Accordingly, the AIPO command 904 of FIGS. 9A and 9B can be, for example, a cache read random command.

However, there are some other example AIPO memory commands that cannot be issued to a plane that has ongoing background operations. For example, a page read command is an AIPO memory command that cannot be accepted during the background operation period of a cache read (random) operation (i.e., it can only execute when there is not an existing background operation in progress). Accordingly, the AIPO command 904 of FIGS. 9A and 9B cannot be, for example, a page read command.

There are some commands (e.g., system management commands, see Table 1) which can be issued by a host, and accepted at the memory device, at any time. One example of such commands is a reset command, which can be issued by a host, and accepted at the memory device, any time to terminate ongoing operations in one or more planes.

Figure 10:
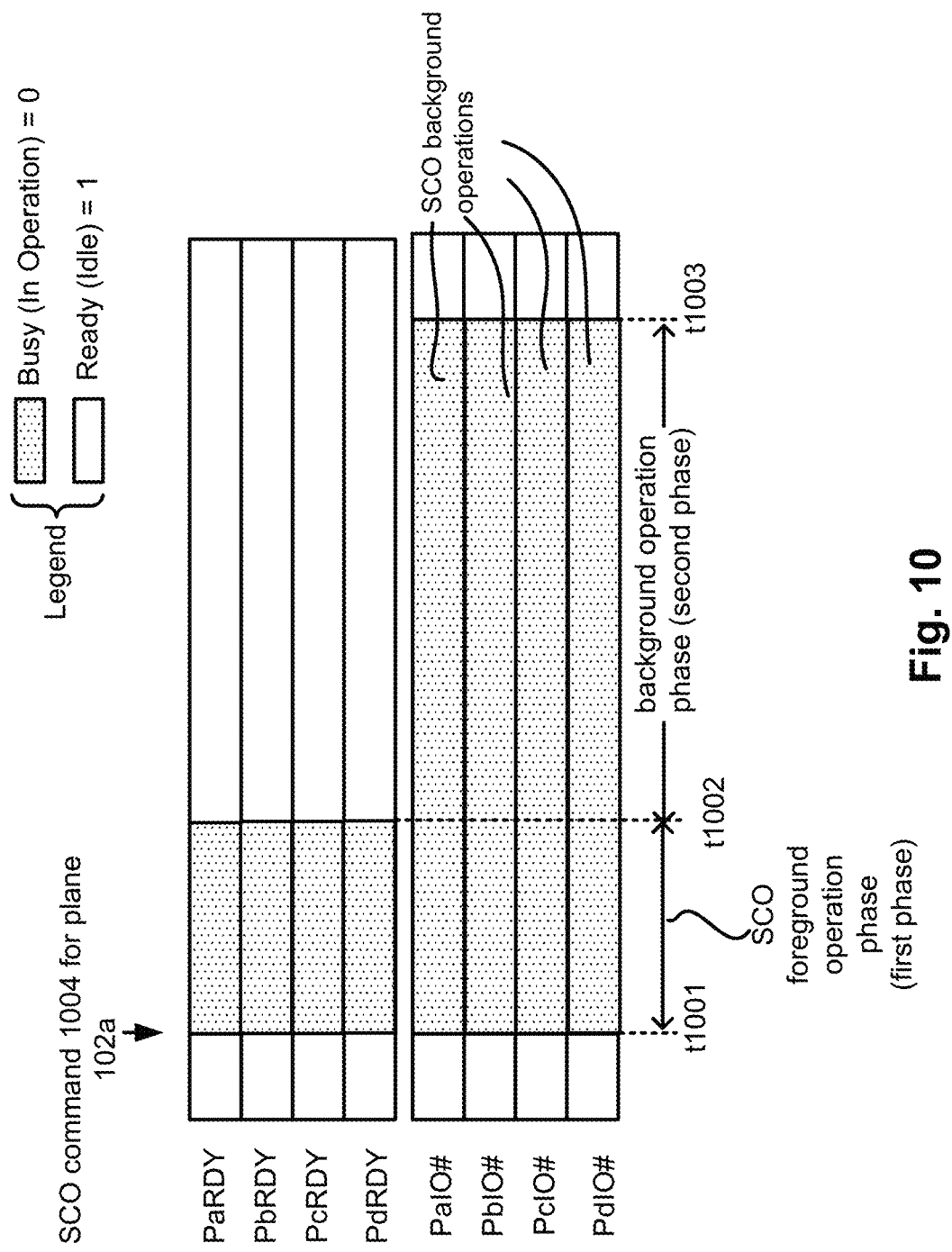
FIG. 10 illustrates a timing diagram depicting issuance of an SCO memory command, and resultant SCO background operations.

Execution of SCO, and AIPO Background Operations Versus SCO Background Operation FIG. 10 illustrates a timing diagram depicting issuance of an SCO memory command, and resultant SCO background operations. For example, at time t1001, an SCO command 1004 for plane 102a is issued by the host 130. PxRDY signals for all planes become busy between time period t1001 and t1002, also referred to herein as a plane engagement period or the first phase of the execution cycle of the SCO memory command (see FIG. 7). Phase 1 can include an SCO foreground operation (phase) in which the plane core is executing an operation which involves the cache. In phase 1, PRDY & PIO #=0 (busy, in operation) because the cache is busy and the host can't read/write the data in the cache. After Phase 1, the cache is free and the host can read/write the data in the cache, so PRDY returns to 1 and PIO # remains in 0. Thus, subsequent to time t1002, PxRDY signals for all planes transition to ready status. However, the plane in operation status signal PxIO # for all planes remains in operation, until the SCO is completed at t1003, e.g., as discussed with respect to FIG. 7. As also discussed with respect to FIG. 7, the time period between time t1002 and t1003 is referred to as the background operation phase, or phase 2 in which the host can read/write from/to the cache.

Note that during the SCO background operation phase of an SCO memory command, the PxIO # for all planes is in operation, as illustrated in FIG. 10. In contrast, for an AIPO, a corresponding AIPO background operation phase (see FIG. 6A) keeps the PxIO # in operation for only the selected plane (i.e., for which the AIPO has been issued), as illustrated in FIGS. 6A and 6B.

Thus, SCO background operations are associated with SCO memory commands, and any such operations would engage all the planes (i.e., PxIO #=in operation for all planes), as illustrated in FIG. 10. In contrast, AIPO background operations are associated with AIPO memory commands, and any such operation would engage a specific plane (i.e., PxIO #=in operation for a specific plane), as illustrated in FIGS. 6A and 6B.

Figure 11:
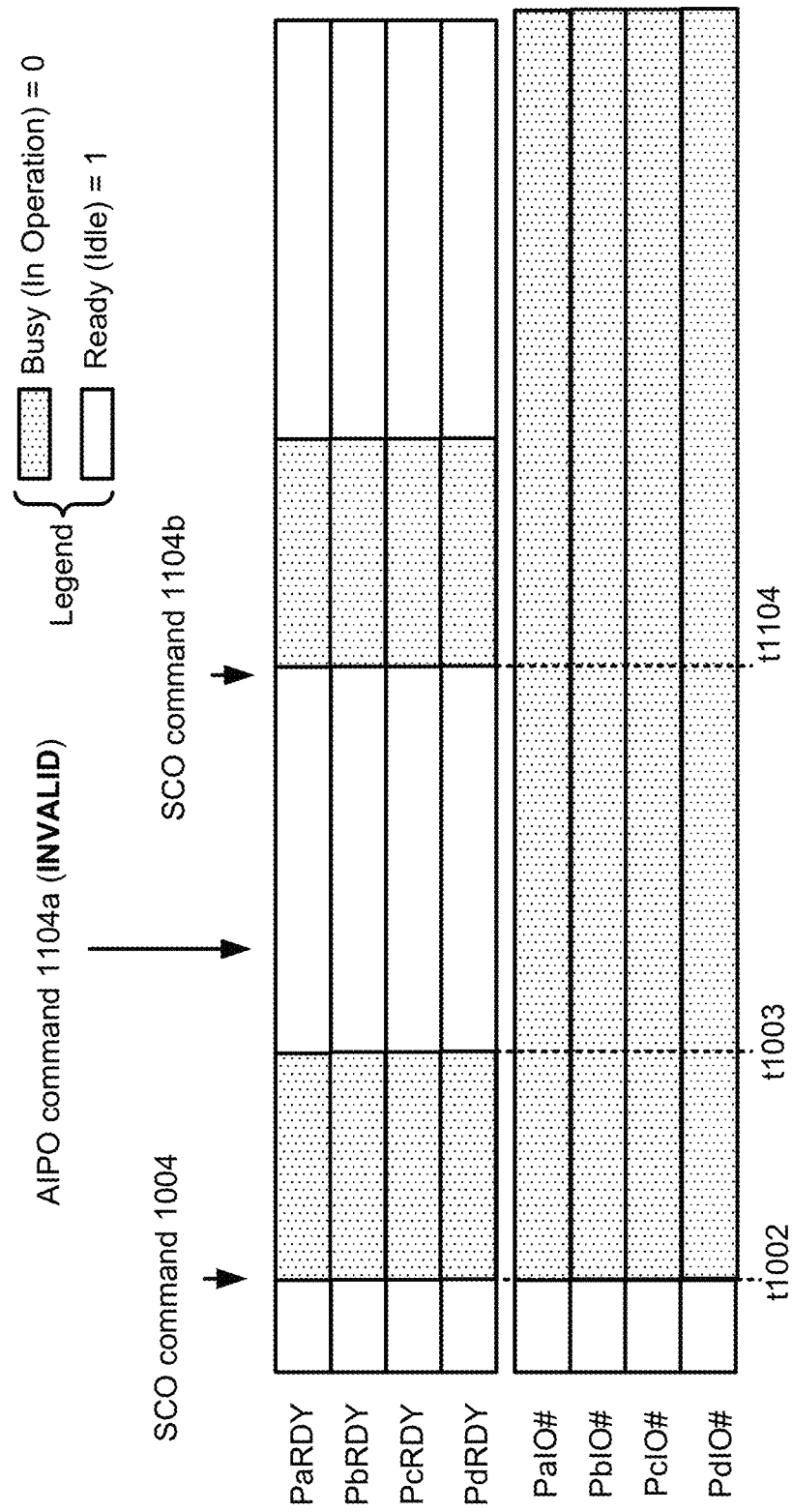
FIG. 11 illustrates an example timing diagram depicting ongoing SCO background operations, and issuance of an AIPO command and issuance of an SCO command.

When SCO Background Operations are Ongoing (i.e., PxRDY=Ready and PxIO #=in Operation for all Planes), and (i) an AIPO Command is Issued (which Becomes Invalid) and (ii) an SCO Command is Issued FIG. 11 illustrates an example timing diagram depicting ongoing SCO background operations (see FIG. 10 for SCO background operation examples, i.e., PxRDY=ready and PxIO #=in operation for all planes), and issuance of an AIPO command 1104a and issuance of an SCO command 1104b.

Note that when SCO background operations are ongoing (see FIG. 10 for further discussion of SCO background operations), the host 130 can only issue selected operation commands. For example, when SCO background operations are ongoing, the host 130 may not issue selected types of AIPO command 1104a (other select types of AIPO commands can be issued as discussed below), and hence, the AIPO command 1104a of FIG. 11 is declared invalid. This shows an example of a method in which, while the memory is executing a first type memory command to engage multiple planes simultaneously (e.g. an SCO command), receiving, by the memory, a second type of memory command (e.g. an AIPO command); and denying execution of the second type of memory command, in response to receiving the second type of memory command during execution of the first type of memory command. However, when SCO background operations are ongoing, the host 130 may validly issue the SCO command 1104b at t1004, as illustrated in FIG. 11. Status of the various signals after time t1104, as illustrated in FIG. 11, have already been discussed with respect to FIG. 10.

Summarizing Memory Plane Ready Status Signal (PxRDY) and Memory Array Ready Status Signal (PxIO #)

Referring to Table 1190 in FIG. 12, in an embodiment, the host 130 may check the plane busy status signal PxRDY and the plane in operation status signal PxIO # for operation.

If there is no ongoing operation in any plane of the memory 101 (all PxRDY and PxIO #=1), then the host 130 can issue any commands to the chip.

If there is an AIPO operation ongoing in the memory 101, the host 130 has to check the PxRDY and PxIO # of the selected plane. If the selected plane is idle (PxRDY and PxIO #=1, where 102x is the selected plane), the host can issue any AIPO command to the selected plane. If the selected plane is busy and in operation (PxRDY and PxIO #=0, where 102x is the selected plane), the command issued by host 130 will not be executed. If the selected plane is ready but there is a background operation (i.e, PxRDY=1 and PxIO #=0, where 102x is the selected plane), the host 130 can issue a selected AIPO command to the selected plane.

If there is an ongoing SCO operation in the chip, the host 130 has to check the PxRDY and PxIO # of the selected plane. If the selected plane is busy and in operation (i.e., PxRDY and PxIO #=0, where 102x is the selected plane), the host cannot issue any command that will be accepted by the selected plane. If the selected plane is ready but there is a background operation (PxRDY=1 and PxIO #=0, where 102x is the selected plane), the host can issue only a selected SCO or AIPO command (but not all SCO or AIPO commands) to the selected plane.

In an embodiment, an SCO system management command can be issued by a host, and accepted at the memory device, at any time. An AIPO system management command cannot be issued when there is an ongoing background SCO operation, but an AIPO system management command can be issued by the host and accepted at the memory device when there is an ongoing AIPO operation.

Table 1190 summarizes usage of the PxRDY and PxIO # status signals for various memory operations, some of which are discussed herein above.

As discussed herein earlier, each plane has its own ready status-PxRDY and PxIO #. Thus, the ready status for individual memory planes includes two status bits, one each for PxRDY and PxIO #.

The PxRDY dictates whether the plane can execute the next command input. For a given memory plane, if PxRDY is busy (PxRDY=0), this plane may not accept further commands. On the other hand, if PxRDY is ready (PxRDY=1), this plane may selectively accept a new command (or may not accept new commands), based on the type of command, and other status signals of other planes.

In an example, the memory 101 can accept an SCO operation command when all planes are ready (idle) (all PxRDY=1 and PxIO #=1), as discussed herein earlier.

In an example, the memory 101 can accept an AIPO operation command for a specific plane, when the selected specific plane is ready (PxRDY=1) and the planes are not under SCO background operations (e.g., see FIG. 11, where the AIPO operation command 1104a is invalid).

When the planes are undergoing SCO background operations (e.g., PxRDY=1 and PxIO #=0 for all planes, see FIG. 11), only limited or selected types of new commands may be accepted. AIPO operation commands may not be included in these limited or selected types of commands (e.g., see FIG. 11, where the AIPO operation command 1104a is invalid).

As discussed, the PxIO # provides plane in operation status for corresponding memory operations. If PxIO # is in operation (PxIO #=0) for a specific plane, the memory operation of this plane is still ongoing. If PxIO # is idle (PxIO #=1) for a specific plane, the plane is not undergoing any operation.

Reset Plane Command

Figure 13:
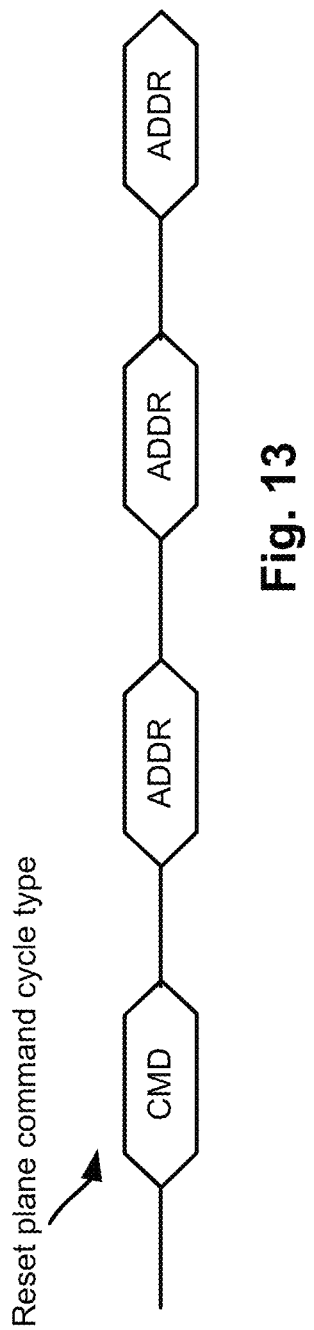
FIG. 13 illustrates a configuration (e.g., a cycle type) of a reset plane command.

A "reset plane" command may be supported by the memory 101, where the reset plane command is to abort any AIPO being executed in the selected plane for which the reset plane command is issued. FIG. 13 illustrates a configuration (e.g., a cycle type) of a reset plane command. As illustrated in FIG. 13, the reset plane command includes one command cycle, followed by one or more (e.g., three) address cycles, where the address included in the address cycle indicates one or more addresses (e.g., row addresses) of a memory plane to be reset. In an example, after the memory 101 receives this command, the memory 101 aborts any AIPO being executed in the memory plane identified by the addresses in the address cycle.

The reset plane command can be issued by the host and accepted by the memory device when the PxRDY and PxIO # status signals indicate a busy state if there is an ongoing AIPO operation but not if there is an ongoing SOC operation. The plane reset command can also be issued during either the foreground or the background operation period.

AIPO Memory Command Issued to a Memory Plane that does not have an Ongoing Background Operation (Other Planes can have AIPO Background Operation)

FIGS. 14A and 14B illustrate timing diagrams 1400a and 1400b, respectively, depicting scenarios where an AIPO memory command is issued to a memory plane that does not have an ongoing background operation, while one or more other memory planes can have ongoing AIPO background operations.

In the example of FIG. 14A, an AIPO command 1404a for plane 102b is issued at time t1402a. Prior to time t1402a, PaRDY is busy and PaIO # is in operation, indicating execution of an AIPO in plane 102a. The AIPO command 1404a is issued to a non-busy plane, such as the plane 102b, where PbRDY="ready" at the time of issuance of the AIPO command 1404a. In an example, the AIPO command 1404a can be any appropriate AIPO command listed in previously discussed Table 1, such as a page read operation.

As previously discussed with respect to FIG. 6A, in the example of FIG. 14A, after issuance of the AIPO command 1404a, all planes become busy for a short period of time (e.g., between time t1402a and t1403a), which is the command pre-processing period. After the command pre-processing period, PxRDY and PxIO # for planes 102c and 102d become ready (idle) The memory plane 102b starts processing the AIPO command 1404a command from time t1403a. The plane 102a remains busy, due to the ongoing operation that started prior to the time 1402a.

In an embodiment, no new commands are allowed to be issued by the host 130 during the command pre-processing period. As discussed, after the command pre-processing period, the plane busy status signals for planes 102c and 102d transition to the ready state again.

FIG. 14B illustrates an alternate embodiment (e.g., which can be an alternative to the embodiment illustrated in FIG. 14A). For example, in FIG. 14A, there is the command pre-processing period, during which all planes become busy (e.g., PxRDY and PxIO #, for x=a, . . . , d) immediately after issuance of the AIPO command 1404a. In contrast, FIG. 14B lacks this command pre-processing period. For example, in the embodiment of FIG. 14B, only the selected plane, to which an AIPO command 1404b is issued at time t1402b, becomes busy from time t1402b. Other non-selected planes (e.g., planes 102c, 102d) remain ready—i.e., the PcRDY, PdRDY, PcIO #, and PdIO # status signals are not affected by the AIPO command 1404b, and these status signals remain available.

In an example, the embodiment of FIG. 14A is relatively easier for circuit implementation than the embodiment of FIG. 14B (e.g., as the embodiment of FIG. 14A has relatively simpler command interface). However, there may be a slight loss in performance in the embodiment of FIG. 14A, because the host 130 needs to wait during the command pre-processing period, during which any new command issued by host 130 will not be executed.

Further Examples of AIPO Memory Commands

If an AIPO background operation is ongoing in a specific plane (such as a first plane, with PxRDY=ready and PxIO #=in operation for the first plane), an AIPO command (such as a page read or a cache read command) can be issued by a host, and accepted at the memory device, to another plane (such as a second plane) that does not have any background operations (PxRDY=PxIO #=ready (idle) for the second plane).

If an AIPO background operation is ongoing in a specific plane (such as a first plane, with PxRDY=ready and PxIO #=in operation for the first plane), only selected AIPO commands (such as a cache read command) can be issued by a host, and accepted at the memory device, to the first plane with the background operation. For example, referring to Table 1 herein discussed previously, a cache read random command is an AIPO command that is allowed during a background operation period.

There may be other AIPO memory commands, such as page read command, which cannot be issued to a plane that has ongoing AIPO background operation. The types of commands which can be issued by a host, and accepted at the memory device, during AIPO background operations can depend on particular implementations of the memory device.

No SCO command (for example, block erase command) is allowed if an AIPO background operation is ongoing.

Figure 15A:
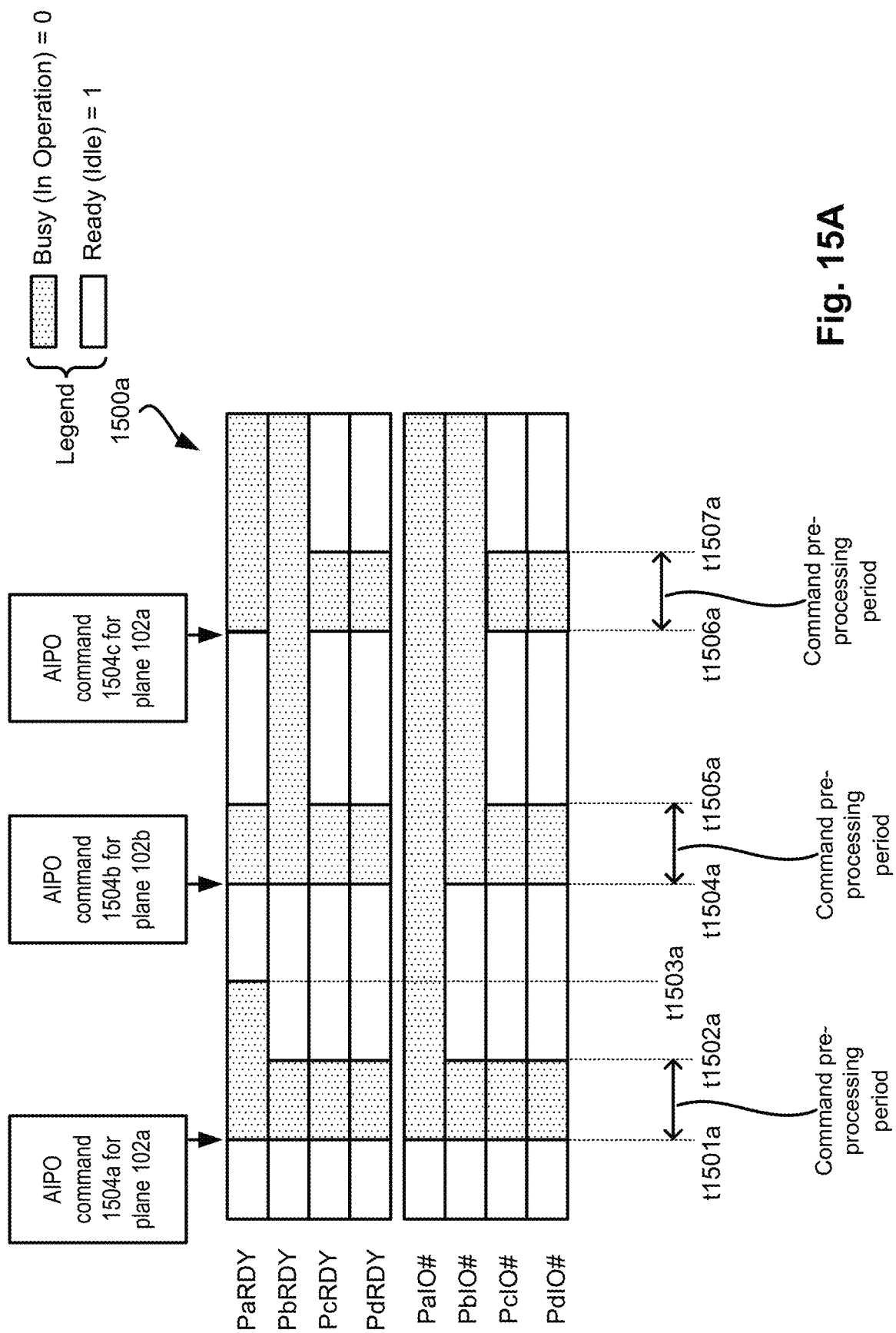
FIGS. 15A and 15B illustrate timing diagrams depicting various example scenarios for issuance of AIPO commands.
Figure 15B:
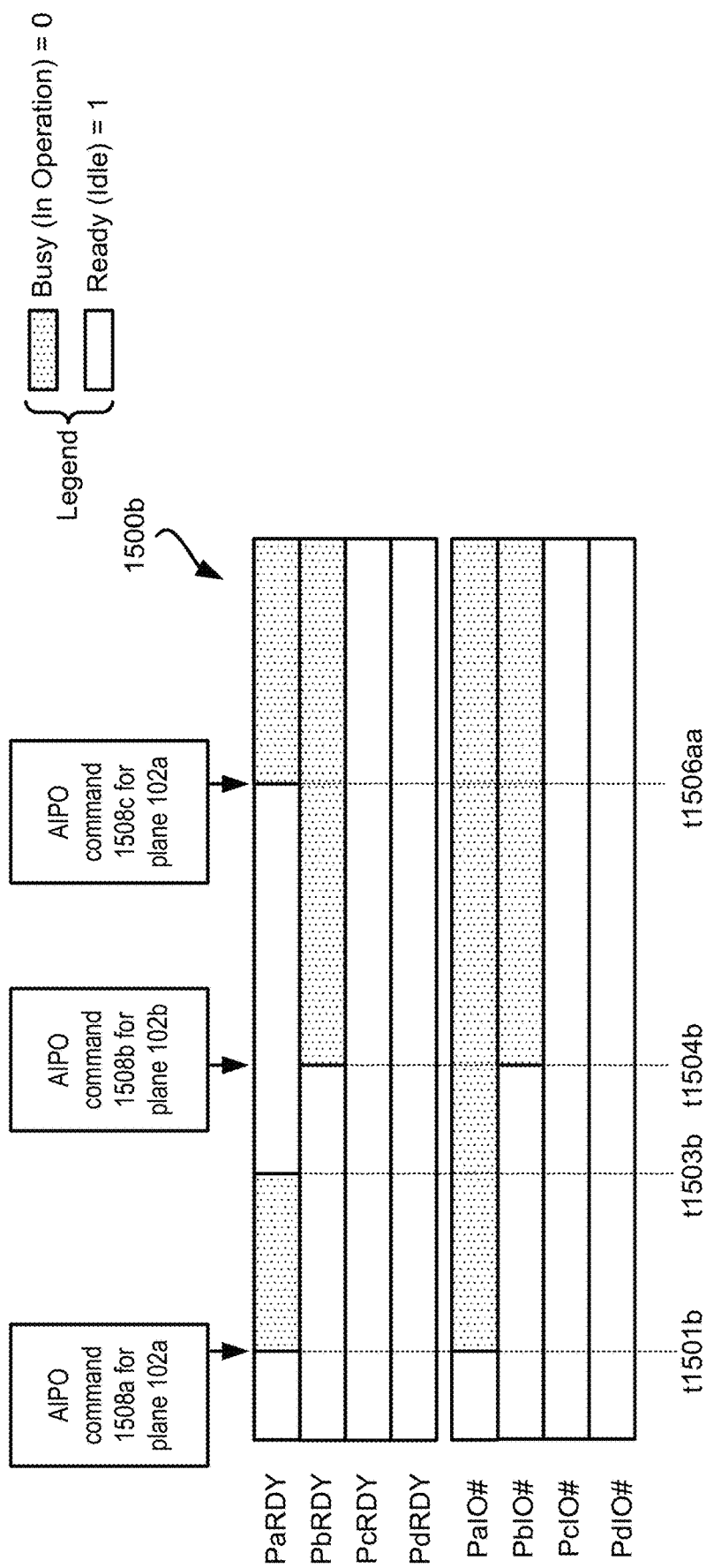

FIGS. 15A and 15B illustrate timing diagrams 1500a and 1500b, respectively, depicting various example scenarios for issuance of AIPO commands. Note that FIG. 15A illustrates scenarios in which an AIPO command is followed by a command pre-processing period, whereas FIG. 15B lacks the command pre-processing period.

Referring to FIG. 15A, prior to time t1501a, none of the planes are busy (i.e., PxRDY=PxIO #=idle for all planes). At time t1501a, an AIPO command 1504a for plane 102a is issued. Accordingly, there is a command pre-processing period between time t1501a and t1502a, during which all planes are busy (i.e., PxRDY=PxIO #=in operation for all planes).

At time t1502a, planes 102b, 102c, and 102d transition to ready (idle). At time t1503a, the plane 102a becomes ready (e.g., as discussed with respect to t603a of FIG. 6A).

At t1504a, the host 130 issues another AIPO command 1804b for plane 102b. Similar to the discussion before, there is a command pre-processing period between time t1504a and t1505a, during which all planes are busy (i.e., PxRDY=PxIO #=busy (in operation) for all planes). At time t1505a, planes 102a, 102c, and 102d are ready (i.e., PaRDY=PcRDY=PdRDY=ready), although a background operation is still ongoing in plane 102a for executing the AIPO command 1504a.

At t1506a, the host 130 issues another AIPO command 1504c for plane 102a. Similar to the discussion before, there is a command pre-processing period between time t1506a and t1507a, during which all planes are busy (i.e., PxRDY=PxIO #=busy (in operation) for all planes). At time t1507a, planes 102c and 102d are ready (i.e., PcRDY=PdRDY=ready (idle)), although operations are still ongoing in planes 102a and 102b for respectively executing the AIPO commands 1504c and 1504b.

Thus, as discussed previously, if an AIPO background operation is ongoing in a specific plane (such as a first plane, with PxRDY=ready and PxIO #=in operation for the first plane), an AIPO command (such as a page read or a cache read command) can be issued by a host, and accepted at the memory device, to another plane (such as a second plane) that does not have any background operations (PxRDY=PxIO #=ready (idle) for the second plane). The AIPO command 1504b for plane 102b, issued at time t1504a, is an example of such an AIPO command.

As also discussed previously, if an AIPO background operation is ongoing in a specific plane (such as a first plane, with PxRDY=ready, and PxIO #=in operation for the first plane), only selected AIPO commands (such as a cache read random command or another category 5 command from Table 1 discussed herein previously) can be issued by a host, and accepted at the memory device, to the first plane with the background operation. For example, AIPO command 1504c for plane 102a is issued at time t1506a, while the plane 102a is still undergoing AIPO background operations (i.e., PaRDY=ready, PaIO #=in operation). Thus, the AIPO command 1504c can be a cache read random command or another category 5 command from Table 1, but cannot be a page read or another category 4 command of Table 1.

The timing diagram 1500b of FIG. 15B is, in part, similar to the timing diagram 1500a of FIG. 15A. The difference between these two timing diagrams is that the timing diagram 1500a of FIG. 15A includes the command pre-processing period, which the timing diagram 1500b of FIG. 15B lacks. For example, similar to FIG. 6B, the timing diagram 1500b of FIG. 15B lacks the command pre-processing period. The timing diagram 1500b of FIG. 15B will be apparent to those skilled in the art, based on the discussion with respect to FIGS. 15A and 6B. FIG. 15B includes time t1501b, 1503b, 1504b and 1506b, which are counterparts to similar times in FIG. 15A.

Further Examples of SCO Memory Commands

If no background operation is ongoing, an SCO command (for example, a page program command or a block erase command) can be issued by a host, and accepted at the memory device, only when all planes are ready (idle) (i.e., PxRDY=PxIO #=ready (idle) for all planes). After the SCO command is issued, all planes will become busy (in operation) (i.e., PxRDY=PxIO #=busy (in operation) for all planes).

Figure 16A:
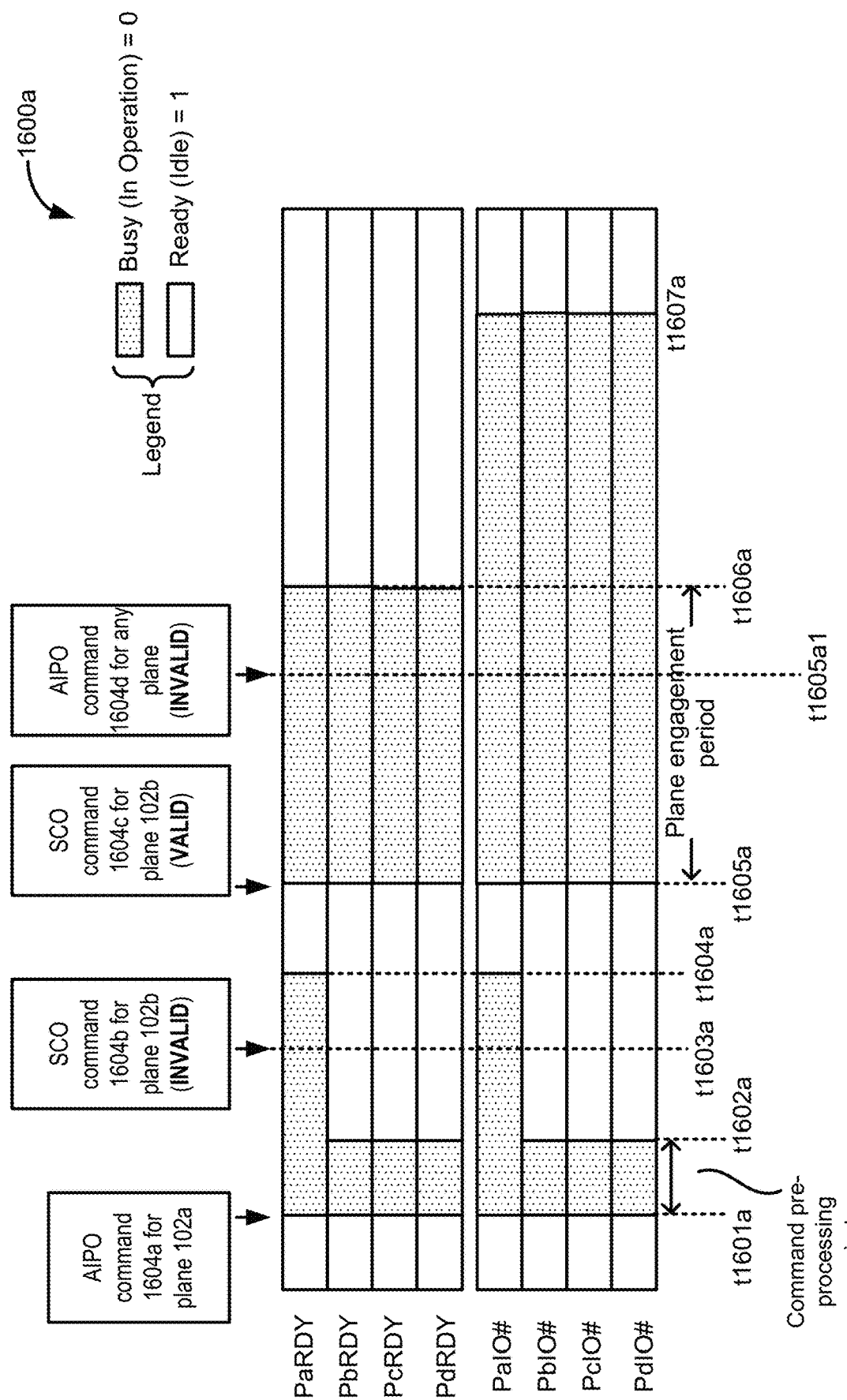
FIG. 16A illustrates a timing diagram depicting examples of SCO commands.

FIG. 16A illustrates a timing diagram 1600a depicting examples of SCO commands. At t1601a, an AIPO command 1604a for plane 102a is issued. This is followed by a command pre-processing period between time t1601a and t1602a (although in another example, such command pre-processing period may be absent, as discussed with respect to FIG. 6B). Thus, after time t1602a, PaRDY=PaIO #=busy (in operation), and all other status signals are ready. At time t1604a, the execution of the AIPO command 1604a for plane 102a is completed, and both PaRDY and PaIO # become ready (idle) at time t1604a. Note that although in this example of FIG. 16A both PaRDY and PaIO # become ready (idle) at the same time, the PaIO # can become idle after PaRDY becomes ready, as seen in FIG. 6A.

As also illustrated in FIG. 16A, at time t1603a (e.g., which is between time t1602a and t1604a), an SCO command 1604b for plane 102b is issued. As not all planes are ready at time t1603a (e.g., PaRDY=busy at time t1603a), the SCO command 1604b for plane 102b is invalid, and is not executed by the memory 101.

After all planes are ready (idle) from time t1604a, another SCO command 1604c for plane 102b is issued at time t1605a. Note that at this time, all planes are ready. Accordingly, the SCO command 1604c is valid, and the SCO command 1604c is executed from time t1605a.

As discussed with respect to FIG. 7, in FIG. 16A, once the SCO command 1604c is issued, all planes will become busy (in operation) (i.e., PxRDY=PxIO #=busy (in operation), for x=a, . . . , d), e.g., during the plane engagement period between time t1605a and t1606a. At t1606a (i.e., after the end of the plane engagement period), all the planes transition to ready (i.e., PxRDY=ready, for x=a, . . . , d), although SCO background operations are ongoing in all planes (i.e., PxIO #=in operation, for x=a, . . . , d). Finally, at time t1607a, the SCO background operations are completed, and PxIO #=idle, for x=a, . . . , d.

Note that between time t1605a and t1606a, during the plane engagement period, all planes are shown to be busy (i.e., PxRDY=busy, for x=a, . . . , d), although the SCO command 1604c is for a specific plane 102b. That is, although planes 102a, 102c, 102d may not be actively involved in the SCO command 1604c, the planes 102a, 102c, 102d are still shown to be busy or in operation, to avoid any command input until the memory 101 is ready for next command. Accordingly, the time period between time t1605a and t1606a is also referred to herein as plane engagement period, when the planes are shown to be engaged, to avoid any command input until the memory 101 is ready for the next command.

Note that any AIPO (or SCO) operation issued during the plane engagement period is declared invalid. For example, in FIG. 16A, an AIPO command 1604d for a plane is issued at time t1605a1, which is during the plane engagement period. Accordingly, this command is declared invalid.

Figure 16B:
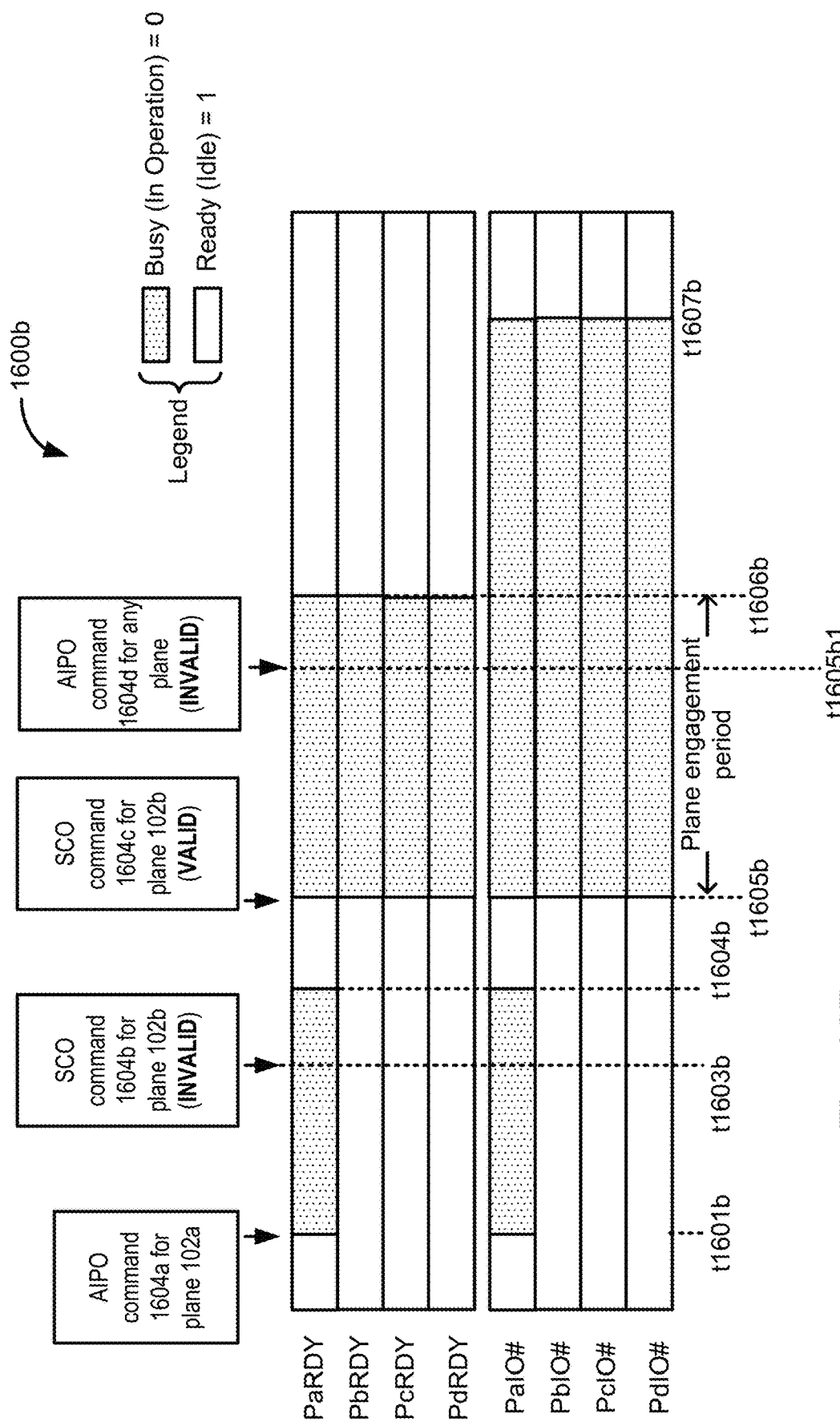
FIG. 16B illustrates another timing diagram depicting examples of SCO commands.

FIG. 16B illustrates another timing diagram 1600b depicting examples of SCO commands.

The timing diagram 1600b of FIG. 16B is, in part, similar to the timing diagram 1600a of FIG. 16A. The difference between these two timing diagrams is that the timing diagram 1600a of FIG. 16A includes the command pre-processing period, which the timing diagram 1600b of FIG. 16B lacks. For example, similar to FIG. 6B, the timing diagram 1600b of FIG. 16B lacks the command pre-processing period. The timing diagram 1600b of FIG. 16B will be apparent to those skilled in the art, based on the discussion with respect to FIGS. 16A and 6B.

Figure 17:
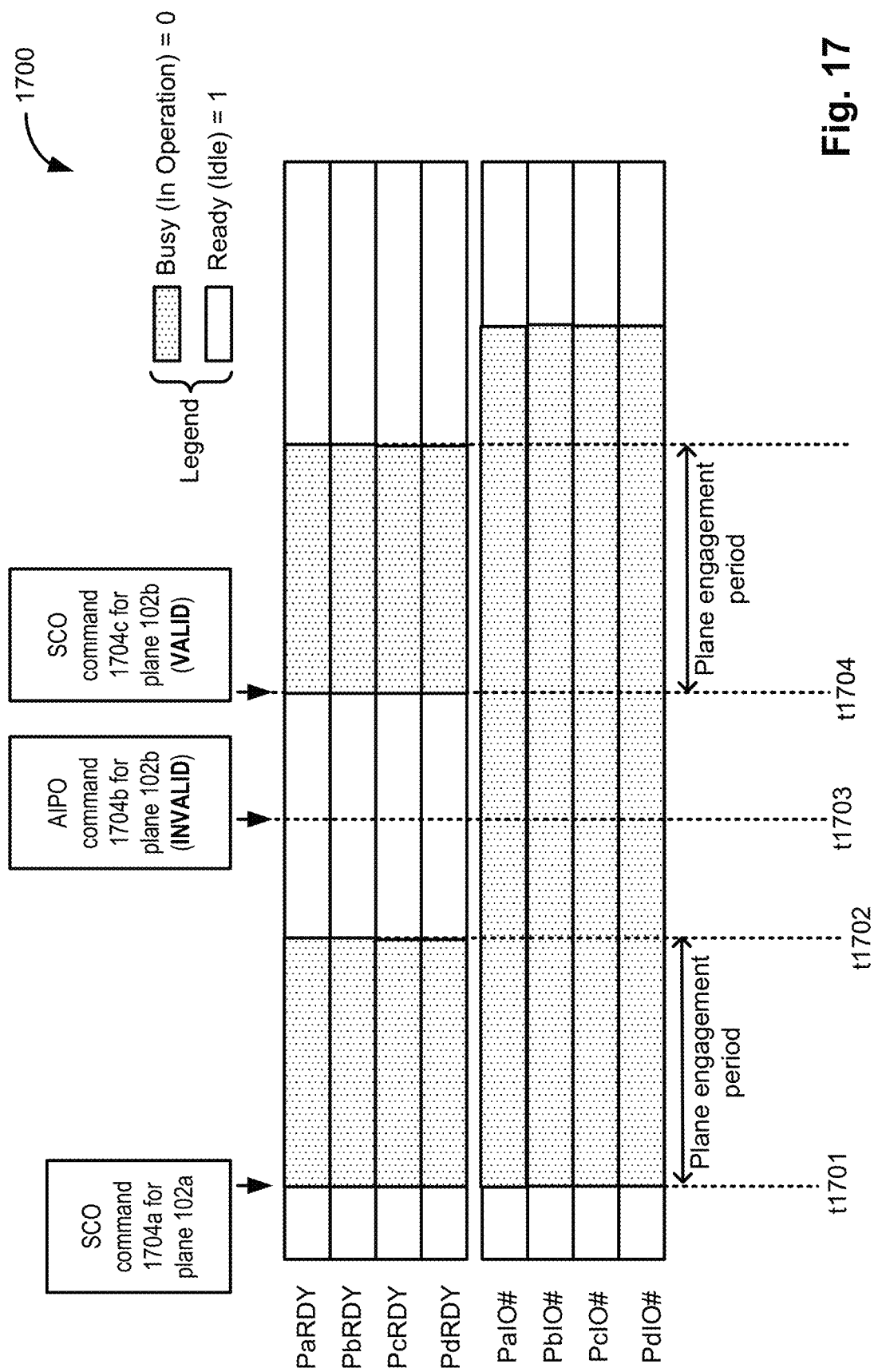
FIG. 17 illustrates a timing diagram that depicts further examples of SCO commands, and also illustrates that some AIPO memory commands may not be issued when the planes execute SCO background operations.

FIG. 17 illustrates a timing diagram 1700 that depicts further examples of SCO commands, and also illustrates that some AIPO memory commands may not be issued when the planes execute SCO background operations. In the timing diagram 1700, an SCO command 1704a for plane 102a is issued at time t1701, due to which all planes become busy (in operation) during the previously discussed plane engagement period, which occurs between time t1701 and t1702. At time t1702, PxRDY transitions to ready for x=a, . . . , d, i.e., all planes become ready. Note that SCO background operations are still ongoing after time t1702, and accordingly, PxIO #=in operation for x=a, . . . , d.

At time t1703 (e.g., when SCO background operations are still ongoing), an AIPO command 1704b for plane 102b is issued. It may be noted that if SCO background operations are ongoing, the memory 101 may not be able to execute an AIPO memory command, such as a page read command. Accordingly, the AIPO command 1704b for plane 102b is invalid.

However, if SCO background operations are ongoing, the memory 101 may be able to execute selected SCO memory commands, such as a cache program command or another category 2 SCO command of Table 1 discussed herein previously. Note that a category 1 SCO command may not be validly received and executed, if SCO background operations are ongoing.

For example, at time t1704 (e.g., when SCO background operations are still ongoing), an SCO command 1704c for plane 102b (such as a cache program command or another category 2 SCO command of Table 1) is issued. This command is valid, and is executed by the memory 101. For example, all planes become busy (in operation) during a corresponding plane engagement period that commences from time t1704. The portion of the timing diagram after time t1704 is similar to that discussed with respect to FIG. 16B, and hence, is not discussed in further detail.

Figure 18A:
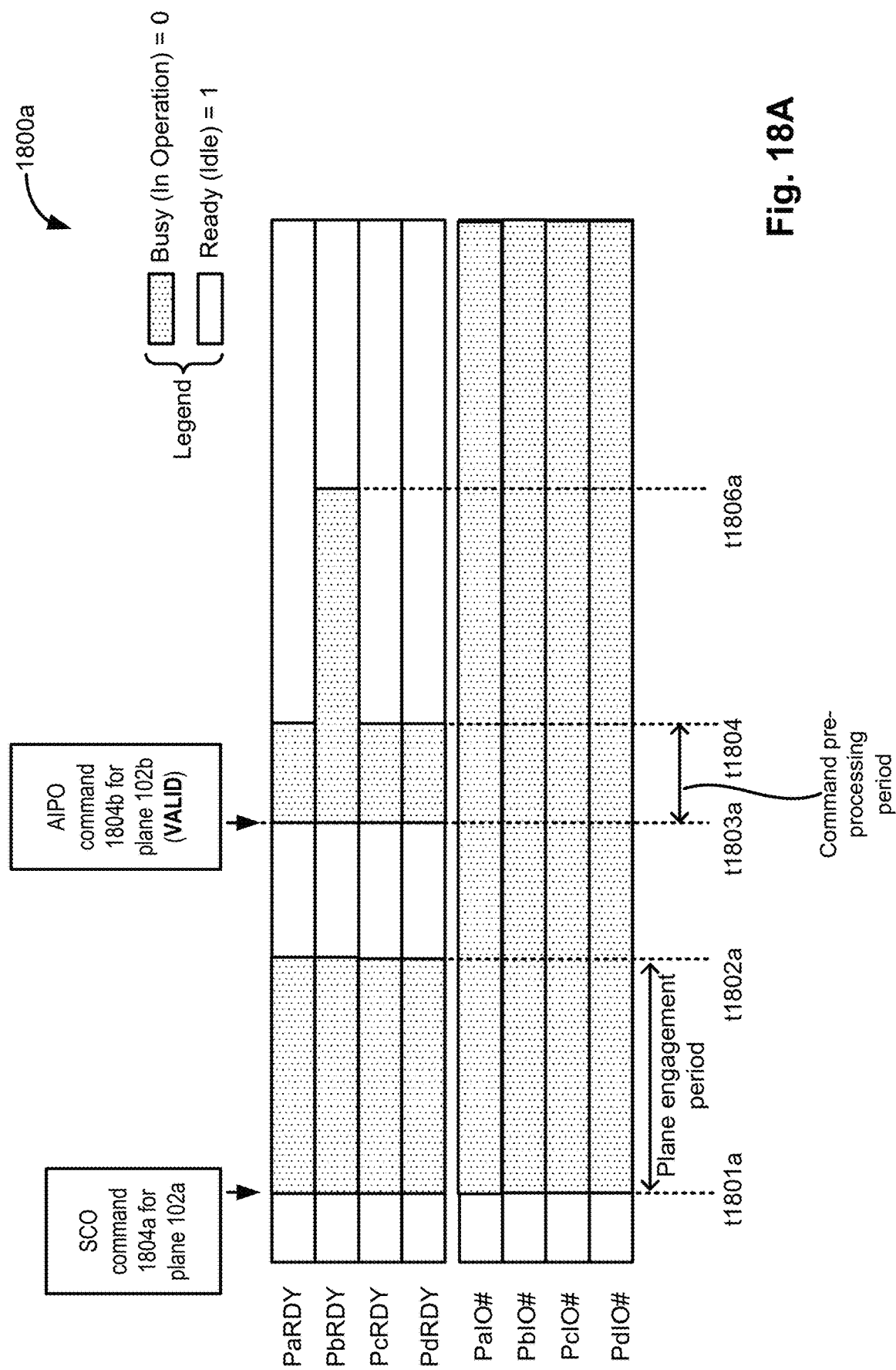
FIGS. 18A and 18B illustrate timing diagrams, which depict further examples of SCO commands, and also depict that some AIPO memory commands may be issued and executed simultaneously with the planes executing SCO background operations.
Figure 18B:
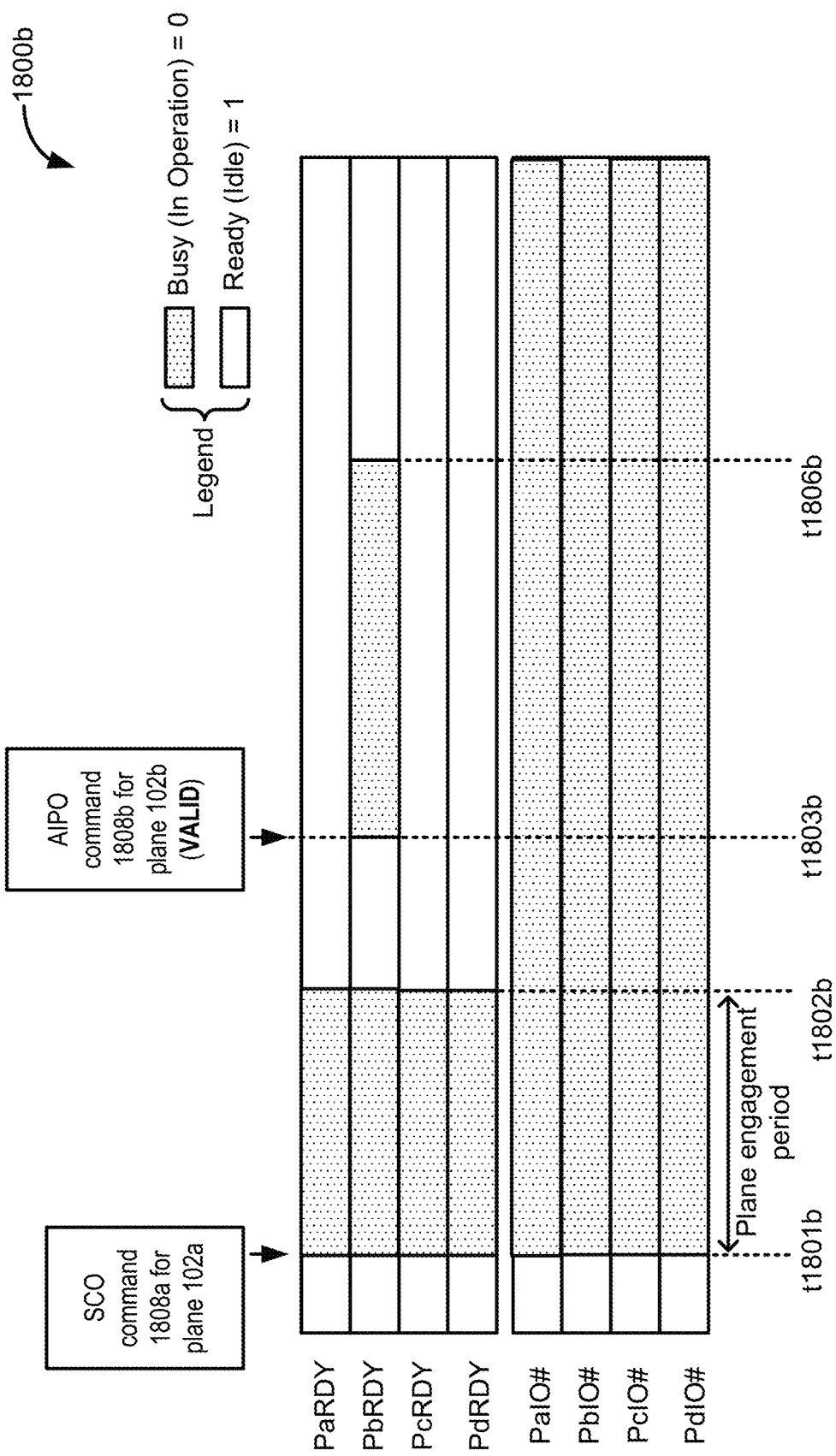

FIGS. 18A and 18B illustrate timing diagrams 1800a and 1800b, which depict further examples of SCO commands, and also depict that some AIPO memory commands which may be issued and executed simultaneously with the planes executing SCO background operations.

Note that FIGS. 18A and 18B illustrate a scenario that is contrary to that of FIG. 17. For example, in FIG. 17, an AIPO command 1704b is not allowed when the planes are executing SCO background operations. In contrast, in FIGS. 18A and 18B, an AIPO command 1804b is allowed when the planes are executing SCO background operations.

For example, a circuit within the memory 101 implementing the scenario of FIG. 17 may be different from a circuit within the memory 101 implementing the scenario of FIGS. 18A and 18B. Thus, whether an AIPO memory command is allowed, when the planes are executing SCO background operations, is implementation specific-based on the design of the memory 101, the memory 101 may support selective allowance (or denial) of an AIPO memory command, when the planes are executing SCO background operations.

In another example, the AIPO command 1704b of FIG. 17 is different from the AIPO command 1804 of FIG. 18A. Accordingly, the AIPO command 1804b (e.g., a category 4 command of Table 1) of FIG. 18A is allowed, while the AIPO command 1704b (e.g., a category 5 command of Table 1) of FIG. 17 is denied.

In the timing diagram 1800a, an SCO command 1804a for plane 102a is issued at time t1801a, due to which all planes become busy during the previously discussed plane engagement period, which occurs between time t1801a and t1802a. At time t1802a, PxRDY transitions to ready for x=a, . . . , d, i.e., all planes become ready. Note that SCO background operations are still ongoing after time t1802a, and accordingly, PxIO #=in operation for x=a, . . . , d.

At time t1803a (e.g., when SCO background operations are still ongoing), an AIPO command 1804b for plane 102b is issued. In the example of FIG. 18A (and contrary to the discussion with respect to FIG. 17), if SCO background operations are ongoing, the memory 101 may be able to execute an AIPO memory command, such as a page read command. Accordingly, the AIPO command 1804b for plane 102b is allowed. A page read command may or may not be issued/accepted during a cache program background operation period depending on an implementation of the memory system. A page read command cannot be issued during a cache read background operation.

Accordingly, from time 1803a, all planes become busy during the command pre-processing period, until time t1804a, after which the planes 102a, 102c, 102d become available. Note that SCO background operations are ongoing in all the planes, e.g., to execute the SCO command 1804a for plane 102a. The plane 102b is ready (e.g., PbRDY) at time t1806a, e.g., as discussed with respect to time t603a of FIG. 6A. Note that SCO background operations may be still ongoing in all the planes after time t1806a.

The timing diagram 1800b of FIG. 18B is in part similar to the timing diagram 1800a of FIG. 18A. The difference between these two timing-diagrams is that the timing diagram 1800a of FIG. 18A includes the command pre-processing period, which the timing diagram 1800b of FIG. 18B lacks. For example, similar to FIG. 6B, the timing diagram 1800b of FIG. 18B lacks the command pre-processing period. The timing diagram 1800b of FIG. 18B will be apparent to those skilled in the art, based on the discussion with respect to FIGS. 18A and 6B. FIG. 18B includes SCO command 1808a for plane 102a, AIPO command 1808b for plane 102b and times t1801b, t1802b, t1803b and t1806b.

FIGS. 19A to 19H illustrate example timing diagrams of plane busy status signals PxRDY for planes P0 to P3, and plane in operation status signals PxIO # for planes P0 to P3, in response to receiving respective categories of commands that can be implemented in various embodiments. Note that in the timing diagrams of FIG. 19A to 19H, as with previous figures, a dotted rectangle corresponds to an associated signal being busy, and a non-shaded rectangle corresponds to an associated signal being ready (i.e., not busy), as illustrated in the "Legend".

FIG. 19A shows the timing of the status signals for an SCO command that is to be performed without background operations, like category 1 in Table 1. At the time the SCO command for plane P0 is received, all of the status signals are in a ready (idle) state. During execution of the command, all the status signals are in the busy (in operation) state until the command is complete. Both the plane busy and the plane in operation status signals for all of the planes are in the busy (in operation) state during an operation period.

FIG. 19B shows the timing of the status signals for an SCO command that can be performed with a background operation, like category 2 in Table 1, having two operation periods. At the time the SCO command for plane P0 is received, all the status signals are in a ready (idle) state. After receipt of the command, the plane busy status signals for all of the planes transition to a busy state during a busy period and transition to the ready state at the end of the busy period (this is part of the plane engagement period that can include both a foreground operation period and a background operation period of a SCO command). The plane in operation status signals remain in an in operation state during a longer interval beyond the end of the busy period, during a background operation period.

FIG. 19C shows the timing of the status signals for an AIPO command that is to be performed without background operations, like category 4 of Table 1, having two operation phases. At the time the AIPO command for plane P0 is received, all the status signals are in a ready (idle) state. After receipt of the command, the plane busy status signals for all the planes transition to the busy state. Also, after receipt of the command, the plane in operation status signals for all the planes transition to the in operation state. At the end of a command processing interval (command pre-processing period), the plane busy and the plane in operation signals for the unselected planes transition to the ready (idle) state. The plane busy and the plane in operation status signals for the selected plane P0 remain busy (in operation) during the operation interval.

FIG. 19D shows the timing of the status signals for an AIPO command that can be performed with a background operation, like category 5 of Table 1, having three operation phases, including a command processing phase in which all plane busy and plane in operation status signals are busy (in operation), a data transfer phase in which, for the unselected planes, the plane busy and plane in operation status signals are ready (idle), and the plane busy and plane in operation status signals for the selected plane remain busy (in operation), and a background operation phase in which the plane busy status signal for the selected plane transitions to ready and the plane in operation status signal for the selected plane remains in operation until completion. At the time the AIPO command for plane P0 is received, all the status signals are in a ready (idle) state. After receipt of the command, the plane busy status signals for all the planes transition to the busy state. Also, after receipt of the command, the plane in operation status signals for all the planes transition to the in operation state. At the end of the cache operation interval, the plane busy status signal for the selected plane P0 transitions to the ready state. However, the plane in operation status signal for the selected plane remains in operation for a longer operation interval. The plane busy status signals for the unselected planes, and the plane in operation status signals for the unselected planes, transition to the ready (idle) state at the end of a command processing interval.

Figure 20:
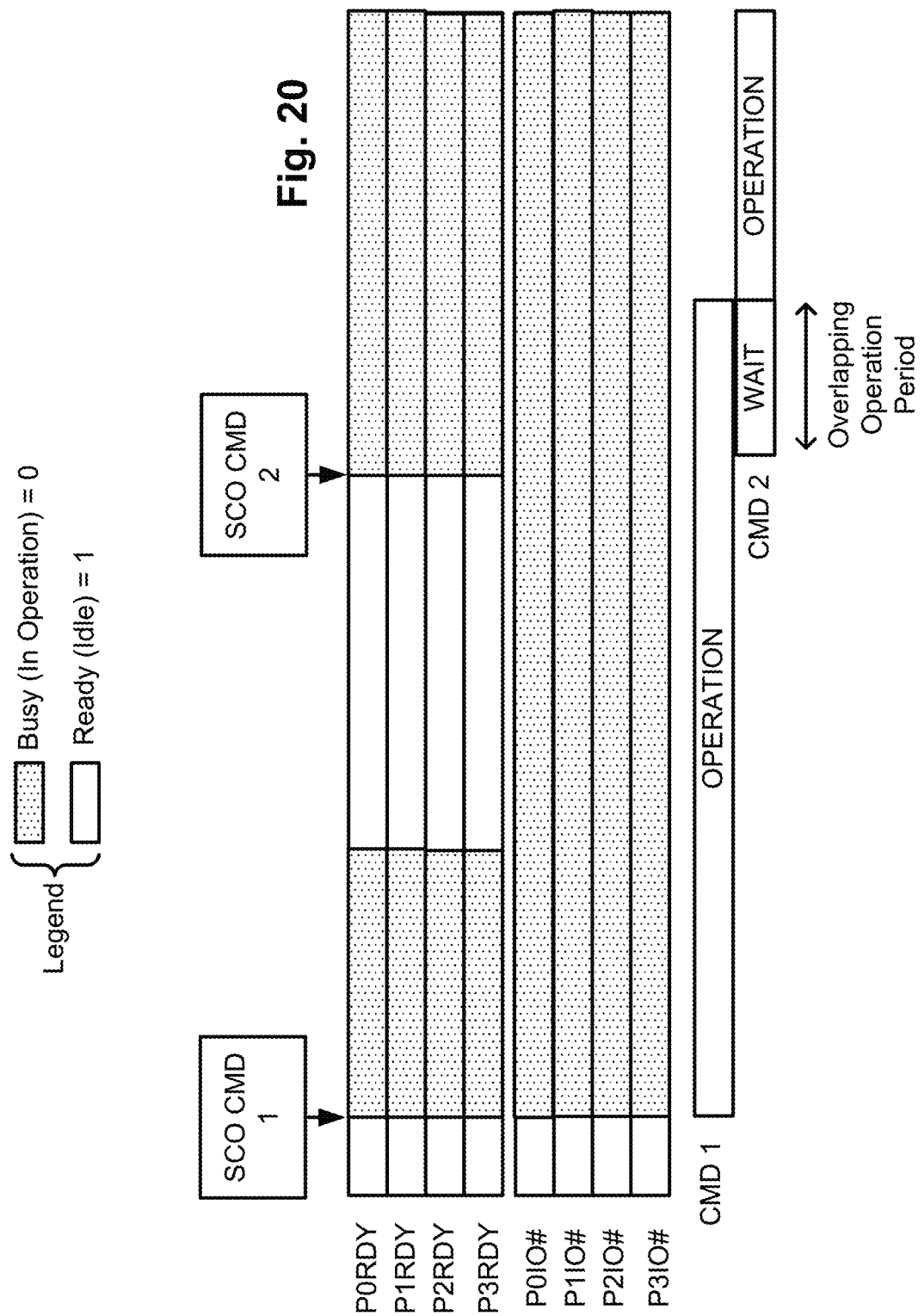
FIG. 20 illustrates an example in which a second SCO command is issued during operation of a first SCO command.

FIG. 20 illustrates an example in which a second SCO command is issued during operation of a first SCO command. After the SCO command 1 is issued, the chip becomes busy (all PxRDY=0) only for the phase 1, then it returns to ready (all PxRDY=1) after the phase 1 is done. The new SCO command 2 can be issued by a host, and accepted at the memory device, even though the phase 2 for the previous command is still progressing. However, the second SCO operation is not started unless the first command operation finishes, therefore, it still meets the SCO criterion. In other words, there is an "overlapping operation" period during which the second SCO operation is not started until the first command operation finishes.

Figure 21:
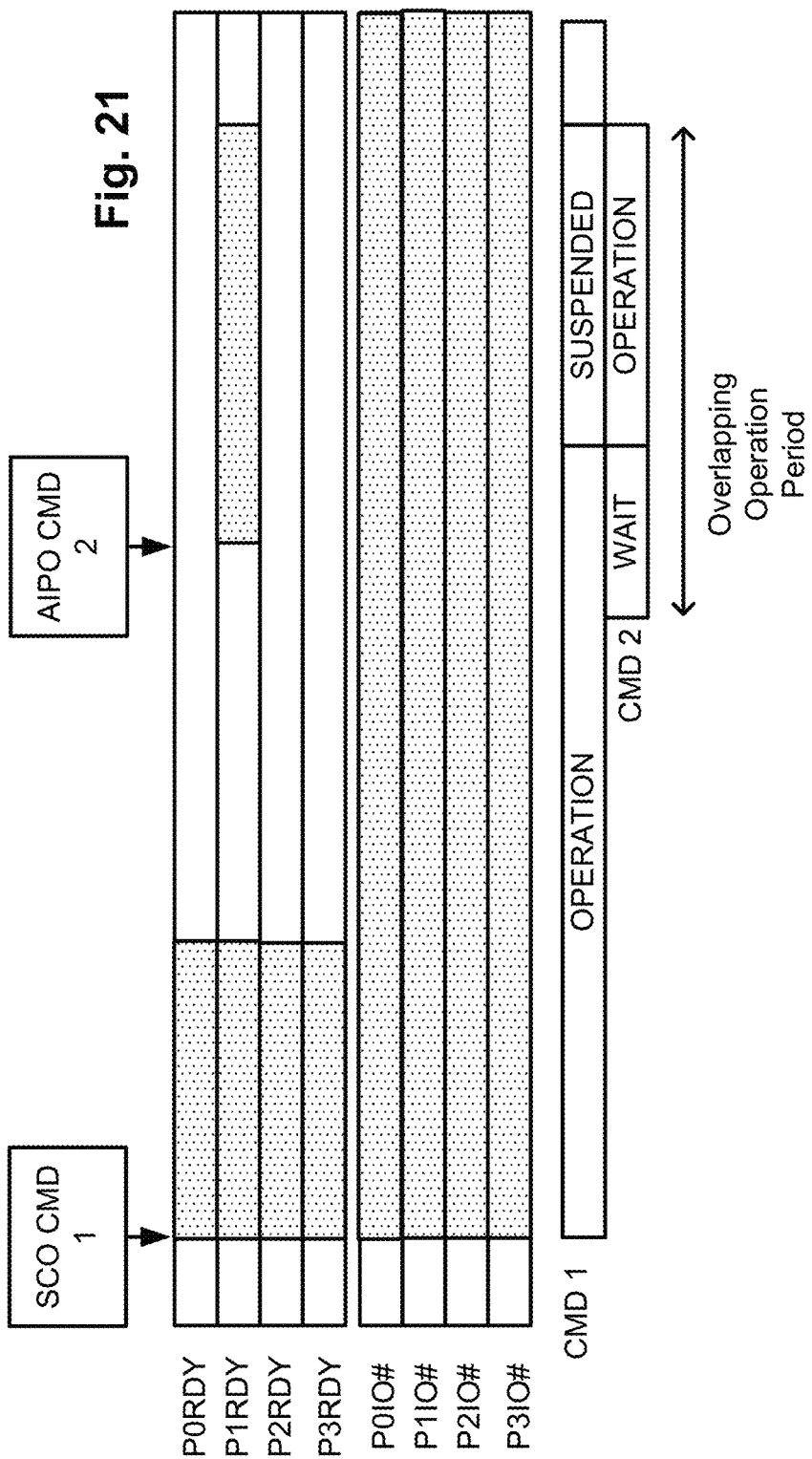
FIG. 21 illustrates an example in which an AIPO command can be issued by a host, and accepted at the memory device, which suspends an operation of a previous SCO command.

FIG. 21 illustrates another example, in which an AIPO command can be issued by a host, and accepted at the memory device, which suspends an operation of a previous SCO command. After the SCO command 1 is issued, the chip becomes busy (all PxRDY=0) only for the phase 1, then it returns to ready (all PxRDY=1) after the phase 1 is done. The new AIPO command 2 can be issued by a host, and accepted at the memory device, even though the phase 2 for the previous command is still progressing. In this case, there is an overlapping operation period that the previous operation is suspended to execute the new command and automatically resumes the old operation after the new operation is finished. This can be a special case applied when one command has higher priority than another command.

A variety of example configurations are described herein that can be supported by embodiments of plane busy and plane in operation status signals. One example can be characterized as follows:
1. If there are no background operations (PxRDY=PxIO #=1).
    i. If the selected plane is ready (idle) (PxRDY=PxIO #=1), an AIPO command (including "with" and "without" background operations AIPO commands) can be issued by a host, and accepted at the memory device, for the selected plane.
    ii. If all planes are ready (idle) (PxRDY=PxIO #=1), an SCO command (including "with" and "without" background operations SCO commands) can be issued by a host, and accepted at the memory device.
2. If there are background operations (PxRDY=1 and PxIO #=0).
    i. If the background operation is a "with" background operation AIPO operation for the selected plane, a selected AIPO command can be issued by a host, and accepted at the memory device, for the selected plane.
    ii. If the background operation is a "with" background operation AIPO operation for the non-selected plane, an AIPO command (including "with" and "without" background operations AIPO commands) can be issued by a host, and accepted at the memory device, for the selected plane.
    iii. If the background operation is a "with background operation SCO operation, a selected SCO or AIPO command can be issued by a host, and accepted at the memory device.
    iv. Please note that the selected commands mentioned here are not just "with" (SCO/AIPO) commands, they may also include the "without" (SCO/AIPO) commands.
3. If the selected plane is busy (in operation) (PxRDY=PxIO #=0), no AIPO or SCO command can be issued by a host, and accepted at the memory device, to the selected plane.

Thus, in some configurations, "with" and "without" background operations commands can be issued by a host, and accepted at the memory device, when no background operation is ongoing (PxRDY=PxIO #=1).

Also, selected commands can be issued by a host, and accepted at the memory device, during background operations (PxRDY=1 & PxIO #=0), including commands that are not "with" background operations commands.

A technology described herein includes a chip device with multiple planes (e.g., the memory system described herein), which supports both the synchronous chip commands for the type 1 operation (a first type of operation, a select first type of operation, a first type of command, etc.) and the asynchronous independent commands for the type 2 operation (a second type of operation, a select second type of operation, a second type of command, etc.). Example commands include a command to proceed with or abort read and write operations of the memory array.

A Type 1 command selects one or more planes for one type 1 operation. A Type 2 command selects only one plane for one type 2 operation.

Both type 1 and type 2 operations include a foreground operation, some of the type 1 and type 2 operations include an additional background operation.

A Type 1 operation can be a synchronous chip operation SCO in which only one operation is executed for one or more selected planes in one time and the operation starts and ends in the same time for all selected planes. A Type 2 operation can be an asynchronous plane operation AIPO in which the operation for each individual plane is executed asynchronously and independently from the operation for other planes.

In examples described herein, each plane provides one "ready for new command" busy status signal PxRDY to indicate the plane is ready for next command while PxRDY is ready, and another "idle" status signal PxIO # to indicate no ongoing operation while PxIO # is ready. For a type 1 operation, all planes including both in operation (busy) and idle (ready) planes have the same status signals for both PxRDY (busy/read) and PxIO #(in operation/idle) because it is a chip based operation. For a type 2 operation, the plane busy status signal PxRDY and the plane in operation status signal PIO # of one plane is independent of the status of another plane, except the first phase of the foreground operation period for some embodiments.

Figure 22:
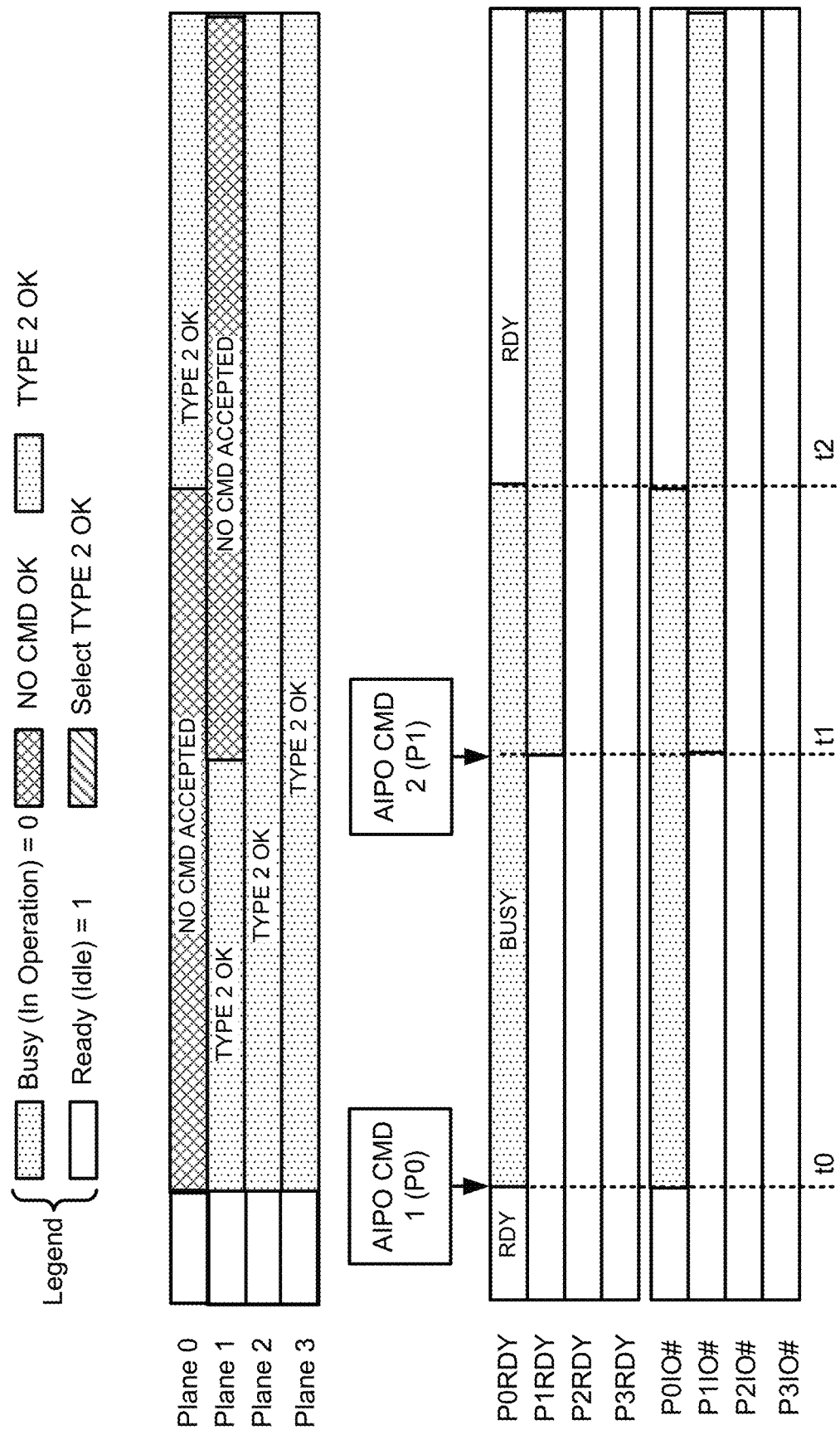
FIG. 22 illustrates command acceptance parameters and status signals for a sequence of AIPO commands addressed to different planes.
Figure 23:
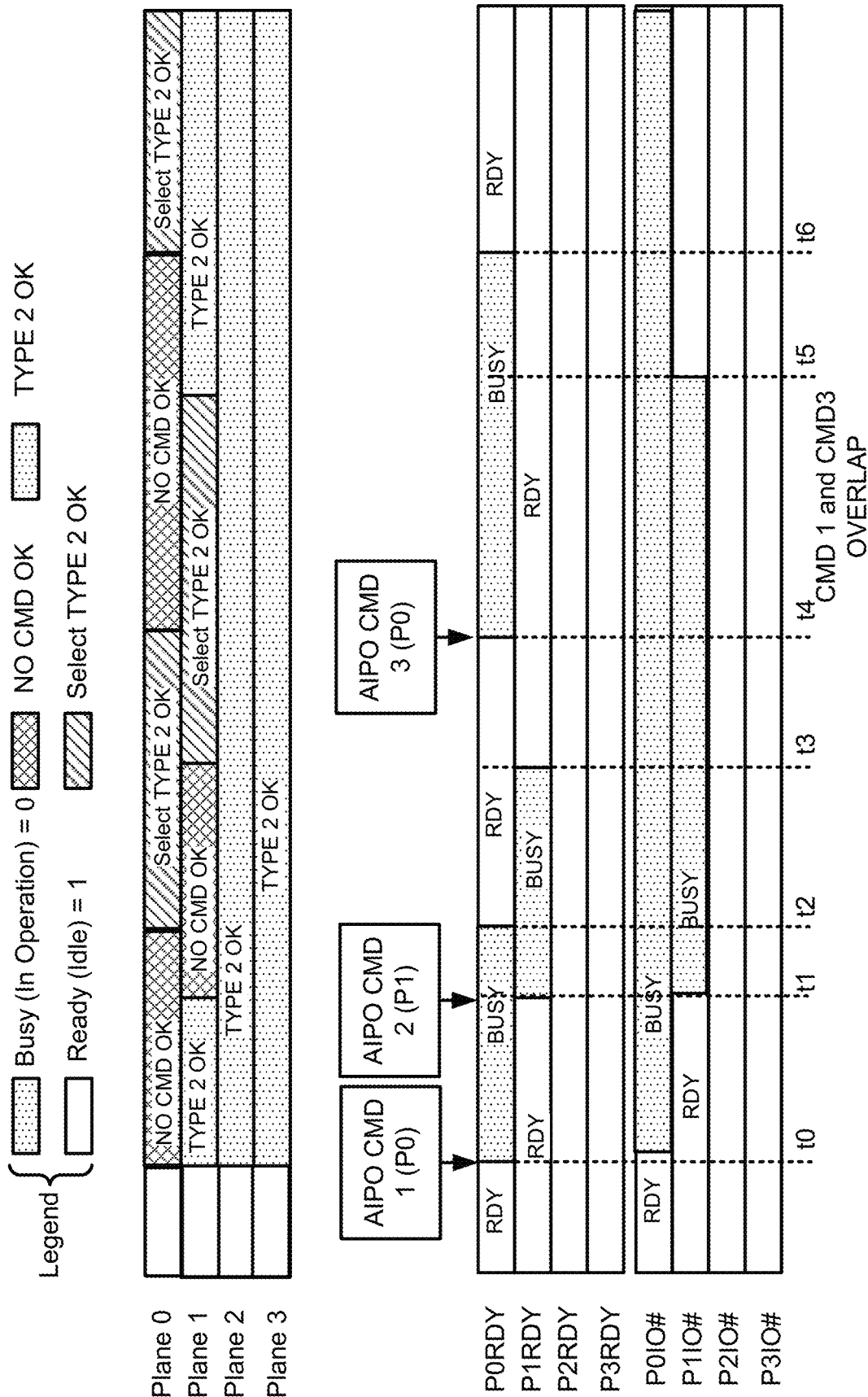
FIG. 23 illustrates command acceptance parameters and status signals for a sequence of AIPO commands with overlapping operations.

A Type 2 operation can be an asynchronous plane operation AIPO in which the operation for each individual plane is executed asynchronously and independently from the operation for other planes. A type 2 operation can have a first embodiment in which only foreground operations are executed, and a second embodiment in which a background operation is executed. A type 2 operation starts after the chip receives a type 2 command sequence with one selected plane (the target plane). The type 2 operation starts with one foreground operation for the selected plane and the plane busy status signal PxRDY is set to busy and the plane in operation status signal PxIO # is set to in operation for the selected plane during the foreground operation period. (refer to FIG. 22 and FIG. 23). After the foreground operation is done some operations are finished and the plane busy status signal PxRDY is returns to ready and the plane in operation status signal PxIO # returns to idle (FIG. 22). Some operations continue the background operation, the PxRDY returns to ready and the PxIO # remains in operation (FIG. 23). After the background operation is done, the PxIO # returns to idle.

Issuing a new type 2 command to a non-selected plane is allowed while the type 2 operation is ongoing for the selected planes (FIG. 22). Issuing a new type 2 command to a selected plane during its foreground operation period (PxRDY is busy) is forbidden. Issuing a selected Type 2 command is allowed for a selected plane during its background operation period (PxRDY is ready but PIO # is in operation) (FIG. 23). In FIG. 23, an overlapping operation period is a partial period between t4 and t6. During the overlapping operation period, both PRDY and PIO # are busy.

FIG. 22 is a diagram illustrating logic for accepting and denying commands for planes P0-P3 in an upper portion of the diagram, and the ready/busy (idle/in operation) states of the status bits PxRDY and PxIO # in a lower portion of the diagram for the case in which a type 2 command (AIPO) for plane P0 that does not include a background operation, is received at time to and a second type 2 command for P1 that does not include a background operation, is received at time t1. Before time to, all of the status bits are in the ready (ide) state, and the control logic on the memory device can accept any type of command. At time t0, the device starts at foreground operation in plane P0 and sets the status bits for plane P0, P0RDY and P0IO #, to the busy (in operation) state. The status bits for planes P1 to P3 remain in the ready (idle) state.

Between times t0 and t1, the logic for accepting and denying commands can accept other type 2 commands for planes P1 to P3. No commands targeting the plane P0 will be accepted. Type 1 commands will be denied in this interval.

At time t1, a second type 2 command is received targeting plane P1. The device accepts the command, and starts at foreground operation in plane P1. Also, the device sets the status bits for plane P1, P1RDY and P1IO #, to the busy (in operation) state. The status bits for planes P2 to P3 remain in the ready (idle) state. The status bits for plane P0 remain in the busy (in operation) state corresponding to execution of the foreground operation of the first command. No commands targeting the plane P0 or P1 will be accepted. Type 1 commands will be denied in this interval.

At time t2, the foreground operation of the first command is completed and the status bits for plane P0, P0RDY and P0IO #, are changed to the ready (idle) state, allowing type 2 commands targeting plane P0. The foreground operation of the second command is completed at a later time, and the status bits and logic for accepting and denying commands is changed in a manner similar to that described for the first command.

FIG. 23 is a diagram illustrating logic for accepting and denying commands for planes P0-P3 in an upper portion of the diagram, and the ready/busy (idle/in operation) states of the status bits PxRDY and PxIO # in a lower portion for the case in which a type 2 command (AIPO) for plane P0 that includes both a foreground operation and a background operation, is received at time to, a second type 2 command for P1 that includes both a foreground operation and a background operation, is received at time t1, a third type 2 command for P0 that includes a foreground operation and a background operation, is received at time t4. Before time t0, all of the status bits are in the ready (idle) state, and the control logic on the memory device can accept any type of command.

At time t0, the device starts at foreground operation in plane P0 and sets the status bits for plane P0, P0RDY and P0IO #, to the busy (in operation) state. The background operation commences at the beginning of, or during, the in operation state of P0IO #. The status bits for planes P1 to P3 remain in the ready (idle) state. The device cannot accept new commands for plane P0. The device can accept new type 2 commands for planes P1 to P3.

At time t1, the device starts a foreground operation in plane P1 and sets the status bits for plane P1, P1RDY and P1IO #, to the busy (in operation) state. The background operation commences at the beginning of, or during, the in operation state of P1IO #. The status bits for planes P2 and P3 remain in the ready (idle) state. The status bit for P0 remain unchanged. The device cannot accept new commands for planes P0 or P1. The device can accept new type 2 commands for planes P2 and P3.

At time t2, the foreground operation in plane P0 completes, and the P0RDY status bit changes to the ready state. The status bits for planes P1 to P3 remain unchanged. At this time, the device can accept select type 2 commands for plane P0.

At time t3, the foreground operation in plane P1 completes, and the P1RDY status bit changes to the ready state. The status bits for planes P0, P2 and P3 remain unchanged. At this time, the device can accept select type 2 commands for plane P1.

At time t4, the third type 2 command is received targeting plane P0. The device starts an overlapping operation period that the foreground operation of P0 is on hold until the background operation for the first type 2 command targeting plane P0 is done and sets the status bits for plane P0, P0RDY and P0IO #, to the busy (in operation) state. In this example, the background operation for the first type 2 command targeting plane P0 has not completed. Thus, there is an overlap between the operations of the first and third commands in sequence. The foreground operation commences for the third command during the busy state of P0RDY when the resources are freed up by the memory operations executed according to the first command. The status bits for planes P2 and P3 remain in the ready (idle) state. The status bits for P1 remains unchanged. The device cannot accept new commands for plane P0. The device can accept select type 2 commands targeting plane P1. The device can accept new type 2 commands for planes P2 and P3.

At time t5, the background operation in plane P1 completes, and the P1IO # status bit changes to the ready state. The status bits for planes P0, P2 and P3 remain unchanged. At this time, the device can accept type 2 commands for plane P1.

At time t6, the foreground operation executed in response to the third command in plane P0 completes, and the P0RDY status bit changes to the ready state. The status bits for planes P1, P2 and P3 remain unchanged. At this time, the device can accept select type 2 commands for plane P0, and type 2 commands for planes P1, P2 and P3. The background operation executed in response third command continues until it is completed, at which point (not shown) the P0IO # status bit will be changed to the idle state.

In the embodiment described with reference to FIGS. 22 and 23, the foreground operations are executed without changing the status of unselected planes to the busy (in operation) state. In another embodiment, foreground operations are executed in a manner that requires changing the status of unselected planes to the busy (in operation) state during a first phase of the operation in which shared resources, such as command processing resources, might be required for execution of commands.

Figure 24:
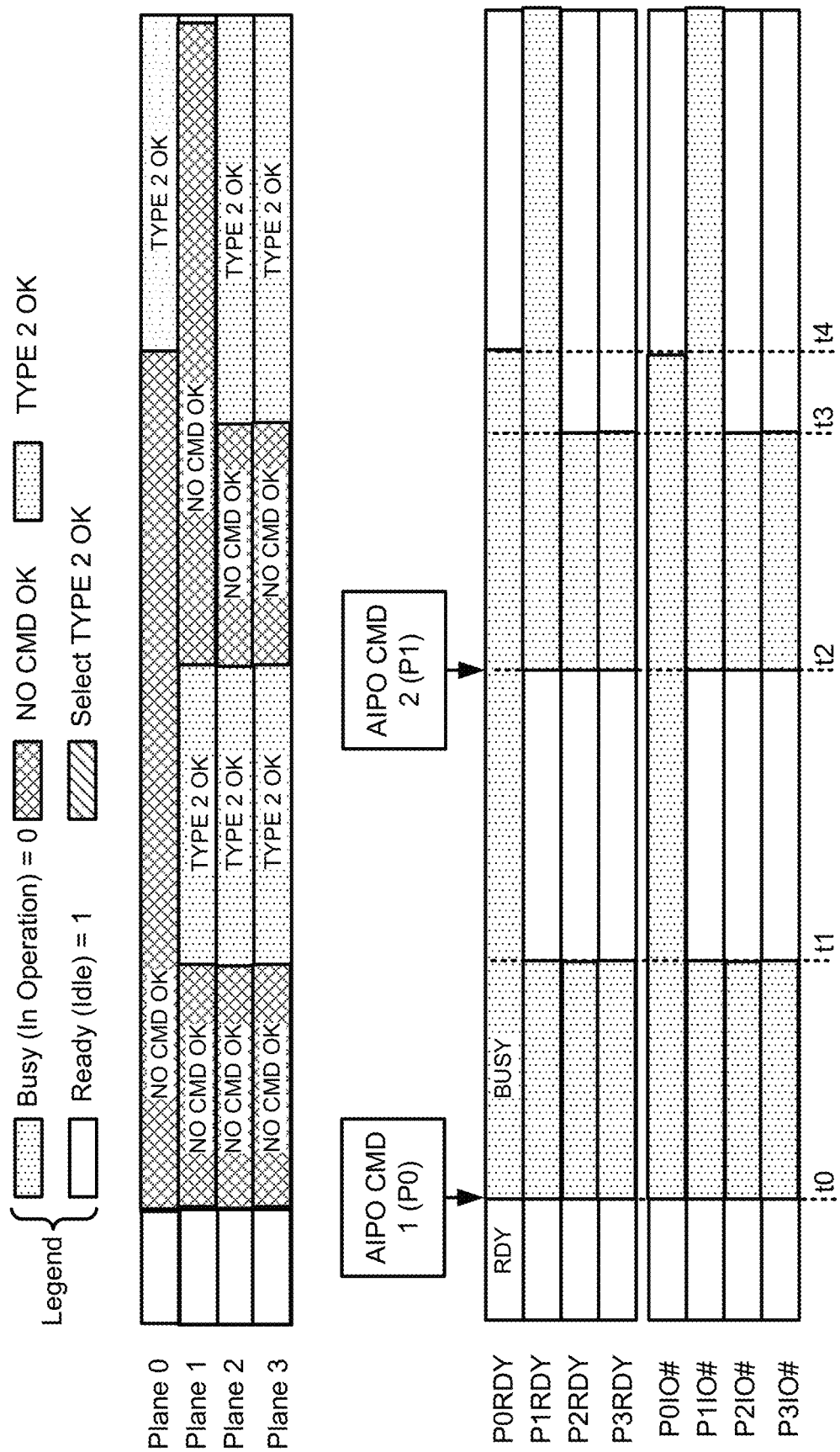
FIG. 24 illustrates command acceptance parameters and status signals for a sequence of AIPO commands invoking foreground operations having a first phase affecting a plurality of planes.
Figure 25:
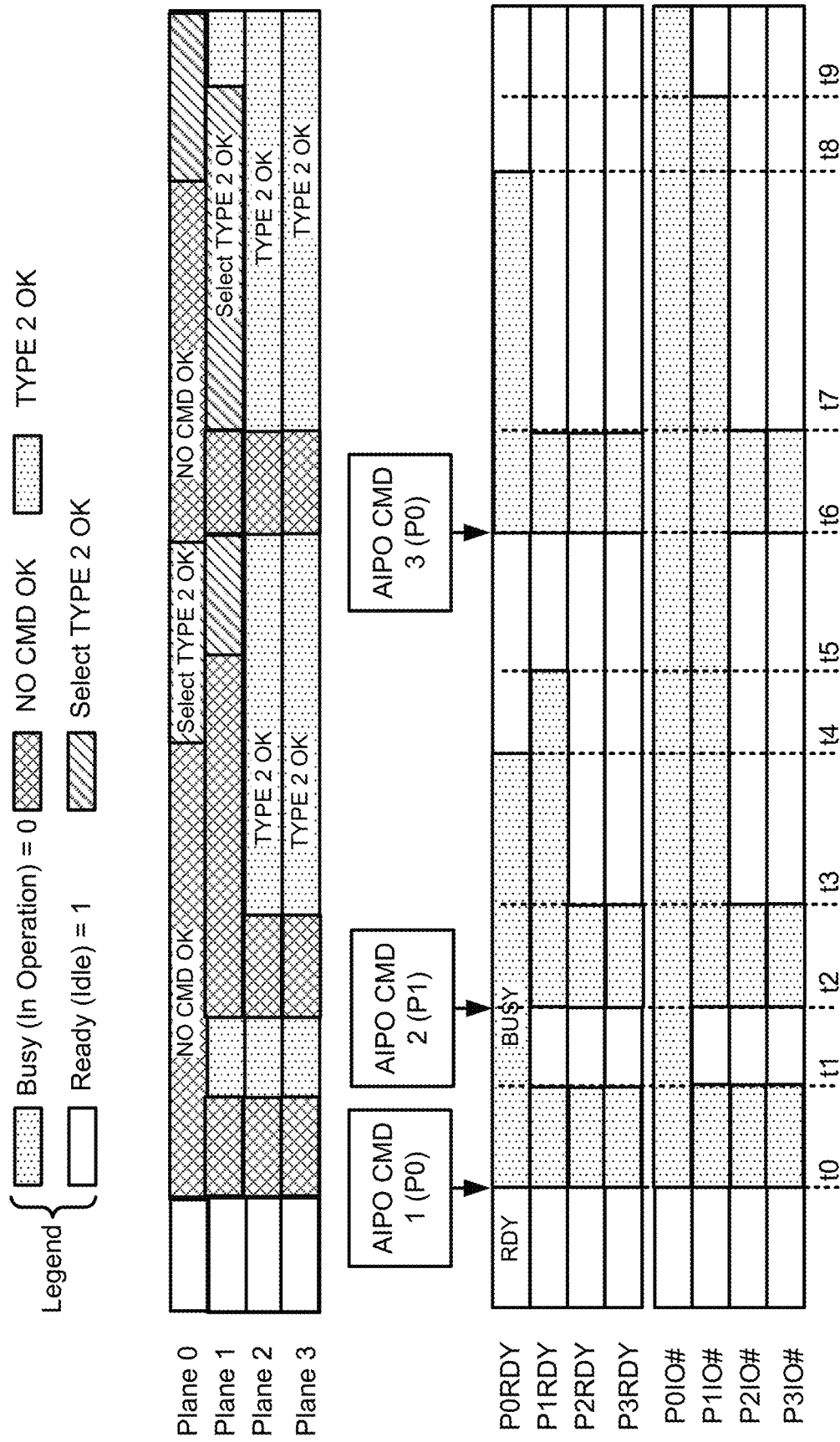
FIG. 25 illustrates command acceptance parameters and status signals for a sequence of AIPO commands invoking background operations having a first phase affecting a plurality of planes.

FIGS. 24 and 25 represent the logic for accepting and denying commands, and for setting and resetting the status signals for type 2 commands in which foreground operations are executed in a manner that requires changing the status of unselected planes to the busy (in operation) state during a first phase of the foreground operation.

FIG. 24 is a diagram illustrating logic for accepting and denying commands for planes P0-P3 in an upper portion of the diagram, and the ready/busy (idle/in operation) states of the status bits PxRDY and PxIO # in a lower portion for the case in which a type 2 command (AIPO) for plane P0 that does not include a background operation, is received at time to and a second type 2 command for P1 that does not include a background operation, is received at time t2. Before time to, all of the status bits are in the ready (idle) state, and the control logic on the memory device can accept any type of command. At time t0, the device starts at foreground operation in plane P0 and sets the status bits for planes P0 to P3, PxRDY and PxIO #, to the busy (in operation) state.

At time t1, the first phase of operations of the command targeting plane P0 is completed, and the status bits for planes P1 to P3 are changed to the ready (idle) state.

Between times t0 and t1, the logic for accepting and denying commands denies all commands.

At time t1, the logic can accept other type 2 commands for planes P1 to P3. No commands targeting the plane P0 will be accepted. Type 1 commands will be denied in this interval.

At time t2, a second type 2 command is received targeting plane P1. The device accepts the command, and starts at foreground operation in plane P1. Also, the device sets the status bits PxRDY and PxIO # for planes P2 and P3 to the busy (in operation) state. The status bits for plane P0 remain in the busy (in operation) state corresponding to execution of the foreground operation of the first command. No commands targeting the plane P0, P1, P2 or P3 will be accepted.

At time t3, the first phase of operations of the command targeting plane P1 is completed, and the status bits for planes P2 and P3 are changed to the ready (idle) state. The status bits for plane P0 remain unchanged because of the ongoing operations.

Between times t2 and t3, the logic for accepting and denying commands denies all commands.

At time t3, the logic can accept other type 2 commands for planes P2 and P3. No commands targeting the plane P0 or P1 will be accepted. Type 1 commands will be denied in this interval.

At time t4, the foreground operation of the first command is completed and the status bits for plane P0, P0RDY and P0IO #, are changed to the ready (idle) state, allowing type 2 commands targeting plane P0 to be accepted. The foreground operation of the second command is completed at a later time, and the status bits and logic for accepting and denying commands is changed in manner similar to that described for the first command.

FIG. 25 is a diagram illustrating logic for accepting and denying commands for planes P0-P3 in an upper portion of the diagram, and the ready/busy (idle/in operation) states of the status bits PxRDY and PxIO # in a lower portion of the diagram for the case in which a type 2 command (AIPO) for plane P0 that includes both a two phase foreground operation and a background operation, is received at time to, a second type 2 command for P1 that includes both a two phase foreground operation and a background operation, is received at time t2, a third type 2 command for P0 that includes both a two phase foreground operation and a background operation, is received at time t6. Before time t0, all of the status bits are in the ready (idle) state, and the control logic on the memory device can accept any type of command.

At time t0, the device starts at foreground operation in plane P0 and sets the status bits, PxRDY and PxIO #, for all planes to the busy (in operation) state. The background operation commences at the beginning of, or during, the in operation state of P0IO #. The device cannot accept new commands for planes P0 to P3.

At time t1, the first phase of operations of the command targeting plane P0 is completed, and the status bits for planes P1 to P3 are changed to the ready (idle) state.

Between times t0 and t1, the logic for accepting and denying commands denies all commands.

At time t1, the logic can accept other type 2 commands for planes P1 to P3. No commands targeting the plane P0 will be accepted. Type 1 commands will be denied in this interval.

At time t2, the device starts a foreground operation in plane P1 in response to the second command targeting plane P1, and sets the status bits for planes P1 to P3 to the busy (in operation) state. The background operation commences at the beginning of, or during, the in operation state of P1IO #. The status bit for P0 remain unchanged. The device cannot accept new commands for planes P0, P1, P2 or P3.

At time t3, the first phase of operations of the command targeting plane P1 is completed, and the status bits for planes P2 and P3 are changed to the ready (idle) state.

Between times t2 and t3, the logic for accepting and denying commands denies all commands.

At time t3, the logic can accept other type 2 commands for planes P2 and P3. No commands targeting the planes P0 and P1 will be accepted. Type 1 commands will be denied in this interval.

At time t4, the foreground operation in plane P0 completes, and the P0RDY status bit changes to the ready state. The status bits for planes P1 to P3 remain unchanged. At this time, the device can accept select type 2 commands for plane P0.

At time t5, the foreground operation in plane P1 completes, and the P1RDY status bit changes to the ready state. The status bits for planes P0, P2 and P3 remain unchanged. At this time, the device can accept select type 2 commands for plane P0 and for plane P1.

At time t6, the third type 2 command is received targeting plane P0. The device starts an overlapping operation period that the foreground operation of P0 is on hold until the background operation for the first type 2 command targeting place P0 is done and sets the status bits for planes P0 to P4 to the busy (in operation) state. In this example, the background operation for the first type 2 command targeting plane P0, and the background operation for the second type 2 command targeting plane P1 have not completed. Thus, there is an overlap between the background operations of the first and third commands targeting plane P0 in sequence. The operation commences for the third command during the busy state of P0RDY, when the resources are freed up by the memory operations executed according to the first command. The device cannot accept new commands for planes P0 to P3.

At time t7, the first phase of operations of the third command targeting plane P0 is completed, and the status bits for planes P2 to P3 are changed to the ready (idle) state. The P1IO # status bit for plane P1 remains in operation as a result of the background operations executed in response to the second command. Between times t6 and t7, the logic for accepting and denying commands denies all commands.

At time t7, the logic can accept other type 2 commands for planes P2 and P3. Select type 2 commands can be accepted targeting plane P1. No commands targeting the plane P0 will be accepted. Type 1 commands will be denied in this interval.

At time t8, the foreground operation executed in response to the third command in plane P0 completes, and the P0RDY status bit changes to the ready state. The status bits for planes P1, P2 and P3 remain unchanged. At this time, the device can accept select type 2 commands for plane P0 and for plane P1, and all type 2 commands for planes P2 and P3. The background operation executed in response third command continues until it is completed, at which point (not shown) the P0IO # status bit will be changed to the idle state.

At time t9, the background operation in plane P1 completes, and the P1IO # status bit changes to the idle state. The status bits for planes P0, P2 and P3 remain unchanged. At this time, the device can accept type 2 commands for planes P1, P2 and P3. Only select type 2 commands are accepted for plane P0.

Figure 26:
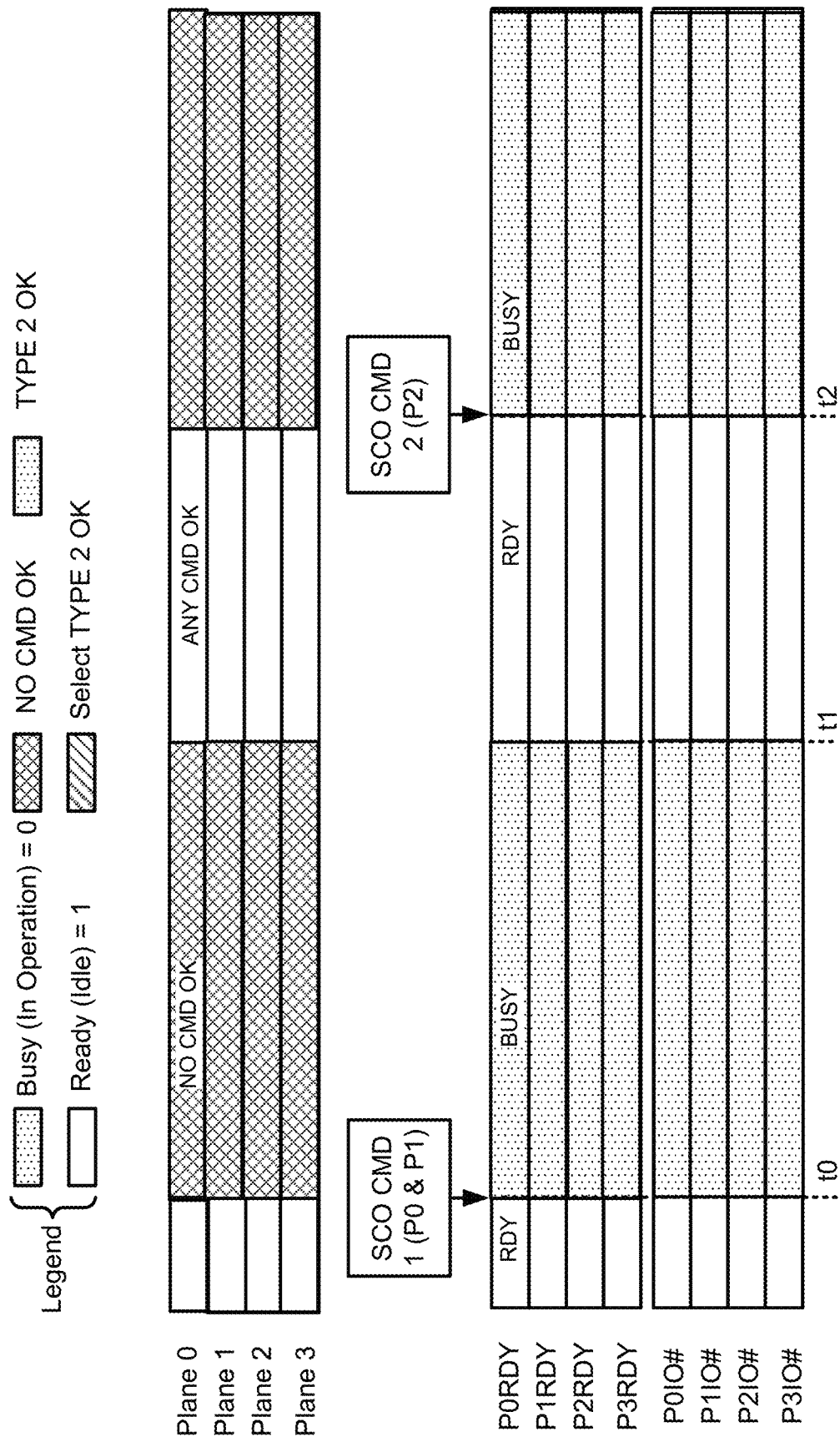
FIG. 26 illustrates command acceptance parameters and status signals for a sequence of SCO commands invoking foreground operations.

FIG. 26 is a diagram illustrating logic for accepting and denying commands for planes P0-P3 in an upper portion of the diagram, and the ready/busy (idle/in operation) states of the status bits PxRDY and PxIO # in a lower portion of the diagram for the case in which a sequence of type 1 commands, without background operations is received. A first type 1 command (SCO command) targeting planes P0 and P1 is received at time to and a second type 1 command for plane P2 is received at time t2. Before time t0, all of the status bits are in the ready (idle) state, and the control logic on the memory device can accept any type of command. At time to, the device starts an operation and sets the status bits, PxRDY and PxIO #, for all planes P0 to P3 to the busy (in operation) state.

At time t1, the operation of the first command is completed and the status bits, PxRDY and PxIO #, for all planes P0 to P3 to the ready (idle) state. Between times t0 and t1, the logic for accepting and denying commands can deny all commands.

At time t2, a second type 1 command without a background operation is received targeting plane P2. The device accepts the command, and starts at foreground operation in plane P2. Also, the device sets the status bits, PxRDY and PxIO #, for all planes P0 to P3 to the busy (in operation) state. All commands will be denied in the interval following time t2 until the status bits are changed.

Figure 27:
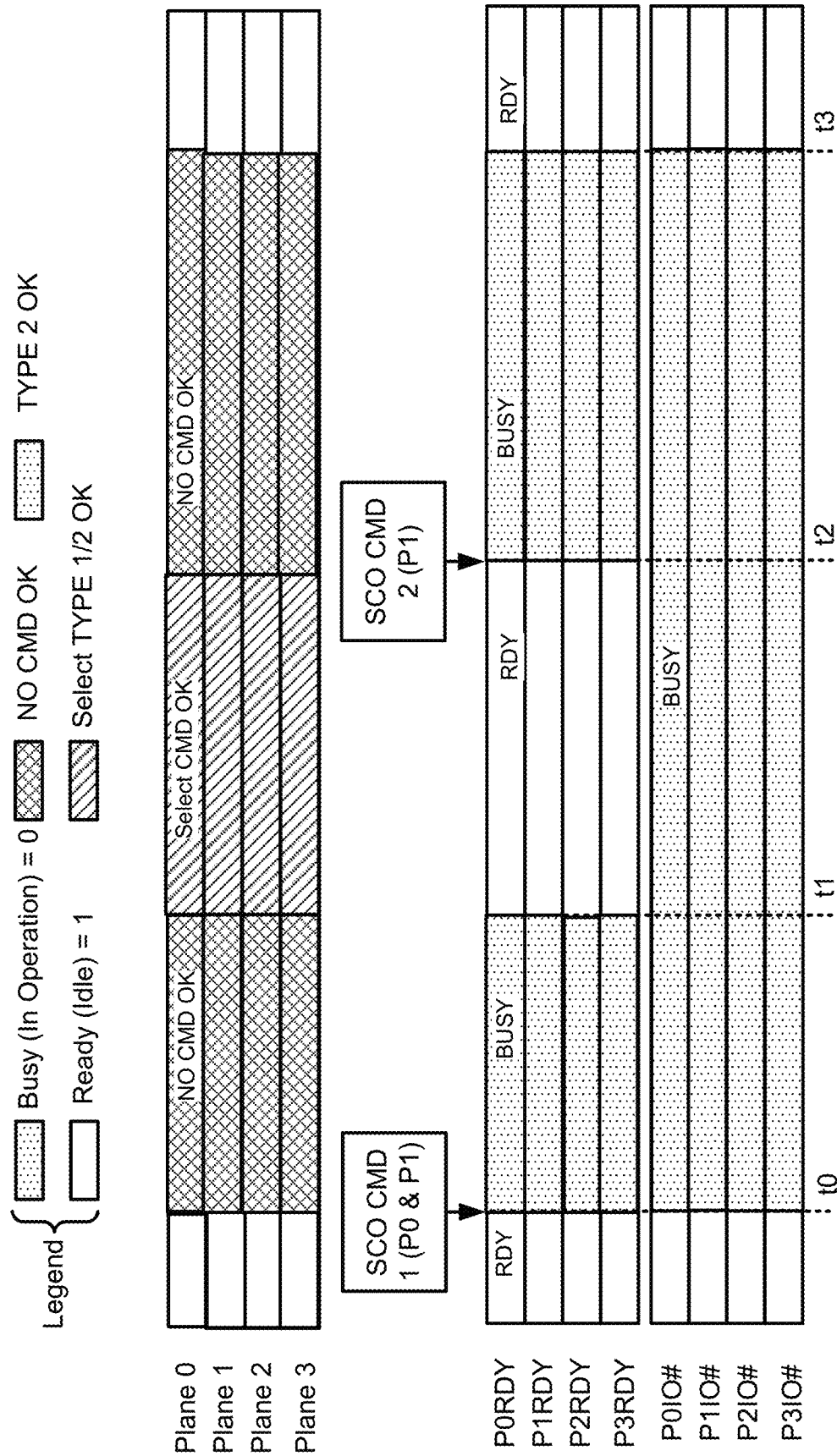
FIG. 27 illustrates command acceptance parameters and status signals for a sequence of SCO commands invoking background operations.

FIG. 27 is a diagram illustrating logic for accepting and denying commands for planes P0-P3 in an upper portion of the diagram, and the ready/busy (idle/in operation) states of the status bits PxRDY and PxIO # in a lower portion of the diagram for the case in which a sequence of type 1 commands is received. A first type 1 command (SCO command) with background operations targeting planes P0 and P1 is received at time t0 and a second type 1 command for plane P1 is received at time t2. Before time t0, all of the status bits are in the ready (idle) state, and the control logic on the memory device can accept any type of command. At time to, the device starts an operation and sets the status bits, PxRDY and PxIO #, for all planes P0 to P3 to the busy (in operation) state.

At time t1, the foreground operation of the first command is completed and the status bits PxRDY for all planes P0 to P3 to the ready state, while the status bits PxIO # for all planes P0 to P3 remain in the in operation state while the background operation is being executed. Between times t0 and t1, the logic for accepting and denying commands can deny all commands.

At time t2, a second type 1 command without a background operation is received targeting plane P1. The device accepts the command, and starts an overlapping operation period that the foreground operation of the second command is held until the background operation of the first command is done. Also, the device sets the status bits, PxRDY and PxIO #, for all planes P0 to P3 to the busy (in operation) state. Between times t1 and t2, the logic for accepting and denying commands can allow select commands.

At time t3, the foreground operation for the second command completes. Also in this example, the background operation for the first command completes before time t3, allowing the status bits, PxRDY and PxIO #, for all planes P0 to P3 to return to the ready (idle) state at time t3. All commands will be denied in the interval between time t2 and t3.

Figure 28:
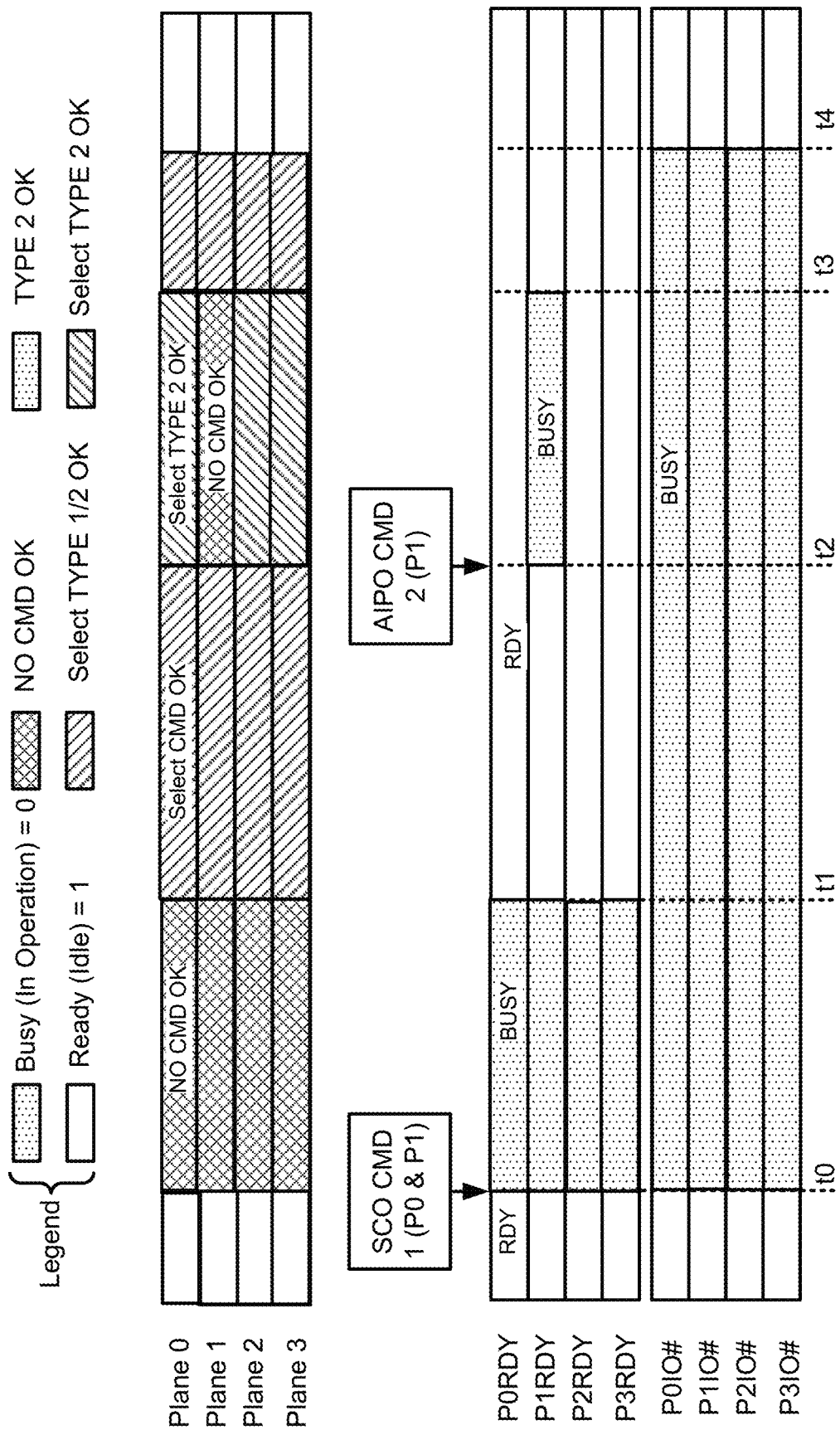
FIG. 28 illustrates command acceptance parameters and status signals for a sequence of an SCO command followed by an AIPO operation.

FIG. 28 is a diagram illustrating logic for accepting and denying commands for planes P0-P3 in an upper portion of the diagram, and the ready/busy (idle/in operation) states of the status bits PxRDY and PxIO # in a lower portion of the diagram for the case in which a sequence of type 1 (e.g., SCO) and type 2 (e.g., AIPO) commands is received. A first type 1 command (SCO command) with background operations targeting planes P0 and P1 is received at time to and a second type 2 command without background operations for plane P2 is received at time t2. Before time to, all of the status bits are in the ready (idle) state, and the control logic on the memory device can accept any type of command. At time t0, the device starts an operation and sets the status bits, PxRDY and PxIO #, for all planes P0 to P3 to the busy (in operation) state.

At time t1, the foreground operation of the first command is completed and the status bits PxRDY for all planes P0 to P3 change to the ready (idle) state, while the status bits PxIO # for all planes P0 to P3 remain in the busy (in operation) state while the background operation is being executed. Between times to and t1, the logic for accepting and denying commands can deny all commands.

At time t2, a second type 2 command without a background operation is received targeting plane P1. Between times t1 and t2, the logic for accepting and denying commands can allow select commands. The received command is one of the select commands allowable with this combination of status bits and current operation. The device accepts the command, and starts an overlapping operation period that the background operation of the first command is suspended and the foreground operation of the second command starts because this foreground operation has higher priority than the suspended background operation. The status bit P1RDY for plane 1 is changed to the busy state. The status bits PxRDY for planes P0, P2 and P3 remain in the ready state. The status bits PxIO #, for all planes P0 to P3 remain in the in operation state as the background operation for the first command executes.

At time t3, the foreground operation for the second command completes and the background operation for the first command automatically resumes. The status bit P1RDY for plane P1 is changed to the ready state. The status bits PxRDY for planes P0, P2 and P3 remain in the ready state. The status bits PxIO #, for all planes P0 to P3 remain in the in operation state as the background operation for the first command executes. Only select type 2 commands will be accepted in the interval between times t2 and t3 for planes P0, P2 and P3.

In this example, the background operation for the first command continues to time t4, allowing the status bits, PxRDY and PxIO #, for all planes P0 to P3 to return to the ready (idle) state at time t4. All commands will be denied in the interval between time t2 and t3 for plane P1.

Figure 29:
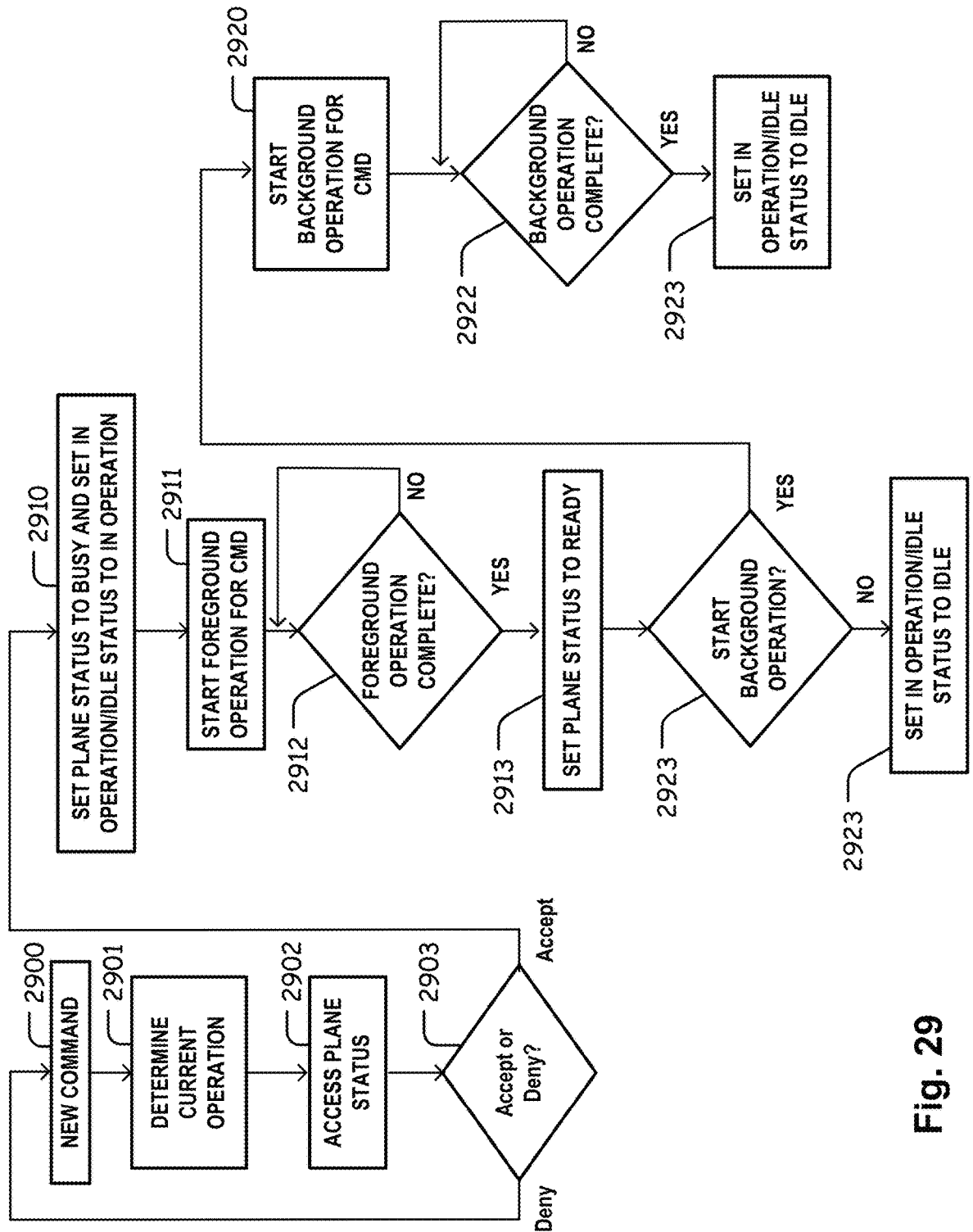
FIG. 29 is a flowchart illustrating control logic on an integrated circuit memory device to accept or deny commands and to update status signals as described herein.

FIG. 29 is a flowchart illustrating logic executed by control logic in a system like that of FIG. 1B, as mentioned above. In this example, a new command is received (2900) and applied to a command decoder. Logic circuits can include state machines and registers that provide signals indicating the current operation being executed, whether the current operation utilizes the first set of resources or the second set of resources or both, and other state information. The control logic determines what current foreground and/or background operation or operations are being executed (2901), and accesses the status control circuit for the plane status of the plurality planes in the device (2902). This information is then applied to determine whether the new command received at (2900) is a valid command, which can be accepted or denied by the logic at step (2903). If the command is not valid, it can be denied and the logic returns to step 2900 to wait for a subsequent command.

If the command is valid at step 2903 (e.g., accepted), then the logic sets the plane status and in operation/idle bits (e.g., PxRDY and PxIO #) to busy and in operation (2910) and initiates the foreground operation for the command (2911). The timing of the initiation of the foreground operations and the setting of the status bits can be reversed, or they can be performed simultaneously.

In connection with foreground operations, the logic determines whether the foreground operation is completed at step 2912. If the operation is not complete, then the algorithm awaits completion. If the operation is complete, then the logic sets plane status bits (e.g., PxRDY) to ready (2913). The timing of the initiation of the background operations and the setting of the status bits can be reversed, or they can be performed simultaneously.

At step 2923 a determination is made as to whether a background operation can be started. If the background operation cannot be started, then step 2923 sets the in operation/idle status to idle. If the background operation can be started (determined in step 2923), then the background operation is started in step 2920. In connection with background operations, the logic determines whether the background operation is completed at step 2922. If the operation is not complete, and the algorithm awaits completion. If the operation is complete, then the logic sets in operation/idle status bits to idle (e.g., PxIO #) (2923).

More generally, FIG. 29 is an example of a method of operating a memory comprising a plurality of memory planes, each memory plane in the plurality of memory planes including a specific set of resources to store the data from/to the corresponding memory plane. The method comprises generating, for each memory plane of the plurality of memory planes, (i) a corresponding first status signal indicating a busy or a ready state of the specific set of resources in corresponding memory plane, and (ii) a corresponding second status signal indicating a busy or a ready state of the corresponding memory plane. Also, the method can include selectively allowing or denying execution of a memory command for a memory plane of the plurality of memory planes, based on the status of one or more of the plurality of first and second status signals.

Figure 30:
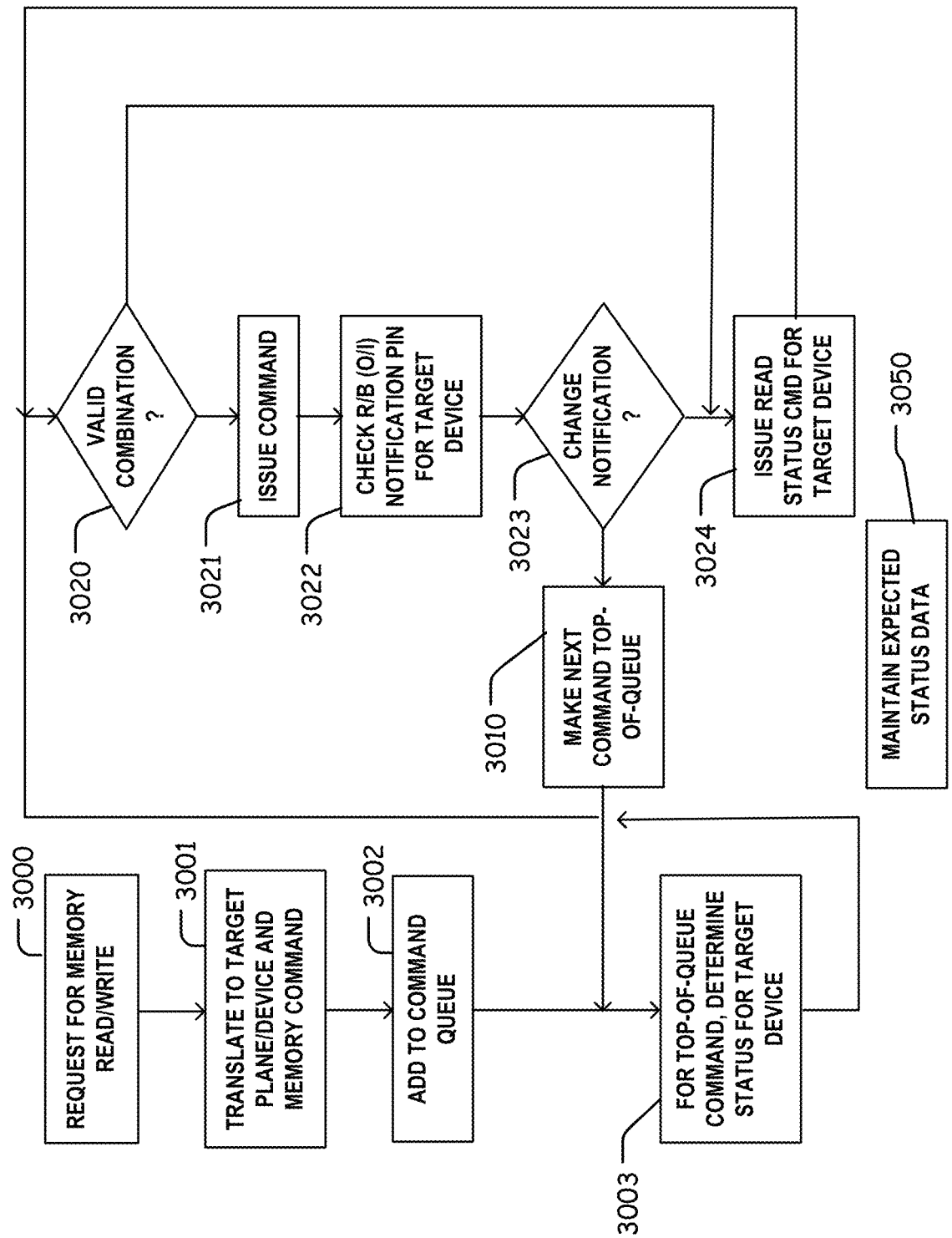
FIG. 30 is a flowchart illustrating an example of logic executed by a memory controller to issue commands dependent on the status signals as described herein.

FIG. 30 is a flowchart for logic executed by a host device or source device, an example of which is described above with respect to FIG. 1A. In this example, the process executed by the logic begins with upon receipt of a request for memory read/write operations from an external system source (3000). The logic then translates the request to target plane/device and memory command format required by the connected multiplane memory devices under its control (3001). Next, the translated commands are added to a command queue to be sent to the connected memory device (3002). The logic determines for a top-of-queue command the status of the target device (3003). Status of the target device can be maintained by the source node as expected status data, stored in memory accessible by the logic (3050). The expected status data can be updated using commands to read status from the various connected devices, as well as using local information about the commands that have been issued. With the status of the target device, and the top-of-queue command, the logic determines whether the command and the status are a valid combination (3020). If valid, then the logic can issue the command (3021). If it is not a valid combination, then the logic can issue a read status command for the target device (3024). In response to the read status command, a current status for the target device is returned. This information can be used to maintain the expected status data (3050). Also, this information can be used at step 3020 to determine whether the command, and the status bits returned by the read status command, form a valid combination.

Following issuance of the command, in some embodiments, the host logic can check a ready/busy (in operation/idle) notification pin(s) on the target device (3022), if used in the target device. The logic determines whether a change notification has been asserted at step 3023. If a change notification has been asserted, then the logic can make the next command in the queue the top-of-queue (3010), and return to step 3003. Also, the expected status data can be updated. If the change notification has not been asserted, then the logic can issue a read status command for the target device (3024). In response to the read status command as discussed above, a current status for the target device is returned. This information can be used to maintain the expected status data (3050). Also, this information can be used at step 3020 to determine whether the command, and the status bits returned by the read status command, form a valid combination.

The logic can continue to work through commands in the queue as the source device or host performs a memory system operation.

Figure 31:
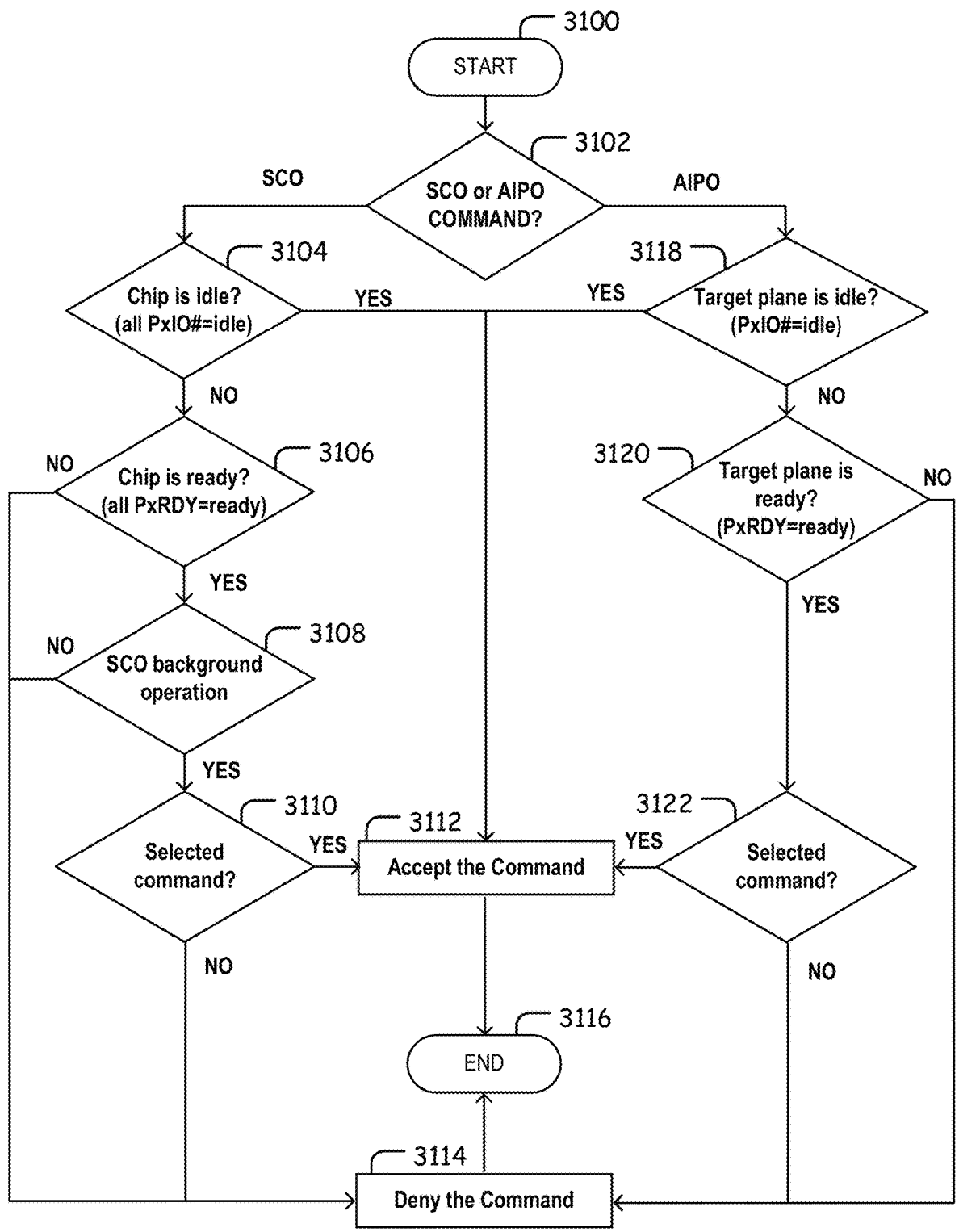
FIG. 31 is a flowchart illustrating example logic of accepting or denying SCO and AIPO commands.

FIG. 31 is a flowchart illustrating example logic of accepting or denying SCO and AIPO commands. Specifically, FIG. 31 illustrates that the logic starts at operation 3100 (e.g., control circuits can receive a memory command for execution). At operation 3102 a determination is made as to whether a new memory command is an SCO command or an AIPO command. The SCO command path will be described first and the AIPO command path will be described second.

If the new memory command is an SCO command operation 3104 will determine whether a chip is idle (e.g., PxIO #=ready for all memory planes on the chip). If operation 3104 determines YES, then the SCO command will be accepted in operation 3112 for execution. If operation 3104 determines NO, then operation 3106 will determine whether the chip is ready (e.g., PxRDY=ready for all memory planes on the chip). If operation 3106 determines NO, then operation 3114 will deny the SCO command. If operation 3106 determines YES, then operation 3108 will determine whether the SCO command includes a background operation. If operation 3108 determines NO, then operation 3114 will deny the SCO command. If operation 3108 determines YES, then operation 3110 will determine whether the SCO command is a selected command that can, for example, execute along with existing background operations (see FIG. 12 and description thereof for examples). If operation 3110 determines NO, then operation 3114 will deny the SCO command. If operation 3110 determines YES, then operation 3112 will accept the SCO command for execution. After operations 3112 and 3114, the process will end until a new memory command is received.

If the new memory command is an AIPO command operation 3118 will determine whether a target plane of a chip is idle (e.g., PxIO #=ready for the target plane). If operation 3118 determines YES, then the AIPO command will be accepted in operation 3112 for execution. If operation 3118 determines NO, then operation 3120 will determine whether the target plane of the chip is ready (e.g., PxRDY=ready for the particular target plane). If operation 3120 determines NO, then operation 3114 will deny the AIPO command. If operation 3120 determines YES, then operation 3122 will determine whether the AIPO command is a selected command that can, for example, execute along with existing background operations (see FIG. 12 and description thereof for examples). If operation 3122 determines NO, then operation 3114 will deny the AIPO command. If operation 3122 determines YES, then operation 3112 will accept the AIPO command for execution. After operations 3112 and 3114, the process will end until a new memory command is received.

A number of flowcharts illustrating logic executed by a memory controller or by a memory device are described herein. The logic can be implemented using processors programmed using computer programs stored in memory accessible to the computer systems and executable by the processors, by dedicated logic hardware, including field programmable integrated circuits, and by combinations of dedicated logic hardware and computer programs. With all flowcharts herein, it will be appreciated that many of the steps can be combined, performed in parallel or performed in a different sequence without affecting the functions achieved. In some cases, as the reader will appreciate, a rearrangement of steps will achieve the same results only if certain other changes are made as well. In other cases, as the reader will appreciate, a rearrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A memory system comprising:
   a plurality of memory planes, each memory plane including a plane core and a corresponding specific set of resources, each respective memory plane being operable to perform (i) foreground operations using at least one of the specific set of resources of the corresponding memory plane and resources of the plane core of the corresponding memory plane and (ii) background operations using the resources of the plane core of the corresponding memory plane;
   an input/output (I/O) interface to receive memory commands from a host addressed to one or more memory planes of the plurality of memory planes;
   a status control circuit generating status bits corresponding to each memory plane of the plurality of memory planes, the status bits indicating (i) one of a busy state and a ready state of the specific set of resources used by a foreground operation of the corresponding memory plane and (ii) one of an in operation state and an idle state of the resources of the plane core of the corresponding memory plane; and
   control circuits operably coupled with the I/O interface, the status control circuit and the plurality of memory planes, to execute memory operations using the plurality of memory planes;
   wherein in the execution of a memory operation using one or more memory planes in the plurality of memory planes, the control circuits generate a plurality of status bits, in the status control circuit, corresponding to each memory plane in the plurality of memory planes; and
   wherein the control circuits execute, or deny execution of, memory operations of a received memory command in response to combinations of the received memory command and the plurality of status bits in the status control circuit, including a first type of memory command executed, or denied execution, dependent on combinations of the busy and ready states and the in operation and idle states of all the memory planes in the plurality of memory planes, and a second type of memory command addressed to a particular memory plane executed, or denied execution, independent of combinations of the busy and ready states and the in operation and idles states of memory planes in the plurality of memory planes other than the particular memory plane.

2. The memory system of claim 1,
   wherein the foreground operations include operations involving at least one of (i) a plane core of a respective memory plane controlling the specific set of resources of the respective memory plane and (ii) the resources of the plane core of the respective memory plane, and
   wherein the background operations (i) include operations involving the resources of the plane core of the respective memory plane and (ii) exclude operations involving the plane core of the respective memory plane controlling the specific set of resources of the respective memory plane.

3. The memory system of claim 2,
   wherein the specific set of resources of the respective memory plane is a set of cache memory or registers of the respective memory plane, such that the foreground operations prevent the host from accessing the cache memories or registers of the respective memory planes of the plurality of memory planes, and
   wherein the background operations do not prevent the host from accessing the cache memories or registers of the respective memory planes of the plurality of memory planes, wherein the caches are not controlled by the respective plane cores of the respective memory planes.

4. The memory system of claim 1, wherein the first type of memory command is for a first type of operation that is accepted for execution by the control circuits responsive to (i) the busy and ready states of the specific set of resources used by the foreground operations in each memory plane in the plurality of memory planes all being ready and (ii) the in operation and idle states of the resources of respective plane cores all being idle.

5. The memory system of claim 1, wherein the first type of memory command is for a first select type of operation that is accepted for execution by the control circuits when (i) the busy and ready states of the specific set of resources used by the foreground operations in each memory plane in the plurality of memory planes are all ready, (ii) the in operation and idle states of the resources of respective plane cores are all in operation from another first type of memory command, and (iii) the first select type of operation is capable of execution along with existing background operations.

6. The memory system of claim 1,
   wherein an overlapping operation period is a period during which a new memory command is accepted by the control circuits while an existing background operation of a previous memory command is executing, and
wherein the control circuits are configured, such that, during the overlapping operation period and when the new memory command has a higher priority than the previous memory command, the existing background operation is suspended to allow processing of a foreground operation of the new memory command and the suspended background operation is resumed after the foreground operation of the new memory command completes.

7. The memory system of claim 6, wherein the new memory command with the higher priority is a memory command that does not include a background operation.

8. The memory system of claim 1,
wherein an overlapping operation period is a period during which a new memory command is accepted by the control circuits while an existing background operation of a previous memory command is executing, and
wherein the control circuits are configured, such that, during the overlapping operation period and when the new memory command does not have a higher priority than the previous memory command, a foreground operation of the new memory command begins after the existing background operation completes.

9. The memory system of claim 1, wherein the second type of memory commands is for a second type of operation for a target memory plane that is accepted for execution by the control circuits when (i) the busy and ready states of the specific set of resources used by the foreground operations in each memory plane in the plurality of memory planes include a ready state in the specific set of resources of the target memory plane and (ii) the in operation and idle states of the resources of respective plane cores include an idle state in the resources of the plane core of the target memory plane.

10. The memory system of claim 1, wherein the second type of memory command is for a second select type of operation for a target memory plane that is accepted for execution by the control circuits when (i) the busy and ready states of the specific set of resources used by the foreground operations in each memory plane in the plurality of memory planes include a ready state in the specific set of resources of the target memory plane, (ii) the in operation and idle state of the resources of the plane core in the target memory plane is in operation from another second type of memory command, and (iii) the second select type of operation is capable of executing along with existing background operations.

11. The memory system of claim 1, wherein the second type of memory command is for a second select type of operation for a target memory plane that is accepted for execution by the control circuits when (i) the busy and ready states of the specific set of resources used by the foreground operations in each memory plane in the plurality of memory planes include a ready state in the specific set of resources of the target memory plane, (ii) the in operation and idle state of the resources of the plane core in the target memory plane is in operation from a first type of memory command, and (iii) the second select type of operation is capable of executing along with existing background operations.

12. The memory system of claim 1, wherein, the first type of memory command is a synchronous chip operation (SCO) and the second type of memory command is an asynchronous independent plane operation (AIPO).

13. The memory system of claim 1, wherein the memory commands include a reset plane command for a target memory plane that is accepted for execution by the control circuits when the in operation and idle state of the resources of the plane core in the target memory plane is in operation from a second type of memory command, to cause an ongoing second type of operation of the target memory plane to abort.

14. The memory system of claim 1, wherein the plane core of one of the memory planes is 3D NAND flash memory.

15. The memory system of claim 1, wherein the plane core of one of the memory planes is at least one of a memory unit that stores data, an error free memory unit which includes an ECC circuit to correct the data, a computation in memory (CIM) unit configured to execute a data computation function and a memory unit configured to execute in memory search (IMS) commands.

16. The memory system of claim 1, wherein:
the memory system is configured to execute an operation that engages a target memory plane; and
during a first phase of execution of the operation, the memory system is configured to, for a foreground operation, set the busy and ready states of the target memory plane to busy and set the in operation and idle states of the target memory plane to in operation, independent of the busy and ready states and the in operation and idle states of the plurality of memory planes other than the target memory plane.

17. The memory system of claim 16, wherein, during a second phase of execution of the operation, the memory system is configured to, for a background operation, change the busy and ready states of the target memory plane to ready and keep the in operation and idle states of the target memory plane as in operation, independent of the busy and ready states and the in operation and idle states of the plurality of memory planes other than the target memory plane.

18. The memory system of claim 17, wherein during a preprocessing operation period of executing the operation that engages the target memory plane, which occurs before the first and second phases of execution, the busy and ready states of each memory plane of the plurality of memory planes is set to busy and the in operation and idle states of each memory plane of the plurality of memory planes is set to in operation.

19. A method of operating a memory system comprising a plurality of memory planes, each memory plane including a plane core and a corresponding specific set of resources, each respective memory plane being operable to perform (i) foreground operations with a specific set of resources of the corresponding memory plane and (ii) background operations without the specific set of resources of the corresponding memory plane, the method comprising:
generating, for each memory plane of the plurality of memory planes, (i) a corresponding first status signal indicating a busy state or a ready state of the specific set of resources used by a foreground operation of the corresponding memory plane, and (ii) a corresponding second status signal indicating an in operation state or an idle state of the plane core of the corresponding memory plane.

20. The method of claim 19, further comprising:
selectively allowing or denying execution of a memory command for a memory plane of the plurality of memory planes, based on a status of one or more of the plurality of first and second status signals.

* * * * *